(12) United States Patent
Marshall

(10) Patent No.: US 12,408,626 B2
(45) Date of Patent: Sep. 9, 2025

(54) FEEDING VESSELS AND FEEDING VESSEL SHIELDS

(71) Applicant: Whitney Marshall, Brooklyn, NY (US)

(72) Inventor: Whitney Marshall, Brooklyn, NY (US)

( * ) Notice: Subject to any disclaimer, the term of this patent is extended or adjusted under 35 U.S.C. 154(b) by 288 days.

(21) Appl. No.: 17/738,260

(22) Filed: May 6, 2022

(65) Prior Publication Data

US 2022/0264843 A1 Aug. 25, 2022

Related U.S. Application Data

(63) Continuation-in-part of application No. 16/750,943, filed on Jan. 23, 2020, now abandoned.

(60) Provisional application No. 62/796,908, filed on Jan. 25, 2019.

(51) Int. Cl.
*A01K 5/01* (2006.01)

(52) U.S. Cl.
CPC .................................. *A01K 5/0135* (2013.01)

(58) Field of Classification Search
CPC ............ A47G 23/0633; A47G 23/0303; A47G 2023/0691; A47G 23/032; A47G 19/03; A47G 19/10; A47G 19/2266; A47G 19/32; A47G 19/34; A47F 7/00; A47F 5/0006; A47F 7/0064; A47J 47/00; A47J 47/01; B65D 85/325; B65D 85/327
USPC ........... 99/645; 206/561, 562, 564; 220/532, 220/730, 731
See application file for complete search history.

(56) References Cited

U.S. PATENT DOCUMENTS

| | | | |
|---|---|---|---|
| 1,079,261 A | 11/1913 | Park | |
| 2,419,834 A | 4/1947 | Grindstaff | |
| 2,556,844 A * | 6/1951 | Istwan | A47G 23/0641 206/139 |
| 2,589,427 A | 3/1952 | Ossman | |
| 2,608,074 A * | 8/1952 | Davis | A47G 23/032 229/5.5 |

(Continued)

FOREIGN PATENT DOCUMENTS

| | | | | |
|---|---|---|---|---|
| CA | 2842121 A | 8/2015 | | |
| CA | 2842121 A1 * | 8/2015 | | A01K 5/01 |

(Continued)

OTHER PUBLICATIONS

KR-2045181-B1 text (Year: 2019).*
Neater Feeder Express Pet Bowls by Neater Pet Brands (https://neaterpets.com/collections/neater-feeder/products/neater-feeder-express-for-cats).

*Primary Examiner* — Katelyn T Truong
(74) *Attorney, Agent, or Firm* — Fitch, Even, Tabin & Flannery, LLP

(57) ABSTRACT

A feeding bowl assembly has a feeding bowl; a flexible removable shield to partially surround the feeding bowl; a pad for bowl placement having a plurality of arcuate slots to receive an end of the shield having a retaining lip configured to extend through one of the arcuate slots; a band having a pressure sensitive adhesive to attach to the shield; wherein the shield, the pad and the band are configured to be flat packable when unassembled; and wherein the band is configurable to be positioned on the shield to hold an edge of the feeding bowl off the pad. The feeding bowl's width by height may be one of 5 inches by 2 inches; 9.8 inches by 3 inches; 7 inches by 2.5 inches; 12.75 inches by 2.6 inches; and wherein the arcuate slots are configured receive the shield and allow placement of the feeding bowl.

2 Claims, 43 Drawing Sheets

(56) References Cited

U.S. PATENT DOCUMENTS

| | | | | |
|---|---|---|---|---|
| 2,611,510 A | * | 9/1952 | Willits | A47J 36/064 |
| | | | | 126/299 C |
| 2,664,722 A | * | 1/1954 | Barr | A47G 19/02 |
| | | | | 220/574 |
| 2,766,919 A | * | 10/1956 | Randall | A47G 23/06 |
| | | | | 294/159 |
| 2,813,509 A | * | 11/1957 | Bruno | A01K 5/0135 |
| | | | | D7/553.6 |
| 2,839,028 A | | 6/1958 | Routh | |
| 2,891,695 A | * | 6/1959 | Peters | A47G 23/06 |
| | | | | D7/552.1 |
| 3,651,787 A | | 3/1972 | Cooper | |
| 3,698,594 A | * | 10/1972 | Boehlert | A47G 19/03 |
| | | | | 119/61.5 |
| D286,507 S | * | 11/1986 | Drago | D6/535 |
| 4,949,678 A | | 8/1990 | Demko | |
| 5,316,176 A | * | 5/1994 | Genest | A47G 23/0633 |
| | | | | 220/731 |
| 5,492,083 A | | 2/1996 | Holladay | |
| D385,068 S | | 10/1997 | Malcolm | |
| 5,709,168 A | | 1/1998 | Walker | |
| 5,755,474 A | * | 5/1998 | Slomski | B65D 71/504 |
| | | | | 294/87.2 |
| 6,032,824 A | * | 3/2000 | Barrow | A01K 5/0135 |
| | | | | 220/625 |
| 6,237,532 B1 | | 5/2001 | Derr | |
| D471,406 S | | 3/2003 | Wellner | |
| 6,561,375 B1 | | 5/2003 | Nagy | |
| 7,124,709 B1 | * | 10/2006 | Greer | A01K 5/0114 |
| | | | | 119/61.5 |
| 7,395,782 B1 | * | 7/2008 | Lindsay | A01K 5/025 |
| | | | | 119/51.02 |
| 7,607,387 B2 | | 10/2009 | Stanczak | A47J 37/108 |
| | | | | 99/425 |
| D606,711 S | | 12/2009 | Becattini, Jr. et al. | |
| D642,338 S | | 7/2011 | Becattini, Jr. et al. | |
| 8,146,534 B1 | | 4/2012 | Robertson | |
| 8,286,589 B1 | | 10/2012 | Tsengas | |
| D683,190 S | | 5/2013 | Shields | |
| 8,690,002 B1 | * | 4/2014 | Finell | A47G 19/10 |
| | | | | 220/731 |
| 9,228,331 B1 | * | 1/2016 | Weinstein | E03C 1/32 |
| 9,486,096 B1 | * | 11/2016 | Hertz | B65D 85/72 |
| 10,251,403 B2 | | 4/2019 | Hartman | A21B 3/13 |
| 10,548,294 B1 | * | 2/2020 | Price | A01K 7/00 |
| D880,787 S | * | 4/2020 | Price | D30/121 |
| 2002/0162511 A1 | | 11/2002 | Hollinger | |
| 2003/0066490 A1 | | 4/2003 | Bourigault | |
| 2003/0230244 A1 | * | 12/2003 | Morrison | A01K 7/005 |
| | | | | 119/61.54 |
| 2004/0194716 A1 | * | 10/2004 | Morrison | A01K 7/005 |
| | | | | 119/61.1 |
| 2004/0231607 A1 | | 11/2004 | Hollinger | |
| 2005/0211190 A1 | | 9/2005 | Weinblatt | |
| 2006/0027177 A1 | * | 2/2006 | Busse | A01K 5/0135 |
| | | | | 119/61.56 |
| 2006/0249089 A1 | | 11/2006 | Behunin | |
| 2007/0034161 A1 | | 2/2007 | Thompson | |
| 2008/0289581 A1 | | 11/2008 | Cox, Jr. et al. | |
| 2009/0241843 A1 | | 10/2009 | Becattini, Jr. et al. | |
| 2010/0038512 A1 | * | 2/2010 | Esrich | A01K 5/0114 |
| | | | | 248/346.5 |
| 2010/0180827 A1 | | 7/2010 | Becattini, Jr. et al. | |
| 2013/0104808 A1 | | 5/2013 | Rocker et al. | |
| 2014/0165919 A1 | * | 6/2014 | O'Connor | A01M 29/12 |
| | | | | 119/51.01 |
| 2017/0055491 A1 | * | 3/2017 | Hsu | B65D 21/0216 |
| 2017/0280676 A1 | | 10/2017 | Mendez | |
| 2020/0022332 A1 | * | 1/2020 | Nessy | A01K 5/0114 |
| 2020/0060227 A1 | * | 2/2020 | Bofill | A01M 29/34 |
| 2020/0288669 A1 | * | 9/2020 | Maring-Teichmann | B65D 5/22 |
| 2022/0055797 A1 | * | 2/2022 | Liu | B65D 21/086 |
| 2022/0136240 A1 | * | 5/2022 | Sollie | A47G 5/00 |
| | | | | 160/135 |
| 2022/0264842 A1 | * | 8/2022 | Ratliff | A01K 5/0114 |
| 2022/0361443 A1 | * | 11/2022 | Kamaleddine | A01K 5/0114 |
| 2023/0329191 A1 | * | 10/2023 | Mizrahi | A01K 5/0114 |

FOREIGN PATENT DOCUMENTS

| | | | | |
|---|---|---|---|---|
| GB | 686067 A | * | 1/1953 | |
| GB | 707192 A | * | 4/1954 | |
| GB | 1126278 A | * | 9/1968 | |
| GB | 2373494 A | * | 9/2002 | A01K 5/0114 |
| GB | 2404834 A | | 2/2005 | |
| GB | 2599430 A | * | 4/2022 | A01K 5/0114 |
| KR | 2019019271 A | * | 2/2019 | A01K 1/0107 |
| KR | 2045181 B1 | * | 11/2019 | A01K 5/008 |
| WO | WO-2010065983 A1 | * | 6/2010 | A01K 5/0142 |
| WO | WO-2019018887 A1 | * | 1/2019 | A01K 15/025 |

* cited by examiner

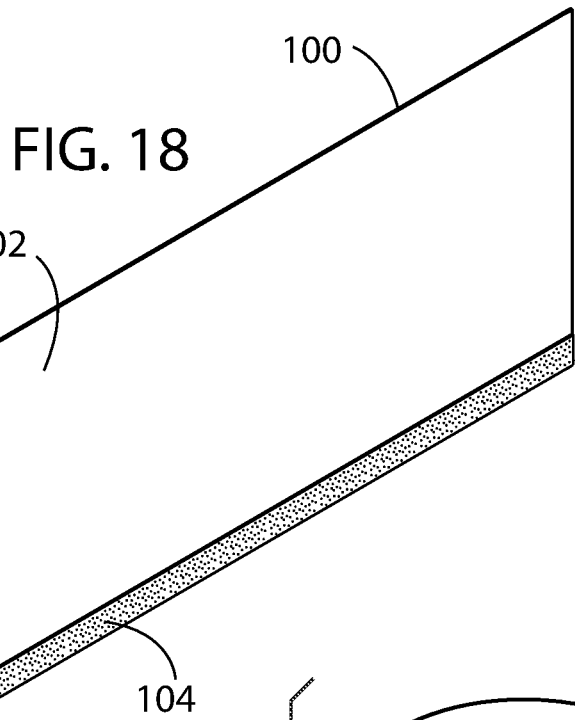
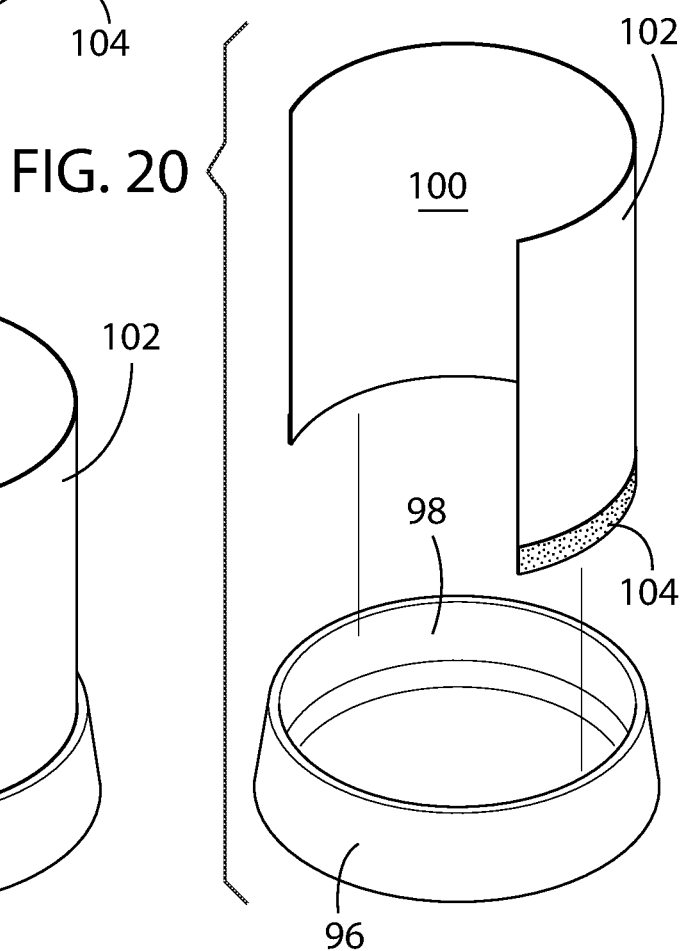

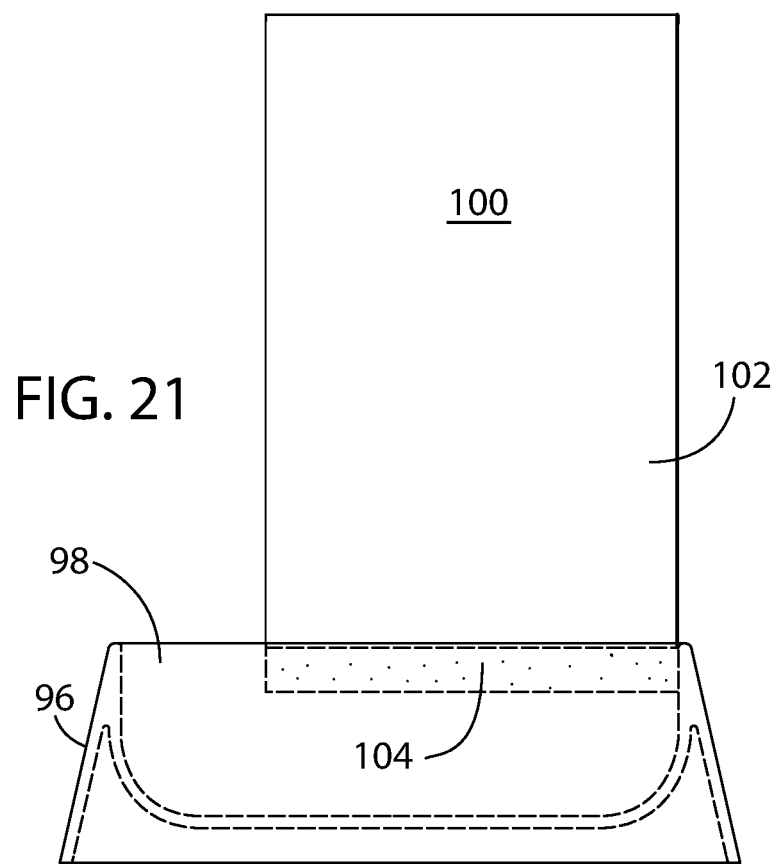
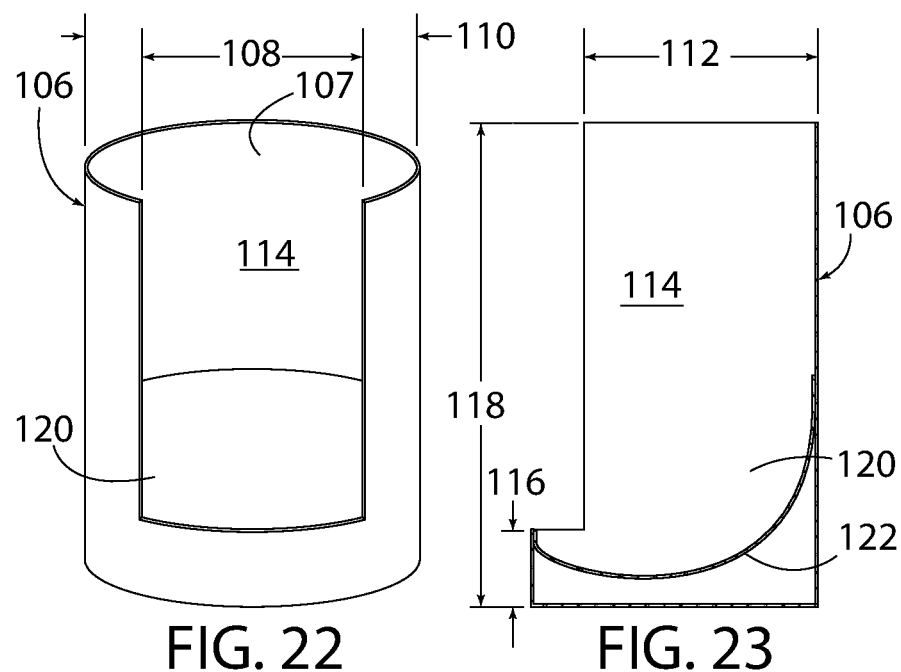

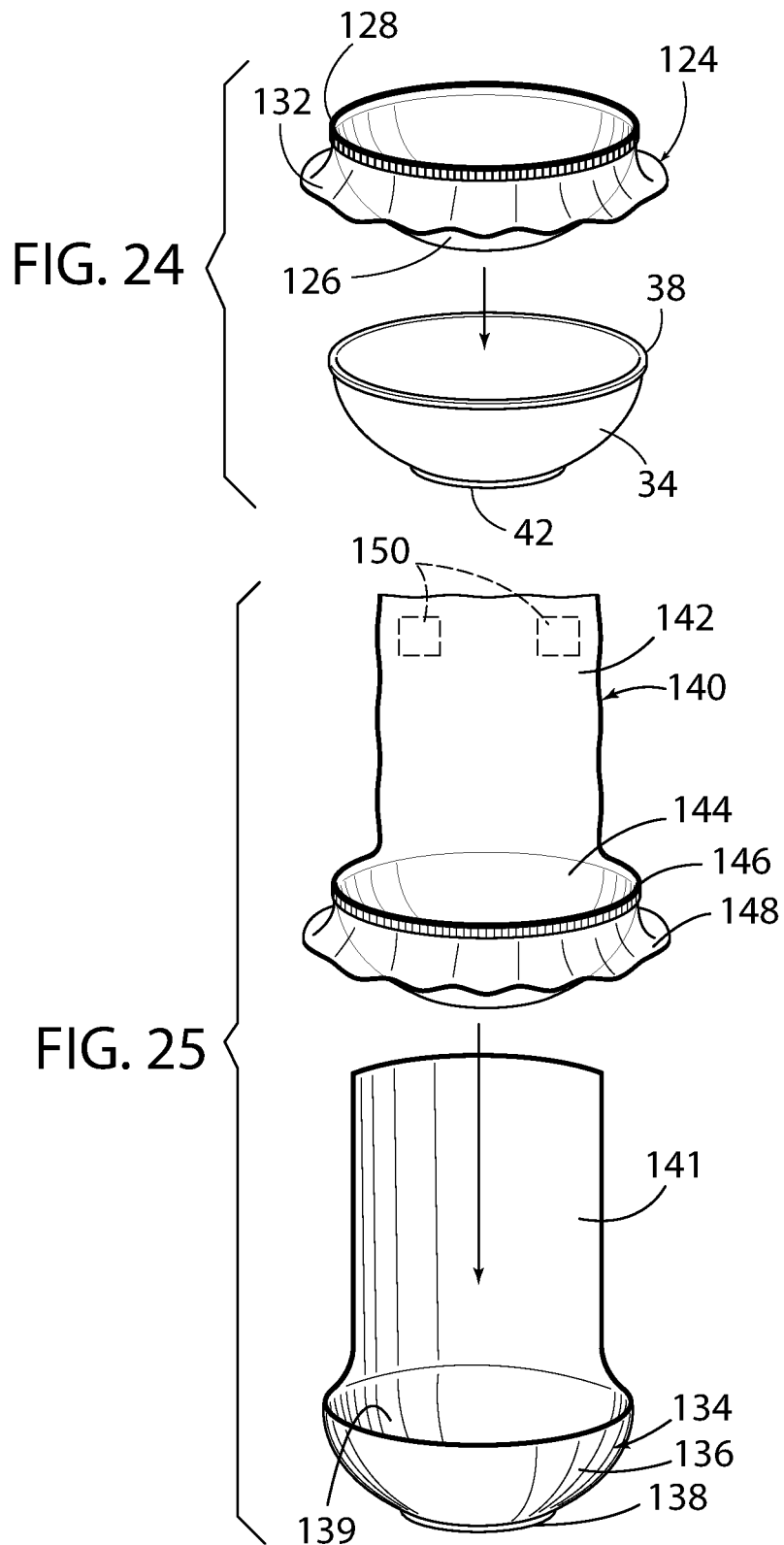

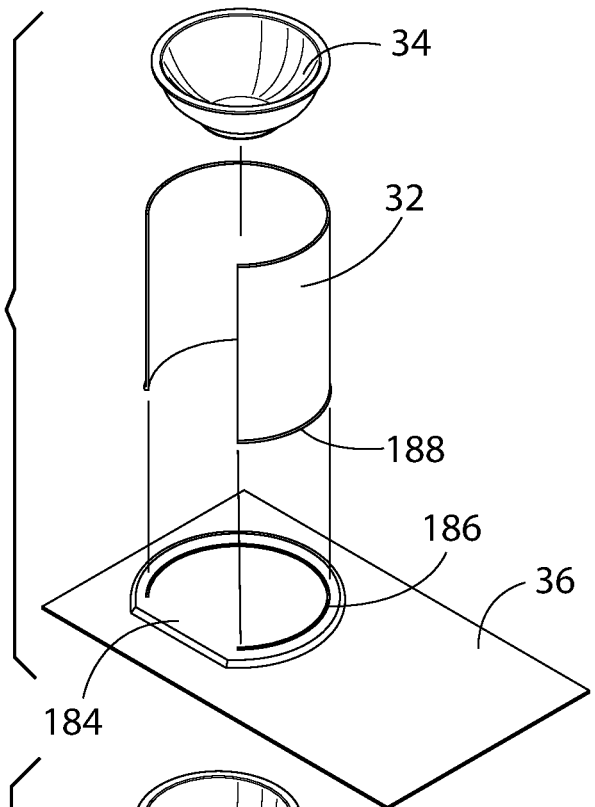
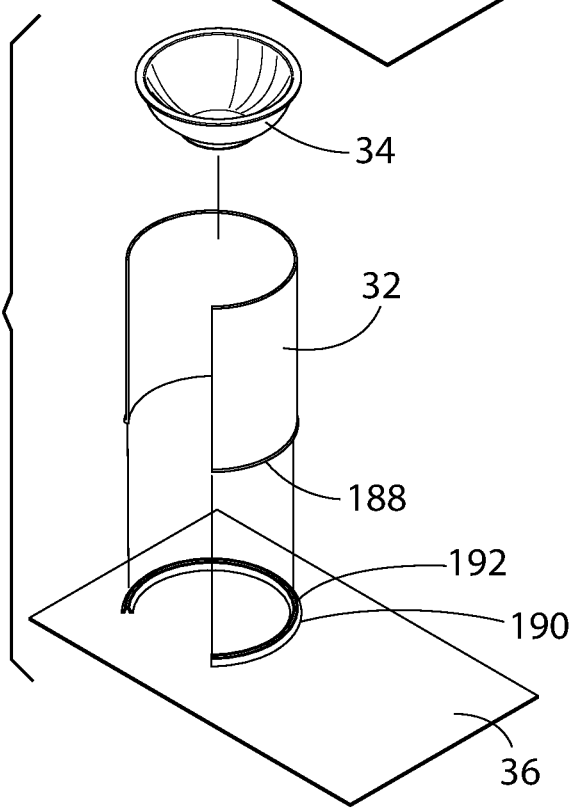

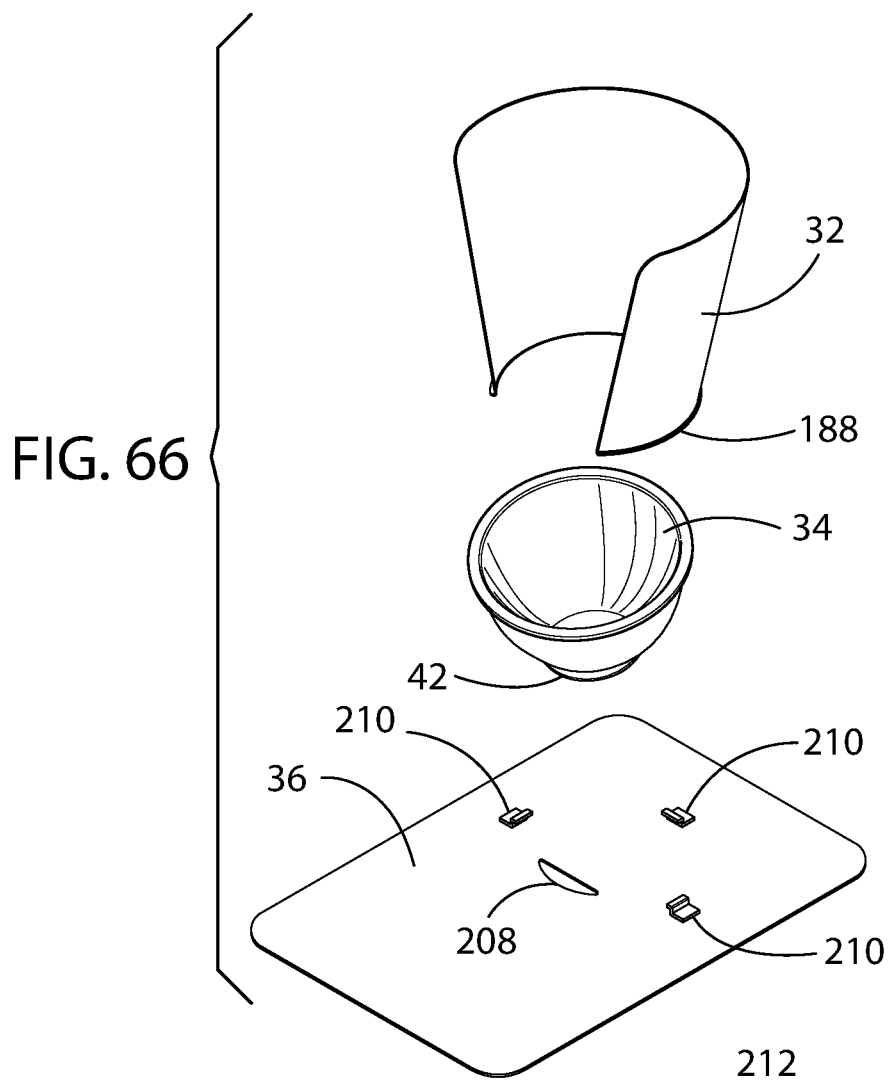
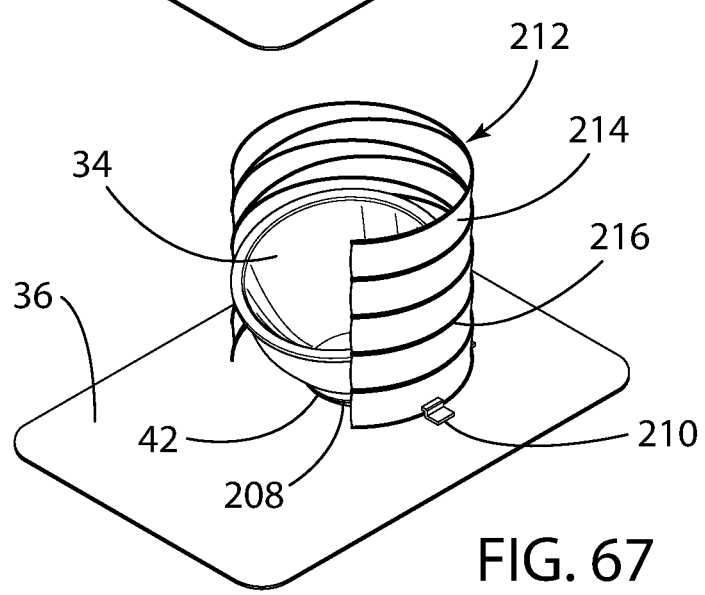

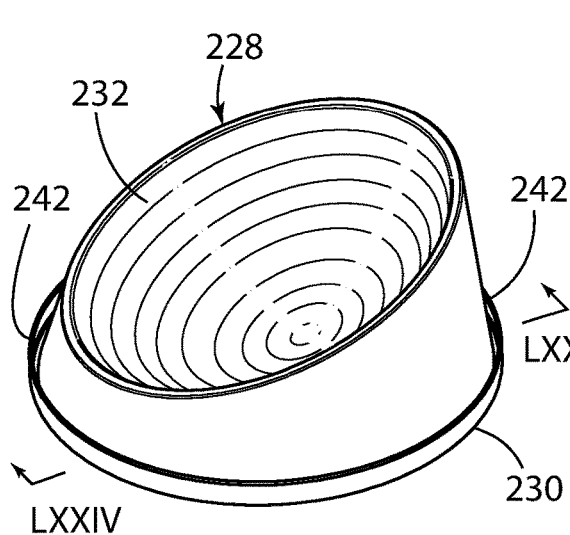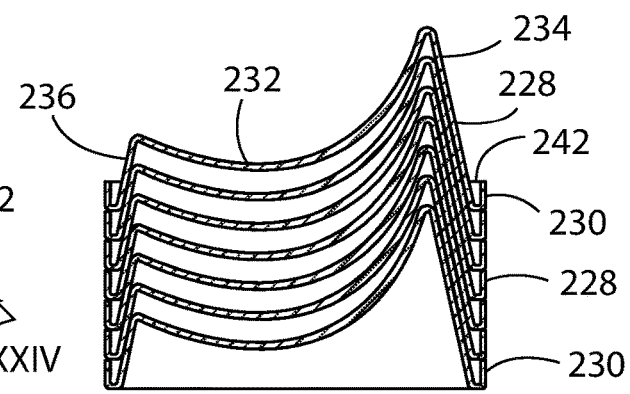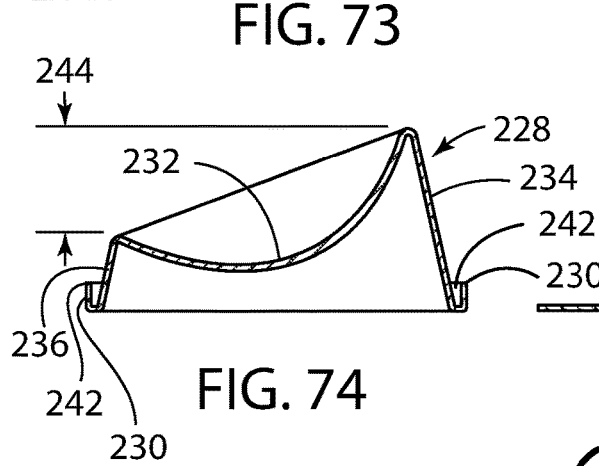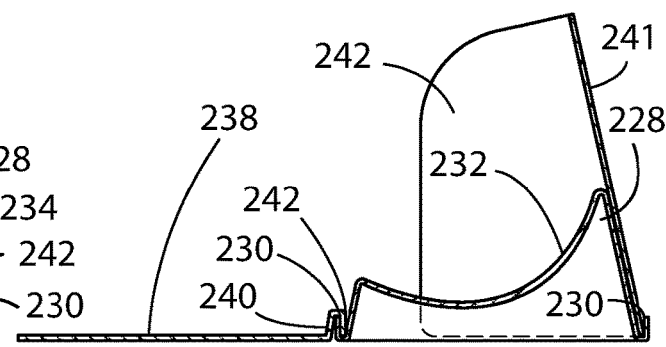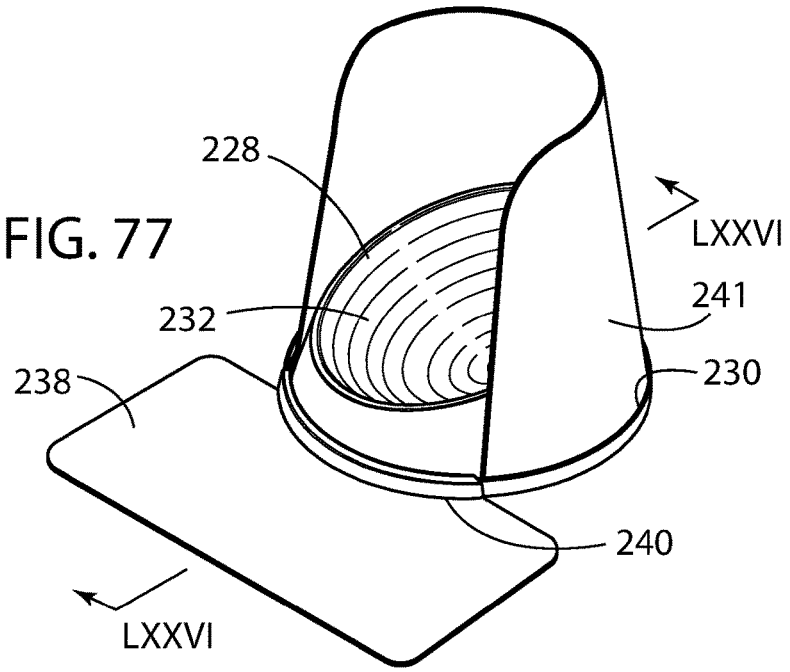

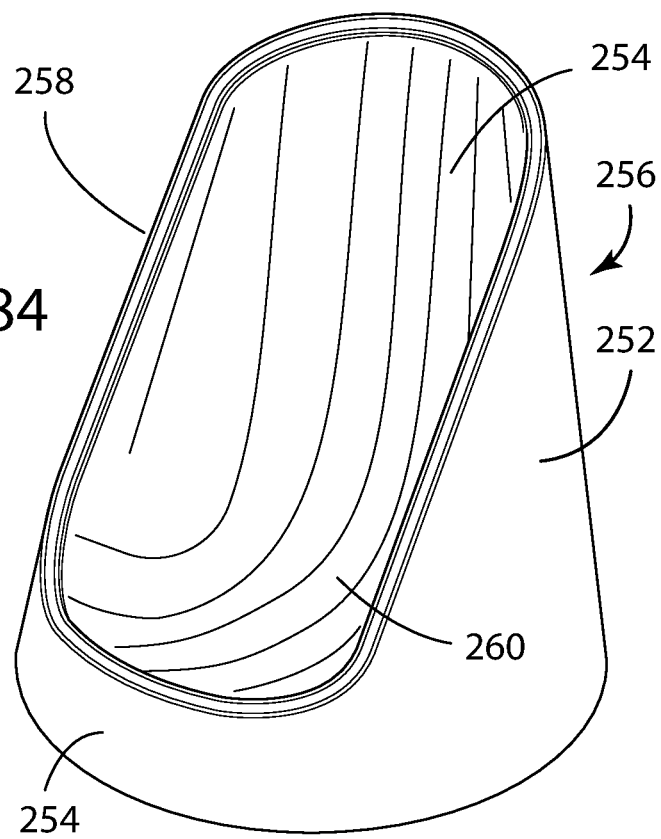
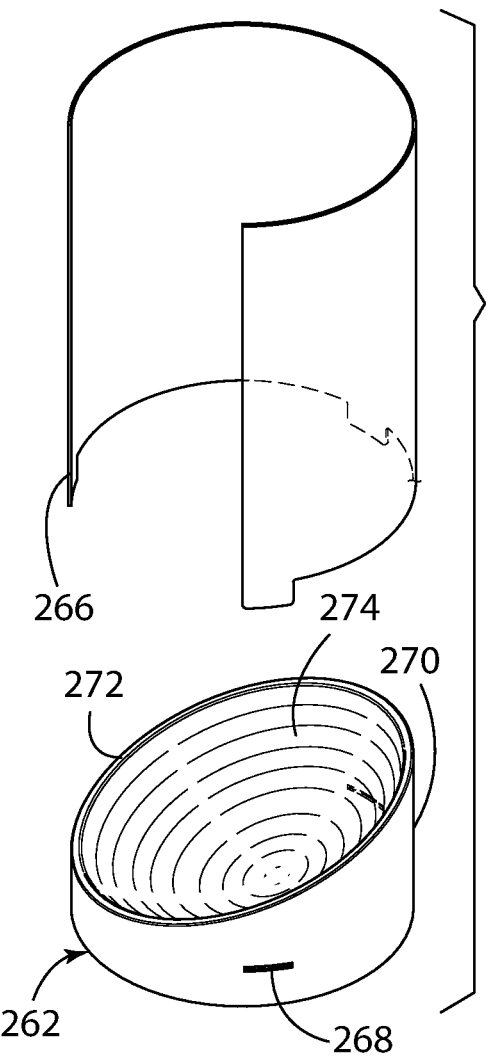
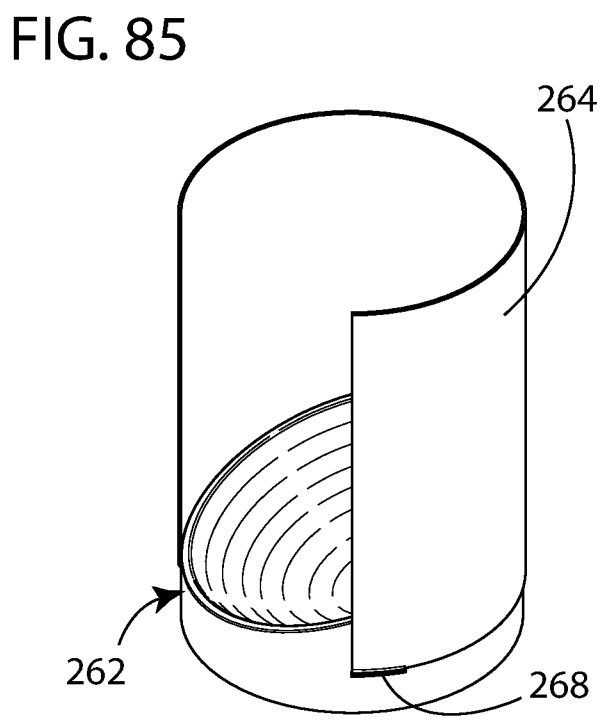
FIG. 84
FIG. 85
FIG. 86

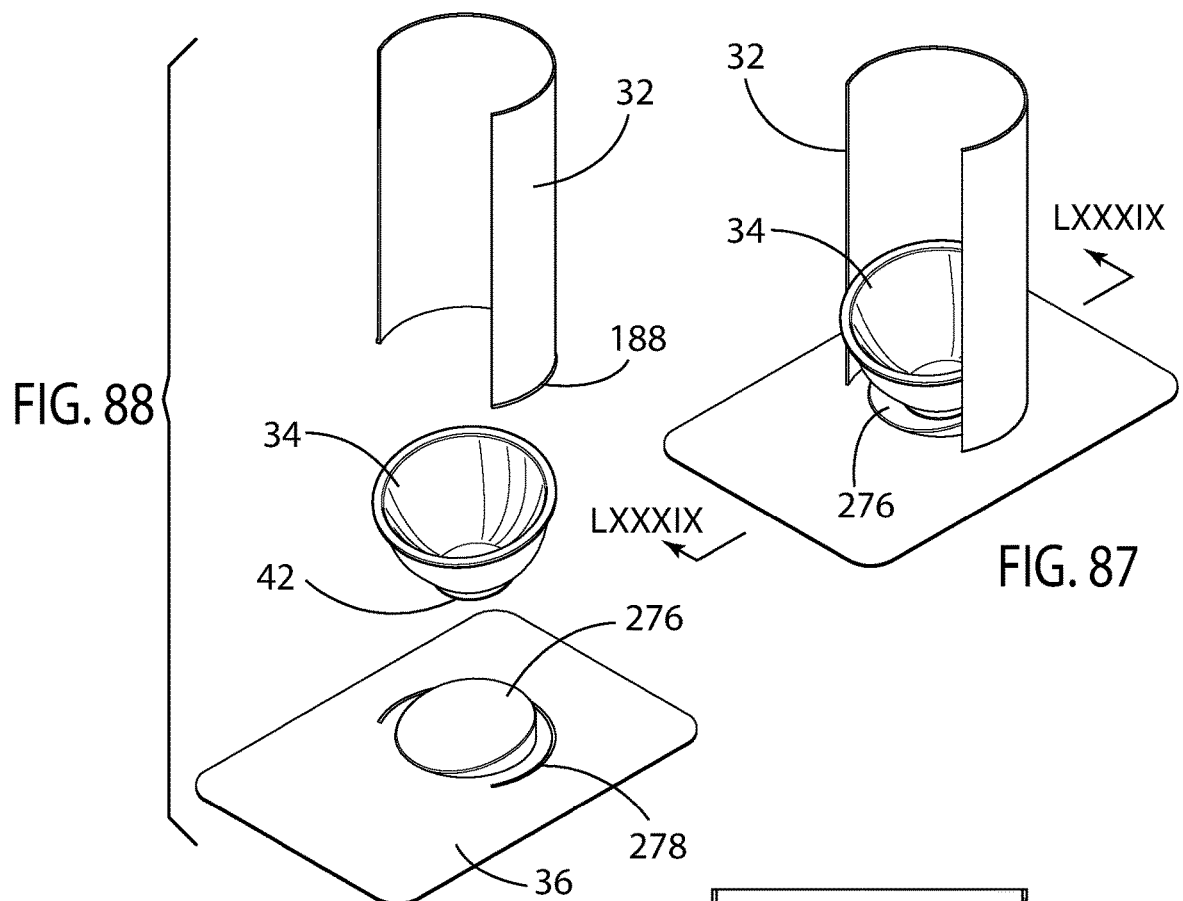
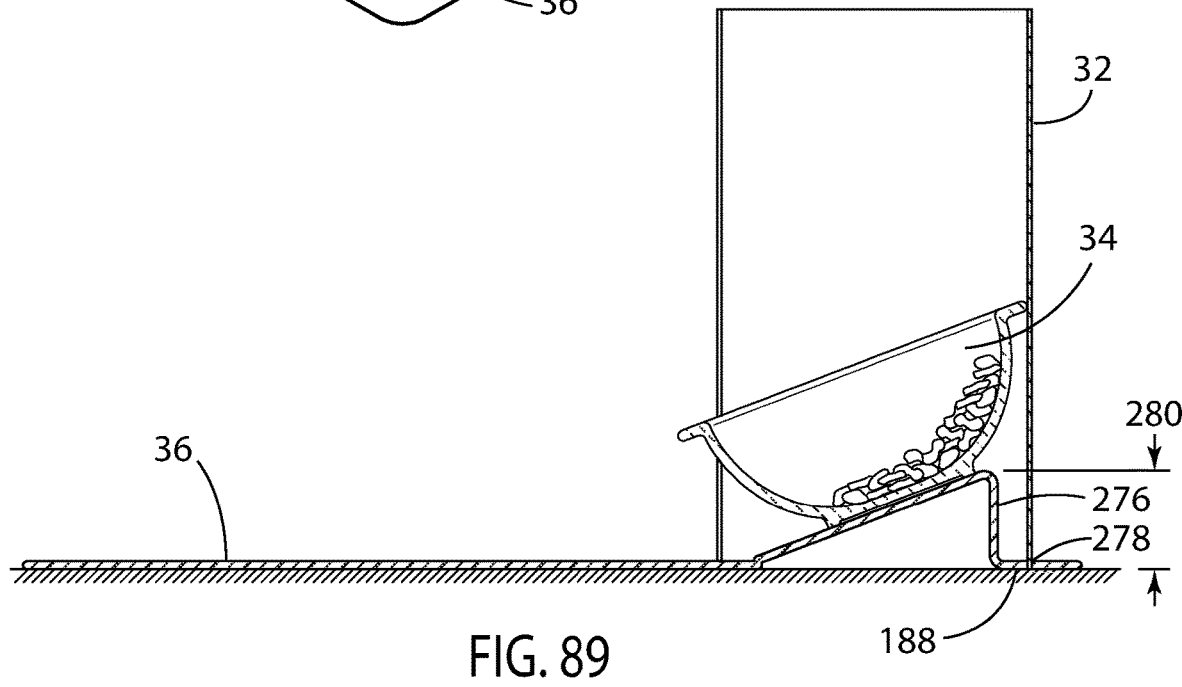

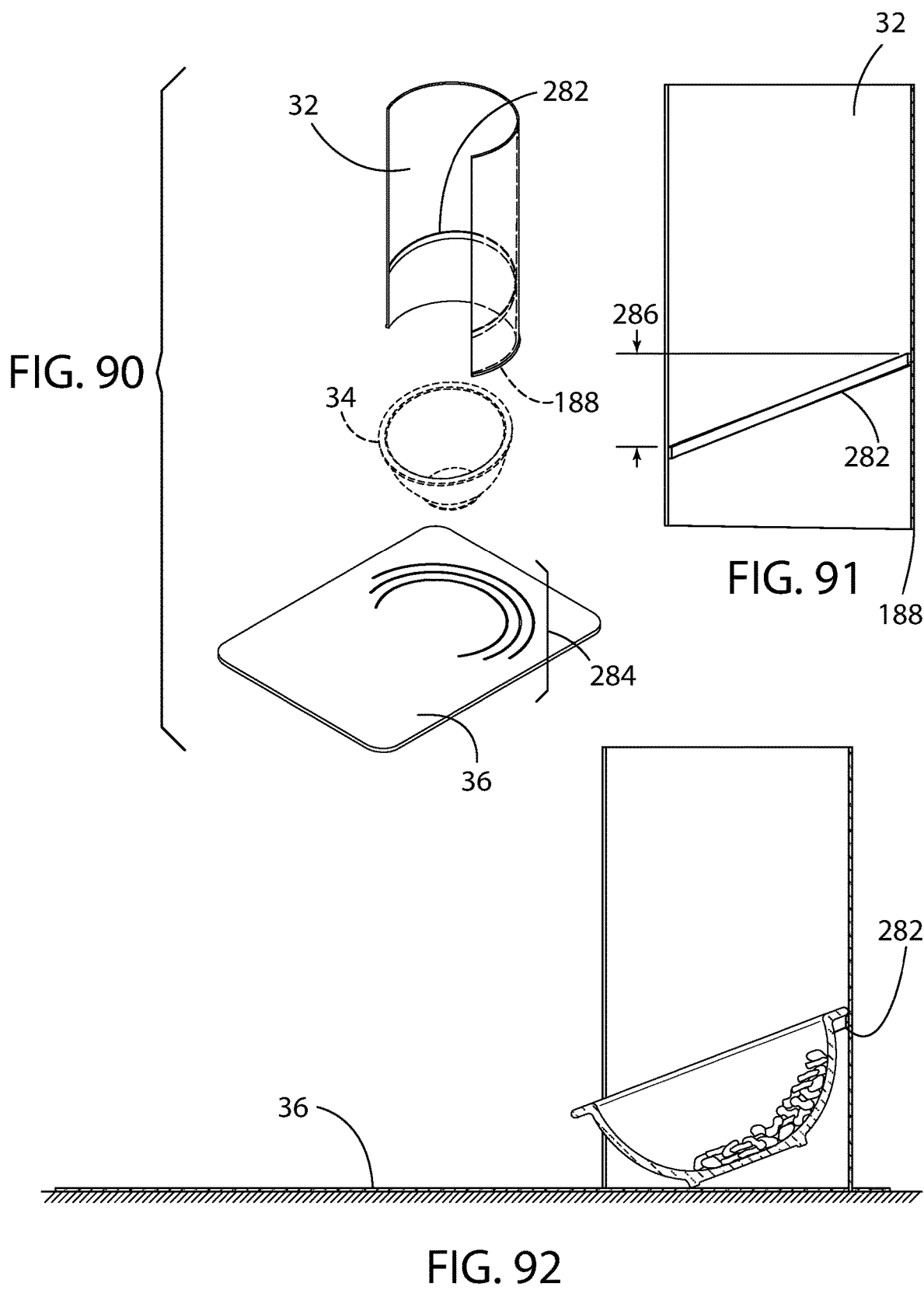

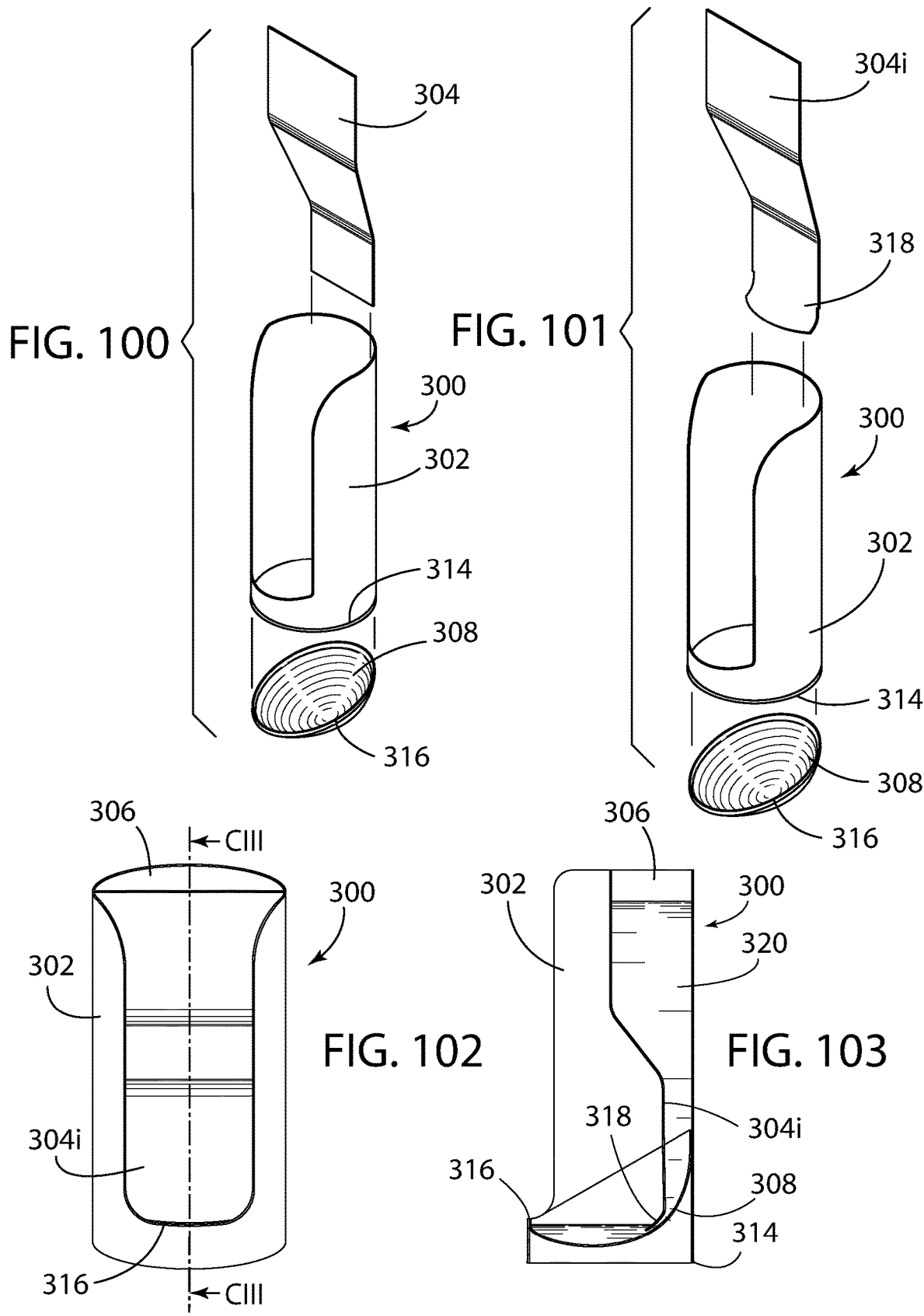

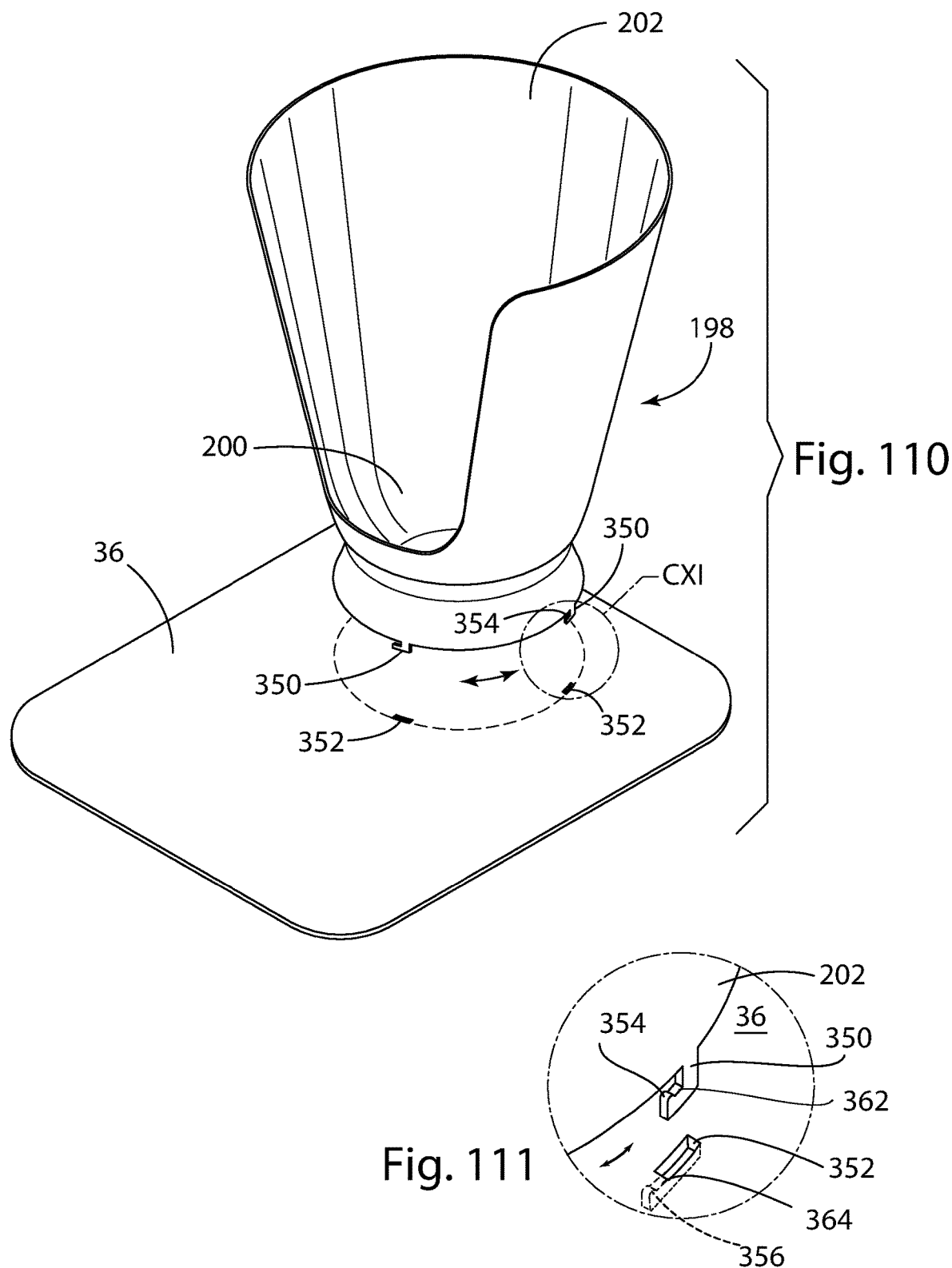

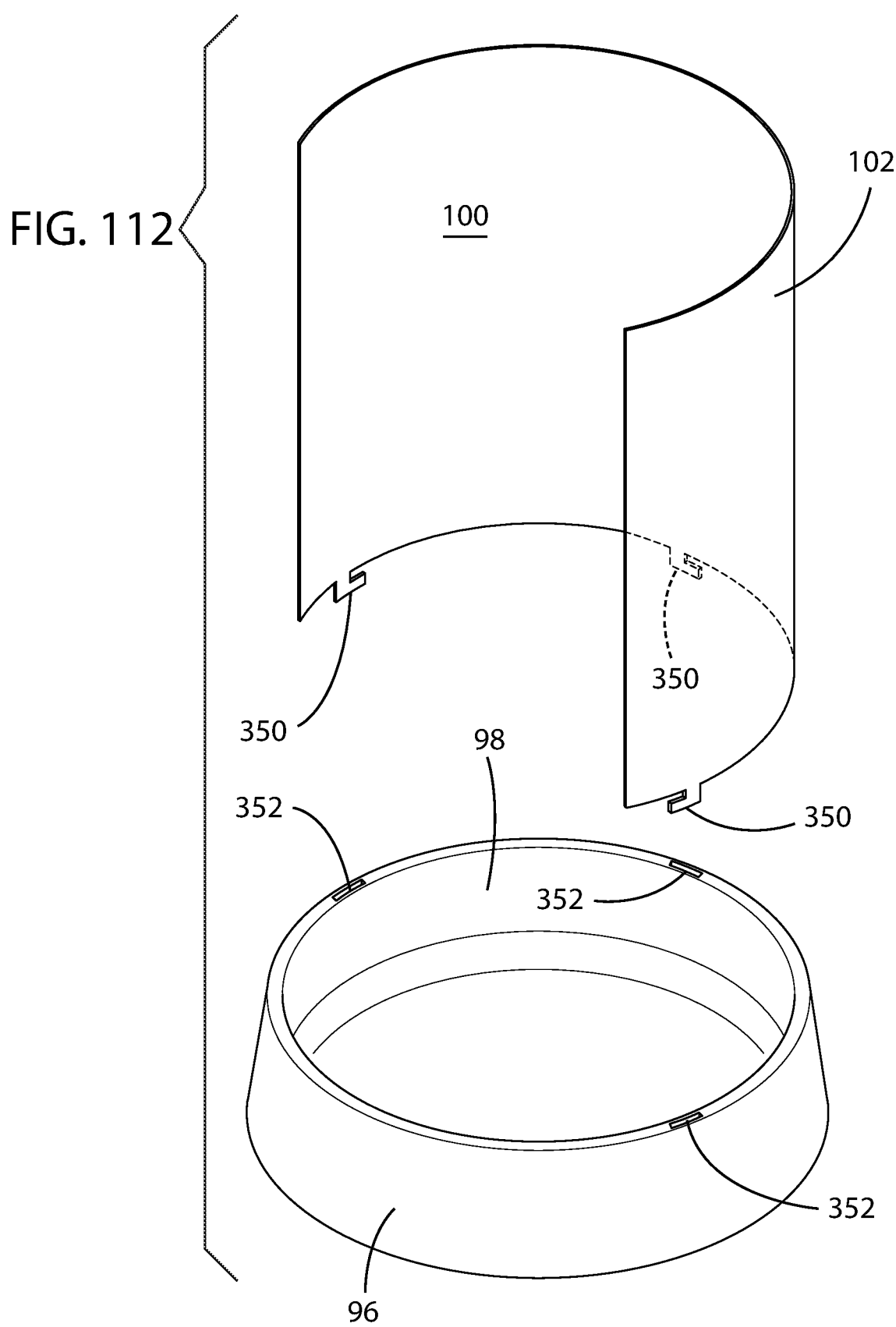

FEEDING VESSELS AND FEEDING VESSEL SHIELDS

CROSS-REFERENCE TO RELATED APPLICATION

This application is a continuation-in-part of U.S. application Ser. No. 16/750,943, filed Jan. 23, 2020, which claims priority from U.S. Provisional Patent Application 62/796,908, filed Jan. 25, 2019, which are hereby incorporated herein by reference in their entirety for all purposes.

FIELD

Presented herein are feeding vessels and feeding vessel accessories, and in particular, feeding vessels and feeding vessel accessories with a shield to prevent food spillage.

BACKGROUND

Various vessels have been devised to contain food, in either solid or liquid form. Such vessels are usually sized and shaped to allow an animal, such as a pet, to easily feed from the vessel. Such vessels are normally sized and shaped to be no bigger than is needed to accommodate the animal for which the vessel is designed. One of the problems of this type of design is that it does not address an animal's lack of awareness of the spillage from the vessel while feeding.

Some rudimentary efforts are known in the art to address this matter such as found in U.S. Pat. No. 1,079,261 to Park (for birds): U.S. Pat. No. 8,286,589 to Tsengas (attachable cover); GB2404834A to Weideger (small short collar); and US Pub. 20050211190 to (guard to hold back ears of floppy eared dog). Other devices include large elevated housings for multiple feeding vessels, such as one sold under the tradename NEATER FEEDER EXPRESS PET BOWLS by Neater Pet Brands (neaterpets.com/neater-feeder).

Accordingly, while food vessels and some rudimentary food vessel shields are known, there remains a desire and a need in the art to provide a vessel or a detachable vessel accessory to reduce food spillage while a pet feeds from the vessel with minimal increase in floor footprint and expense.

SUMMARY

Accordingly, to advance at least the aforementioned deficiencies in the art, described herein are feeding vessels and feeding vessel accessories, and in particular, feeding vessels and feeding vessel accessories with a shield to prevent food spillage.

According to one approach, a feeding vessel assembly, is provided having a feeding bowl having a cavity to receive food and water and a rim or blunt edge defining an upper edge of the feeding bowl, a deformable shield which is detachable from the feeding bowl rim wherein the shield when installed encloses up to about 75 percent of the circumference of the top rim thus providing an opening for an animal to access the feeding bowl cavity, wherein the shield extends from the rim of the feeding bowl to a height of about 12 inches from the floor, and wherein the shield flares outwardly from the rim of the feeding bowl as it extends upwardly in the range of about 1 to 30 degrees and is configured to allow an animal to push food up an inside wall of the shield so that it can slide the food into its mouth when it opens its mouth. It is noted though that the height can be higher depending on the size of the animal. For example, the shield may need to be higher for a golden retriever than it would be for a pug.

In this approach, the assembly may also include a pad having an opening to receive a base of the feeding bowl and a food dispenser which is configured to dispense food into a side feeding bowl. The shield can be formed from a deformable plastic, rubber, cardboard, combinations thereof, and the like.

According to another approach, a feeding vessel assembly may have a feeding bowl having a cavity to receive food and water, a integral shield extending above the feeding bowl cavity wherein the shield encloses up to about 75 percent of the circumference of the top rim thus providing an opening for an animal to access the feeding bowl cavity, wherein the shield extends to a height of about 12 inches from the floor, and wherein the shield flares outwardly from the feeding bowl cavity as it extends upwardly in the range of about 1 to 30 degrees and is configured to allow an animal to push food up an inside wall of the shield so that it can slide into its mouth when it opens its mouth.

According to another approach, a shield for a feeding bowl is provided having a trimmable and deformable shield wall having an adhesive layer to attach to contours of an interior wall of a feeding bowl cavity; the shield configured to, when installed on the feeding bowl, extend above the feeding bowl cavity wherein the shield encloses up to about 75 percent of the circumference of a top rim of the feeding bowl thus providing an opening for an animal to access the feeding bowl cavity, wherein the shield extends to a height of about 12 inches from the floor or from the height of the bowl (i.e., it could add additional height to the already existing bowl, and wherein the shield flares outwardly from the feeding bowl cavity as it extends upwardly in the range of about 1 to 30 degrees and is configured to allow an animal to push food up an inside wall of the shield so that it can slide into its mouth when it opens its mouth.

An optional feature of the present embodiments is to provide a disposable liner configured to line the interior cavity of the feeding bowl.

According to another approach, a feeding bowl assembly is provided having a feeding bowl with a cavity to receive food and water; a flexible removable shield to partially surround the feeding bowl; a pad to place the feeding bowl on, the pad having a plurality of arcuate slots to receive an end of the flexible removable shield having a retaining lip configured to extend through one of the arcuate slots; a band having a pressure sensitive adhesive to attach to the shield; wherein the shield, the pad and the band are configured to be flat packable when unassembled; and wherein the band is configurable to be positioned on the shield to hold an edge of the feeding bowl off the pad. The feeding bowl's width by height may be one of 5 inches by 2 inches; 9.8 inches by 3 inches; 7 inches by 2.5 inches; 12.75 inches by 2.6 inches; and wherein the arcuate slots are configured receive the shield and allow placement of the feeding bowl.

In some embodiments, the pad may be approximately 48 cm by 30 cm (i.e., approximately 18.9 inches by 11.8 inches). The shield that is inserted into the mat may itself be approximately 14 inches in height. The width of the shield may vary based on the size of the bowl and the desired opening of the shield to access the bowl (i.e., the amount of the circumference of the bowl the shield is configured to surround. A shield that is configured for placement on the lip/edge of the bowl may be approximately 12 in high. The difference is to accommodate the added height of the bowl so the combined height of the bowl and shield is similar to the 14 inch height of the shield attached to the mat.

Other features will become more apparent to persons having ordinary skill in the art to which the assemblies pertain and from the following description and claims.

BRIEF DESCRIPTION OF THE DRAWINGS

FIG. 18 is a perspective view of an exemplary feeding vessel shield, according to the present invention;

FIG. 19 is a perspective view of another feeding vessel assembly including the exemplary shield of FIG. 18, according to the present invention;

FIG. 20 is an exploded perspective view of another feeding vessel assembly including the exemplary shield of FIG. 18, according to the present invention of FIG. 19;

FIG. 21 is a side view of a feeding vessel assembly including an exemplary shield, according to the present invention of FIG. 19;

FIG. 22 is a front perspective view of another feeding vessel including an integral exemplary shield, according to the present invention;

FIG. 23 is a side, elevational view of a cross section of the feeding vessel including an integral exemplary shield of FIG. 22;

FIG. 24 is a front perspective view of a disposable liner for a feeding vessel according to the present invention;

FIG. 25 is a front perspective view of a disposable liner for a feeding vessel according to the present invention;

FIG. 50 is an exploded perspective view of a feeding vessel assembly of FIG. 49 including an exemplary lipped shield;

FIG. 51 is an exploded perspective view of feeding vessel assembly according to another approach including an alternate base configuration having a slotted ridge on the pad shaped to receive an exemplary lipped shield;

FIG. 66 is an exploded perspective view of a feeding vessel assembly including an exemplary shield, according to the present invention of FIG. 65;

FIG. 67 is a perspective view of another feeding vessel assembly including an exemplary collapsible shield, according to the present invention;

FIG. 73 is stackable feeding bowl according to another embodiment of the present invention with a raised back wall;

FIG. 74 is a cross-sectional side view of the bowl of FIG. 73 taken along section lines LXXIV-LXXIV of FIG. 73;

FIG. 75 is a cross-sectional side view of multiple stacked bowls of FIG. 73;

FIG. 76 is a cross-sectional side view of the feeding bowl assembly of FIG. 77, taken along section lines LXXVI-LXXVI of FIG. 77;

FIG. 77 is a perspective view of the feeding vessel assembly of FIG. 73 including of an exemplary shield, according to the present invention;

FIG. 84 is a perspective view of another feeding vessel assembly according to the present invention;

FIG. 85 is an exploded perspective view of another feeding vessel assembly according to the present invention;

FIG. 86 is a perspective view of a feeding vessel assembly according to the present invention of FIG. 85;

FIG. 87 is a perspective view of a feeding assembly including an exemplary shield, according to the present invention of FIG. 88;

FIG. 88 is an exploded perspective view of the embodiment of FIG. 87;

FIG. 89 is a cross-sectional side view of the feeding assembly of FIG. 87 including an exemplary shield, according to the present invention of FIG. 87 taken along section lines LXXXIX-LXXXIX of FIG. 87;

FIG. 90 is an exploded perspective view of another feeding assembly including an exemplary shield, according to the present invention;

FIG. 91 is a cross-sectional side view of the shield of FIG. 90;

FIG. 92 is a cross-sectional side view of an assembled feeding vessel assembly of FIG. 90;

FIG. 100 is an exploded perspective view of the feeding vessel of FIG. 97;

FIG. 101 is an exploded perspective view of the feeding vessel of FIG. 97 with a variation of the bottom lip of the partition silo;

FIG. 102 is a front view of the feeding vessel of FIG. 101;

FIG. 103 is a cross section view of the feeding vessel of FIG. 102, taken along section lines CIII-CIII of FIG. 102;

FIG. 110 is a front perspective view of another feeding assembly including an exemplary removable shield, according to the present invention;

FIG. 111 is a closeup view of area CXI of FIG. 110; and

FIG. 112 is a front perspective view of another feeding assembly including an exemplary removable integral shield, according to the present invention.

Figure 1:
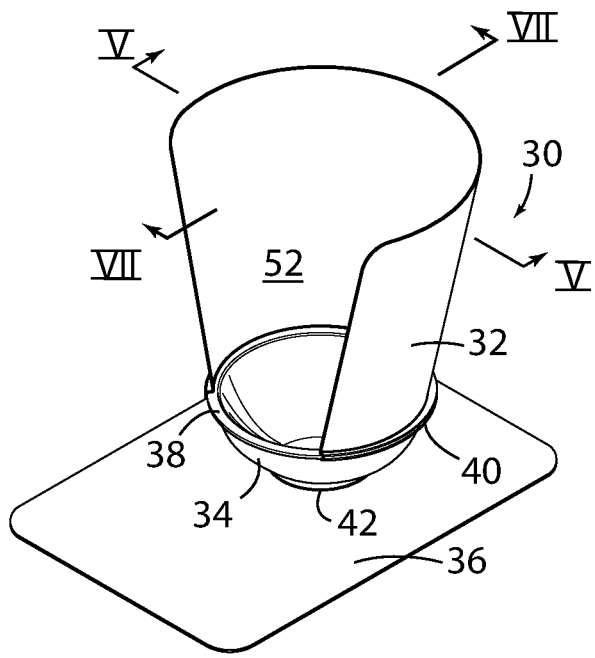
FIG. 1 is a perspective view of a feeding vessel assembly including an exemplary shield, according to the present invention.
Figure 2:
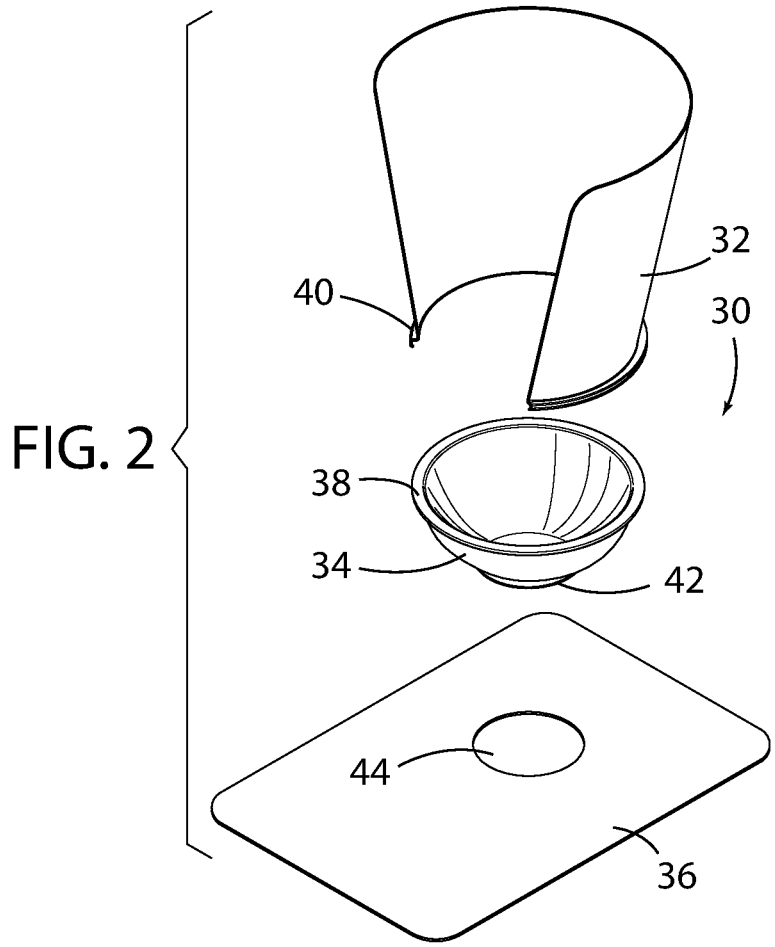
FIG. 2 is an exploded perspective view of a feeding vessel assembly including an exemplary shield, according to the present invention of FIG. 1.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Many animals, such as household pets, including but not limited to cats and dogs, often eat and drink out of vessels or bowls made for human use or bowls that have a similar shape to bowls made for human use. For many animals, use of such bowls results in food or water spilling over the sides of the bowl because the animal uses the side of the bowl to help get food/water into its mouth. Also, just normal head motions of the animal can lead to spillage because the sides of the bowl are not tall enough.

Keeping food in bowls is particularly difficult for flat-faced breeds of cats and dogs, known as brachycephalic breeds. Because they have flat faces, rather than a pointed snout, they have to rely on the sides of their feeding bowls as a surface to help them push food into their mouths. This results in food spillage and difficulty eating. The present embodiments provide food vessels and accessories that can help animals get food into their mouths and keep unconsumed food in the bowls. The present vessels are thus configured to prevent food from spilling out of the bowl and to assist animals to get food into their mouths.

According to one approach of the present embodiments, a bowl is provided having an elongated back and sides. The front of the bowl is lower than the back and sides of the bowl. The front of the bowl is high enough to contain dry or wet food, preventing the food from spilling onto the floor. The back and sides of the bowl are configured to be high enough to allow an animal to push their food around during consumption without spillage. In one embodiment, the back and sides can be approximately twelve inches high, but may be higher to conform to the intended animal breed for the vessel. The height of the sides should be close to the height of the animal's shoulders when sitting upright—because that is the height of the animal's head when it comes up from scooping food into their mouths.

The bottom of the bowl can be flat or rounded. The back and/or sides of the bowl may be straight or slanted towards the front of the bowl and create a funnel effect by tilting the back and sides towards the animal's mouth. This allows the animal to push food up against the taller side surface, lift their chins, and the pull of gravity then slides/drops the food into their mouths.

The present embodiments provide several features and advantages not known in the art.

The present food vessel is not an elevated stand for multiple food bowls. In one approach, it has no removable parts (i.e., it is a bowl with high sides and a high back). The tall back and sides of the present embodiments may also be slanted towards the center of the bowl (instead of being vertical). Also, the sides and back are all the same height, rather than slanted towards the front of the bowl, such as one where the sides are slanted lower in height than the back as it approaches the front of the vessel. The present embodiments do not have an automatic closure in the front that can be easily opened by the animal; nor does it have a cover at the top.

The present embodiments may be formed from a variety of materials. If the bowl is one piece including the shield, it can be made from a variety of materials such as plastic, various metal compositions (e.g., stainless steel, and the like), glass, ceramic, stoneware, silicone, acrylics, wood, deformable compositions (e.g., rubber), and the like. The present embodiments and any of its optional components may be clear (transparent) or various degrees of opaqueness/translucence in any combination. Optional features can include a rubber layer (or a tacky/sticky/adhesive base material) on the bottom surface to reduce sliding on the floor when in use. Optionally, the present embodiments may also include weights in the bottom to prevent the bowl from tipping over if the vessel is not made of a heavy material.

According to one approach where a prior art vessel is provided, a detachable shield can be provided. The shield could be configured to stand at least 12 inches off the floor or the bowl when installed in the food vessel. The detachable shield may be made of a material that is flexible and can take on the shape of the food vessel and allow attachment to the rim of the vessel. Such materials may include plastic, metal, or any flexible/deformable material. Even though the material is deformable, it must be remain upright while in use (i.e., when the animal is feeding from the vessel) and strong enough that it will not fold over if the animal pushes their face up against it when getting food into their mouths.

The detachable shield may be attached to the already-existing food bowl with an adhesive (removable/pressure sensitive adhesive or permanent adhesive), a suction cup configuration (i.e., a user wets the material and it retains a suction force to remain adhered to the vessel), clips, hook and loop fasteners (such as one sold under the tradename VELCRO), or has a lip shaped to match the rim of the feeding vessel to allow it to snap into place. The detachable shield may be attached on the inside of the bowl or on the outside of the bowl. Attachment inside the bowl would be preferred to reduce potential gaps of space between the food bowl and the shield and would allow the wall of the vessel to provide support to the shield when in use. The detachable shield can be disposable and formed from a variety of deformable materials such as plastic, paper (e.g., cardboard), rubber, and the like.

The detachable shield may be adjustable/trimmable to adjust to the diameter of the food bowl already owned. The adhesive would provide a snug fit to the sides of the bowl so food cannot fall in between the holder and the bowl.

Accordingly, the present embodiments provide a shied that should be at least 12 in. high all the way around, except for the front of the bowl (so the animal can walk up to the bowl and stick their head into the food). The tall shield does not go around the entire circumference of the bowl, but rather approximately ¾ around the bowl, leaving part of the bowl without a shield so the animal's face will be able to access the food in the bowl.

Figure 3:
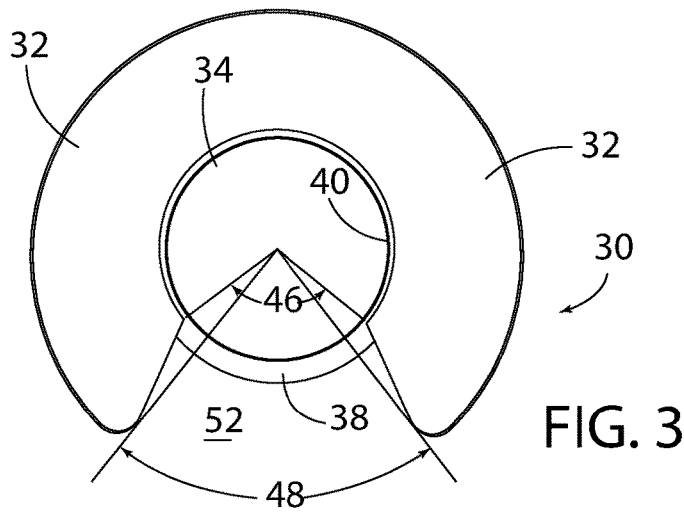
FIG. 3 is a top view of a feeding vessel assembly including an exemplary shield, according to the present invention of FIG. 1.
Figure 4:
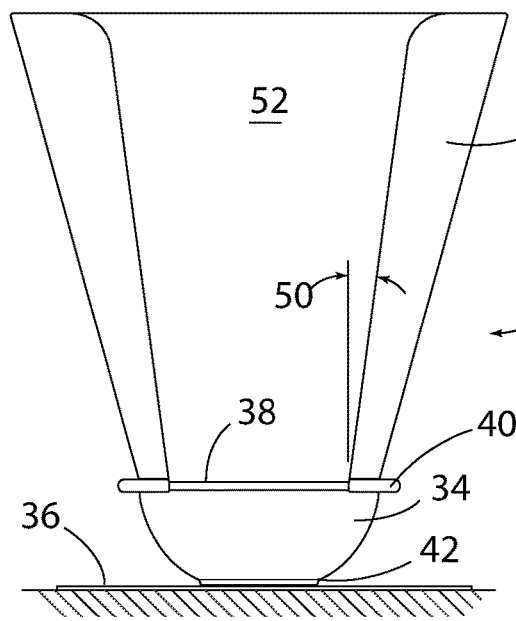
FIG. 4 is a front view of a feeding vessel assembly including an exemplary shield, according to the present invention of FIG. 1.
Figure 5:
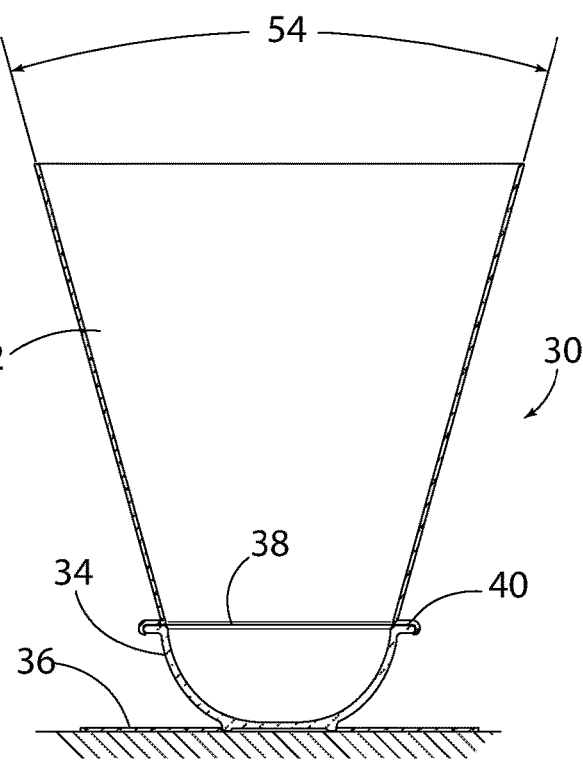
FIG. 5 is a cross-sectional front view of a feeding vessel assembly including an exemplary shield, according to the present invention of FIG. 1 taken along lines V-V in FIG. 1.
Figure 6:
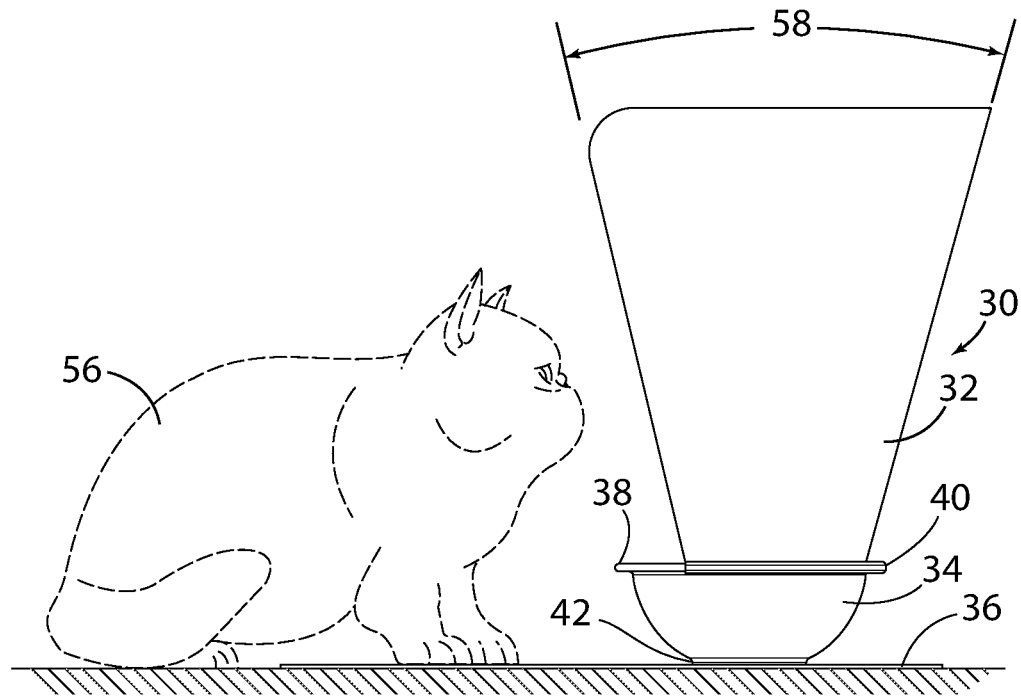
FIG. 6 is a side view of a feeding vessel assembly including an exemplary shield, according to the present invention of FIG. 1.
Figure 7:
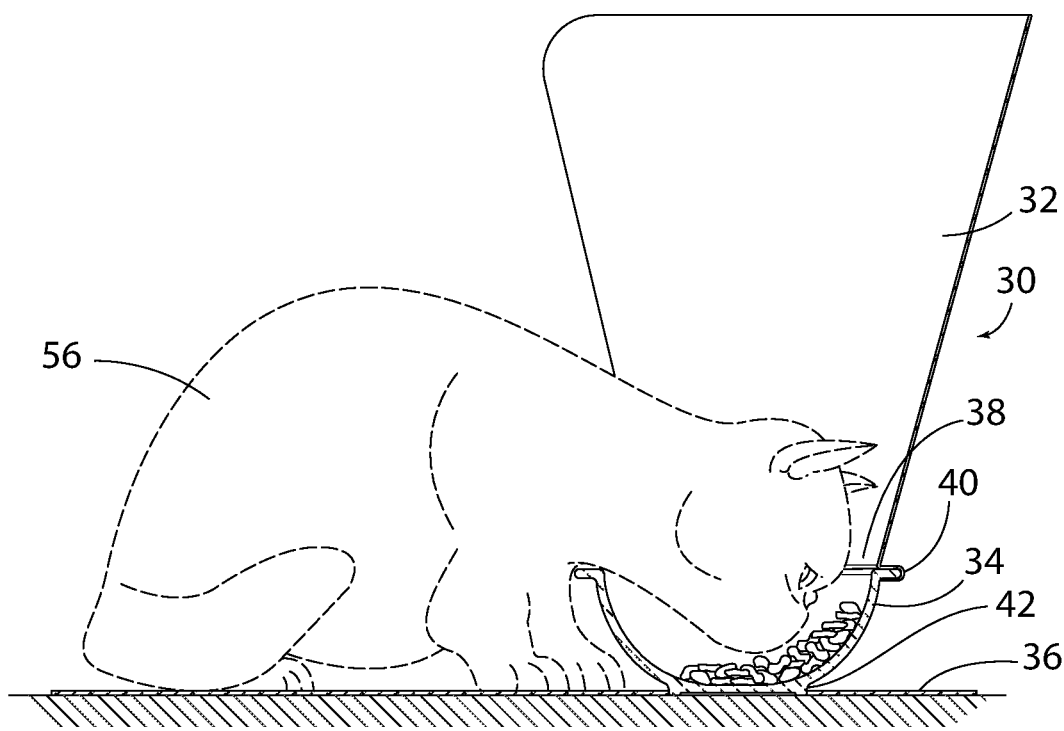
FIG. 7 is a cross-sectional side view of a feeding vessel assembly in use including an exemplary shield, according to the present invention of FIG. 1 taken along lines VII-VII in FIG. 1.
Figure 8:
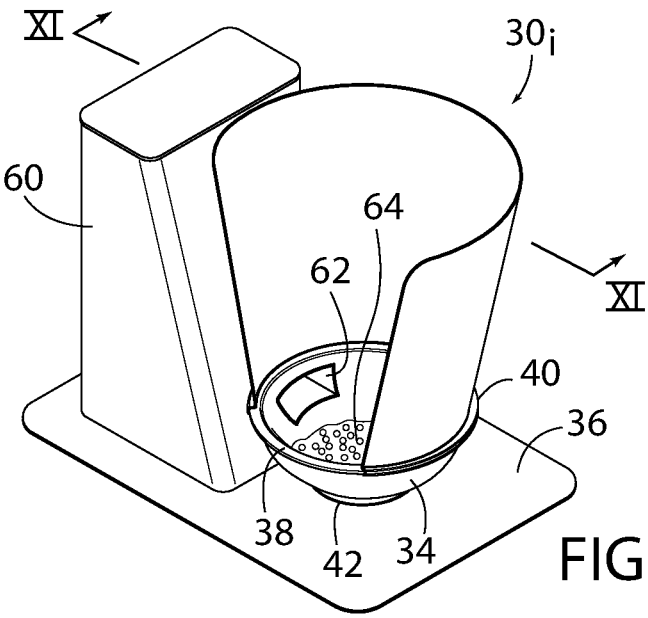
FIG. 8 is a perspective view of another feeding vessel assembly including an exemplary shield, according to the present invention.

Turning to the figures, FIGS. 1-7 show one approach to the present embodiments. A feeding Vessel Assembly 30 can have a shield/collar/apron ("shield") 32, which is detachable from a feeding vessel 34. Shield 32 can attach to a feeding vessel rim 38 by a deformable shield lip configured to match feeding vessel rim 40. A non-skid pad 36 can optionally be provided to reduce sliding of the animal and/or the feeding vessel while in use and to also keep a pet owner's floor clean. A feeding vessel bottom flange 42, which can also include weights to stabilize the assembly further, can be configured to be received by a pad opening 44. Pad opening 44 can be configured to receive a portion (including all) of feeding vessel bottom flange. Weight can range up to about 3 or 4 pounds. As mentioned herein, the shield does not cover the entire circumference of the rim of feeding vessel 34, but is provided with an opening 52 to allow an animal 56 to access the contents of the feeding vessel. As shown in FIGS. 4 and 5 a lower shield opening 46 can be in the range of 30-180 degrees; upper shield opening 48 can be in the range of 30-180 degrees; side taper 50 of shield 34 can be in the range of −45 to 80 degrees. A shield opening flare 54 can be in the range of −45 to 170 degrees (preferably about 30 to 90 degrees and most preferably about 35 degrees), and a shield taper 58 can be in the range of −45 to 170 degrees (preferably about 30 to 90 degrees and most preferably about 35 degrees). It is noted that within this range, the shield can be vertical.

Figure 9:
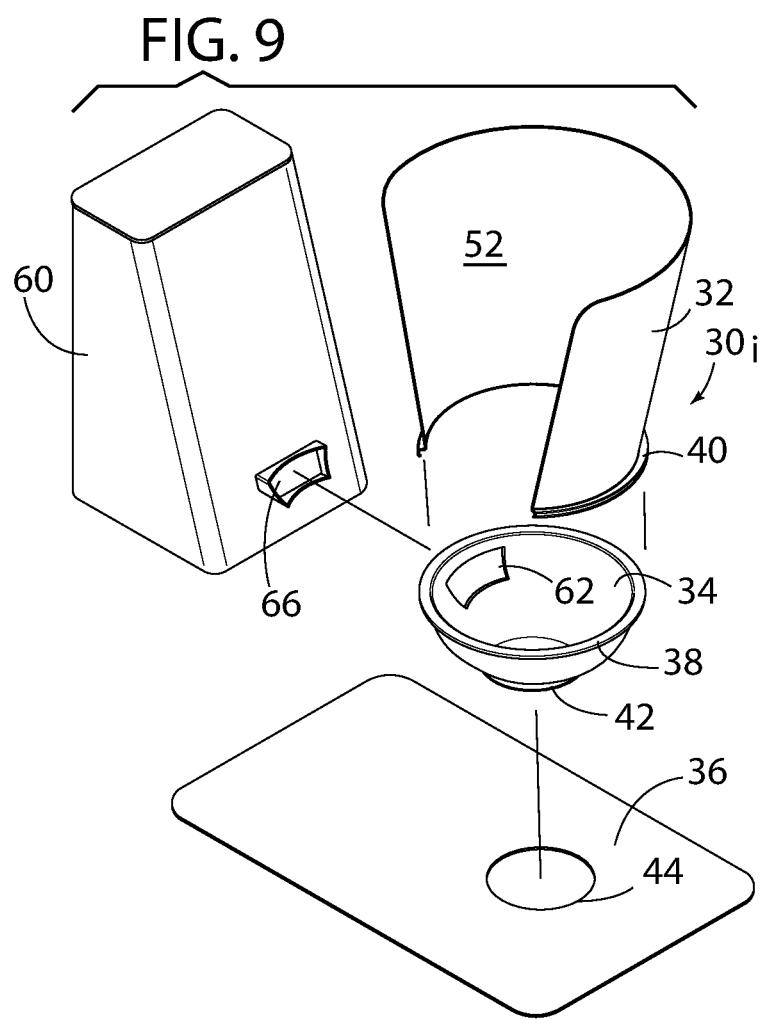
FIG. 9 is an exploded perspective view of a feeding vessel assembly including an exemplary shield, according to the present invention of FIG. 8.
Figure 10:
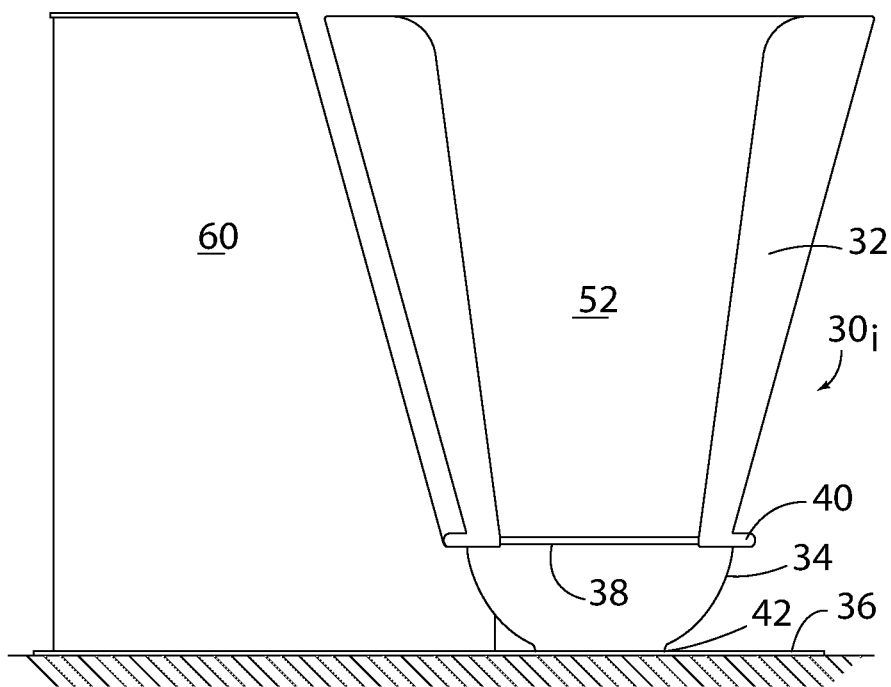
FIG. 10 is a front view of a feeding vessel assembly including an exemplary shield, according to the present invention of FIG. 8.
Figure 11:
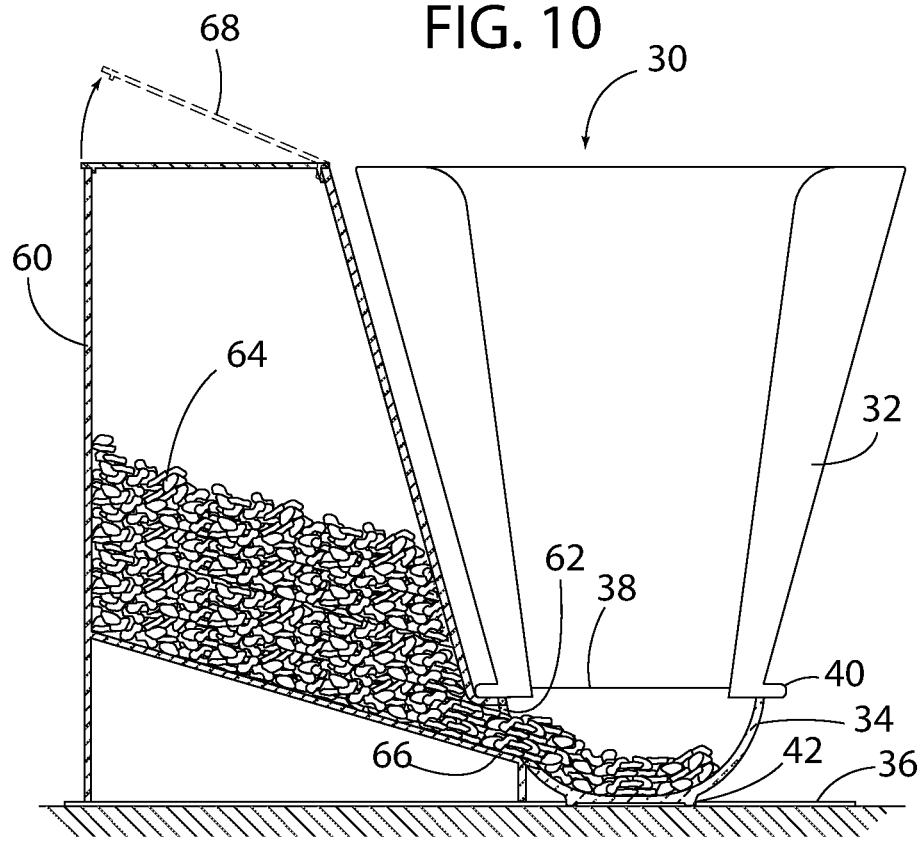
FIG. 11 is a cross-sectional front view of a feeding vessel assembly including an exemplary shield, according to the present invention of FIG. 8 taken along lines XI-XI in FIG. 8.
Figure 12:
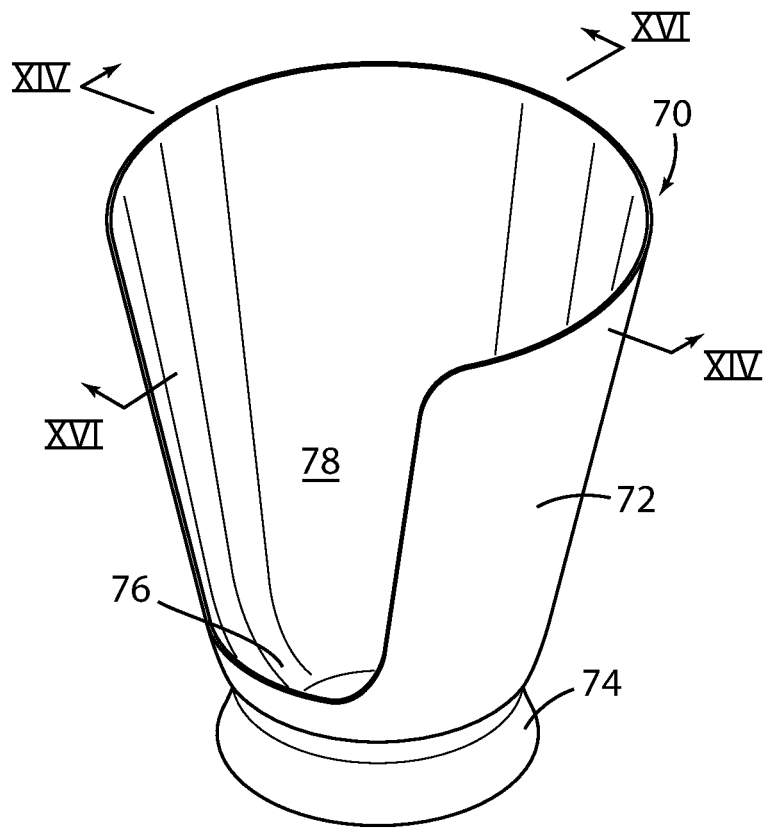
FIG. 12 is a perspective view of another feeding vessel including an integral exemplary shield, according to the present invention.
Figures 13, 14:
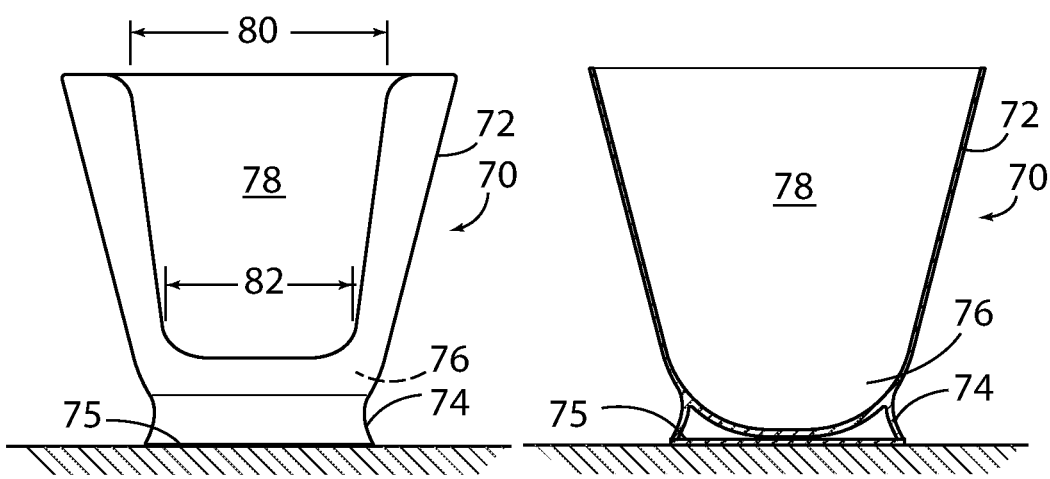
FIG. 13 is a front view of a feeding vessel including an exemplary shield, according to the present invention of FIG. 12.
FIG. 14 is a cross-sectional front view of a feeding vessel including an exemplary shield, according to the present invention of FIG. 12 taken along lines XIV-XIV in FIG. 12.
Figure 15:
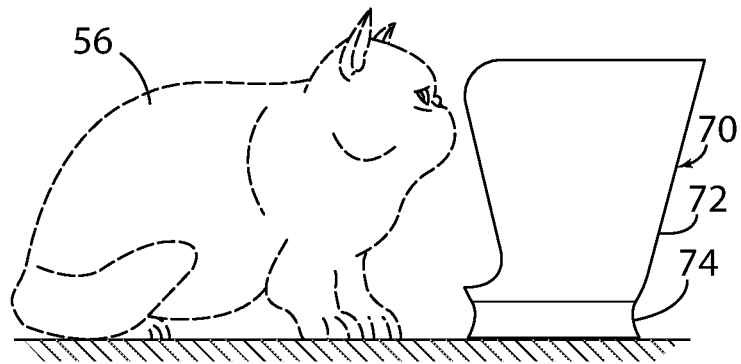
FIG. 15 is a side view of a feeding vessel assembly including an exemplary shield, according to the present invention of FIG. 12.
Figure 16:
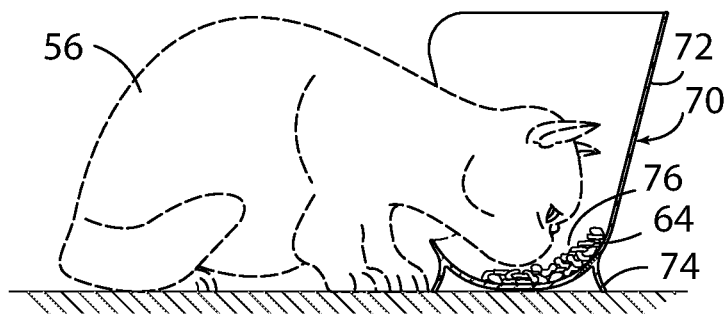
FIG. 16 is a cross-sectional side view of a feeding vessel assembly in use including an exemplary shield, according to the present invention of FIG. 12 taken along lines XVI-XVI in FIG. 12.

FIGS. 8-11 show another approach to the present embodiments. In this assembly, an optional food dispenser 60 is provided having a feeding vessel opening 62 to receive food from food dispenser opening 66 (FIG. 9). Here feed/food/liquid 64 can travel through food dispenser opening 66. FIG. 11 shows a food dispenser top hinged lid 68.

FIGS. 12-16 show another approach to the present embodiments. In this assembly a feeding vessel 70 as an integrated shield 72 and a base 74. An optional rubber layer or other adhesive or antiskid layer 75 can be supplied where the base meets the floor. It is noted though that any of the embodiments described herein can have this antiskid feature. Feeding vessel 70 has a cavity to receive food/liquids 76 and an opening 78 for the animal to access the contents of the cavity. In this one piece embodiment, top opening dimension 80 and bottom opening dimension 82 can be in the proportional ratio ranges of 1:2 to 1:1 to 2:1 (i.e., the top can be in the range of half or double the dimension of the top opening dimension).

Figure 17:
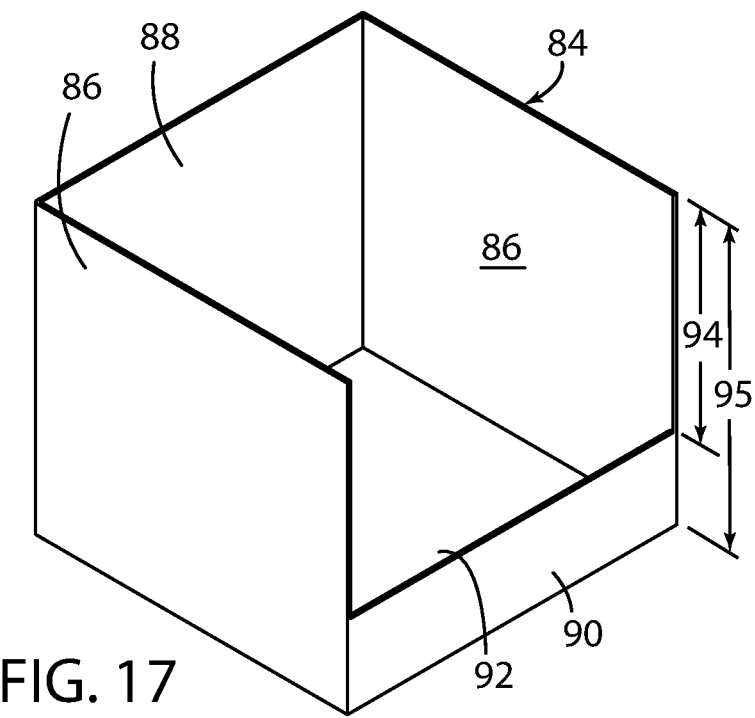
FIG. 17 is a perspective view of another feeding vessel including an exemplary shield, according to the present invention.

FIG. 17 shows another approach to the present embodiments. In this assembly a cuboid or rectilinear feeding vessel is provided having a feeding vessel with shield 84 having side shields 86, a back shield 88, and a front shield 90 to form a cavity 92 to contain food/water. In this embodiment front shield height 92 can be in the range of 10 to 90 percent of side shield height 95. As mentioned above side shield height 95 is preferably at least 12 inches above floor level. It is noted that the embodiment of FIG. 17 may also be configured in a variety of other ways, for example in the front 90 and sides (86 and 84) do not need to be planar, but could be curved toward the front so they connect to front shield 90, but still configured so that there is just enough room for the animal's head. (Cf., FIG. 22 where it could be an angular version like this, with the pieces in the front)

FIGS. 18-21 show another approach to the present embodiments. In this approach, an animal owner may already have a feeding vessel 96 to which the animal is accustomed. In this instance a deformable shield 100 can be provided having a shield wall 102 and an adhesive layer 104 (e.g., a pressure sensitive adhesive) to attach to the feeding vessel interior or exterior wall 98. Shield 100 can deform to match the contours of feeding vessel 96 and can be made of a material, such as a rigid but deformable plastic, rubber or cardboard that can even be trimmed to allow for an adequate opening for the animal to access the contents of the feeding vessel. It is noted that shield 100 can be cut in two (for example) to fit to the sides of an automatic feeder to prevents the shield from blocking food from being dispensed by the automatic feeder.

FIGS. 22 and 23 show cylindrical feeding vessel 106 including an integral exemplary shield 107, according to the present invention according to another approach. In this embodiment, the feeding vessel has an integral shield and is configured to have parallel sides 110 and parallel edges 108 to opening 114 for an animal to access the feeding vessel cavity 120. In other words, in this embodiment, the diameter 110 of feeding vessel is the same from top to bottom. Similarly, the opening 112 and feeding vessel back wall are also parallel. A front portion side height 116 can be approximately 10 percent of the height of feeding vessel and shield 118. This embodiment can also have a cavity 120 that is defined by a curved wall sloping sides as shown at 122. This shield can also be designed so that it too flares outward. It can rise vertically such as shown in the figure, but within the scope of the present embodiments some approaches can have a shield flares out like the bowls shown herein (See e.g., FIG. 6.) and have an adhesive at its bottom, such as a pressure sensitive adhesive.

FIGS. 24 and 25 show optional disposable liners that can be applied for example to the feeding vessel of FIG. 1 prior to attaching shield 32 around vessel 34 lip 38. Also, FIG. 25 shows an exemplary liner that can be installed on, for example, the feeding vessel of FIG. 12 or as shown as feeding vessel 134.

Specifically, FIG. 24 is a front perspective view of a feeding vessel disposable liner 124 for a feeding vessel 34. Liner portion 126 is configured to line the interior cavity of the feeding vessel 34; the liner can be optional held in place by and elastic band 128 or other attachment means such as pressure sensitive adhesives, clips, hook and loop fasteners and the like. The elastic band would not be needed to hold the liner in place if it is installed prior to attaching shield 32 to feeding vessel 34 via lip 440 onto rim 38. Once installed, liner portion 130 lines the interior of vessel cavity while liner portion 132 extends beyond elastic band to allow a pet owner to allow disposal of liner material FIG. 25 is a front perspective view of a for a feeding vessel according to another approach to the present invention. As shown, feeding vessel can have an integral shield 134; a feeding bowl portion 136; feeding vessel bottom flange 138; feeding vessel cavity 139; feeding vessel with integral shield disposable liner 140; liner portion to cover shield 142; liner portion to line interior of vessel cavity 144; elastic band 146; and liner portion 148 extending beyond elastic band to allow a pet owner to allow disposal of liner material. Liner portion 142 may optionally have pressure sensitive adhesive to hold the liner to the shield portion 141. The liner portion may also attach to the back shield only and one version may attach to the side shields as well. It is noted though that clips, hook and look fasteners could also be used. According to another approach, the disposable liner can conform to the embodiments of FIG. 22 and FIG. 17 that can be made from cardboard, for example, that can be placed inside an already existing bowl. It can come in small, medium, and large sizes to fit an already existing bowl or it can be adjustable. A reusable liner can also be configured according to another approach in the shape of the embodiment of FIG. 22 whereby the liner is placed into an already existing bowl and can be taken out to be cleaned.

Figure 26:
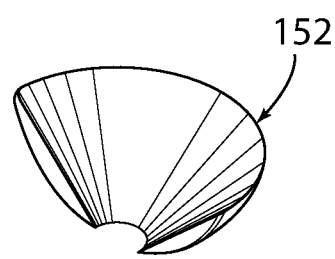
FIG. 26 is a front perspective view of a disposable ramp/liner for a feeding vessel according another approach.
Figure 27:
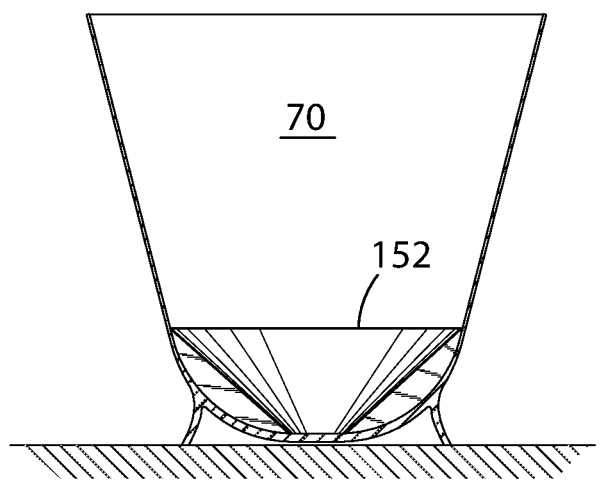
FIG. 27 is a front planar sectional view of a disposable ramp/liner for a feeding vessel according to FIG. 26.

FIG. 26 is a front perspective view of a disposable ramp/liner 152 for a feeding vessel according another approach. This ramp can be added to any feeding vessel to provide an increased and removable ramp. FIG. 27 shows a planar sectional view of disposable ramp/liner 152 installed in an exemplary a feeding vessel 70.

Figure 28:
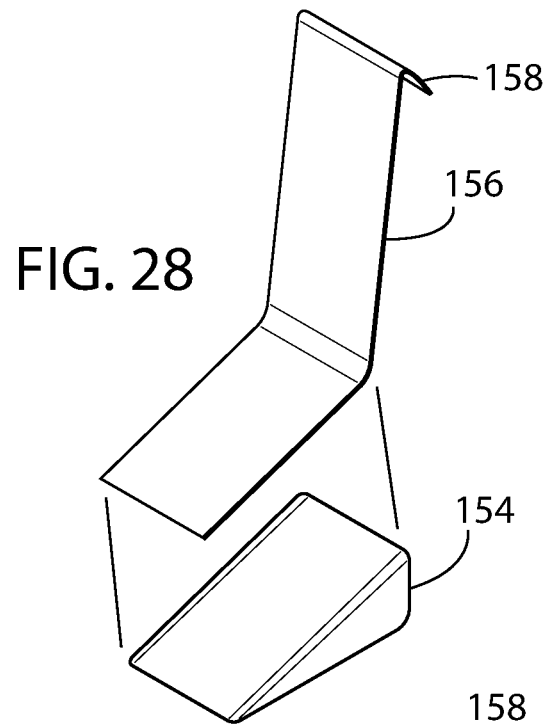
FIG. 28 is a front perspective view of an optional disposable wedge and protective cover for a feeding vessel according to one approach to the present invention.
Figure 29:
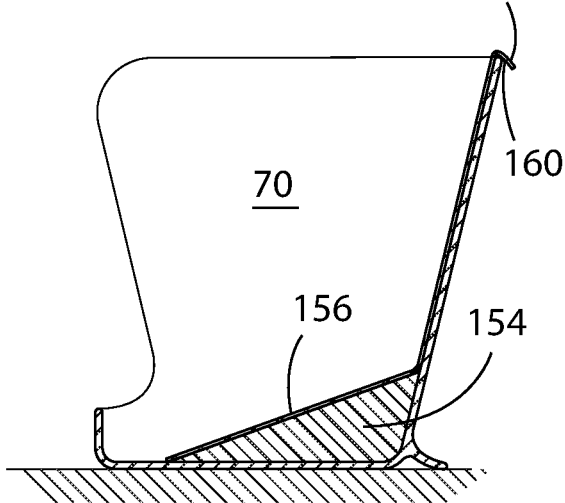
FIG. 29 is a side planar sectional view of the optional disposable wedge and protective cover according to FIG. 28.

FIG. 28 shows a front perspective view of an optional disposable wedge e.g., disposable and or removable) 154 and protective cover 156 for a feeding vessel according to one approach to the present invention. As shown in FIG. 29, the optional disposable wedge 154 and optional protective cover 156 may also be placed in an exemplary feeding vessel 70 to increase the ramp angle. As shown, foldable flap 158 for the optional protective cover 156 can be wrapped over feeding vessel shield top 160.

Figures 30, 31:
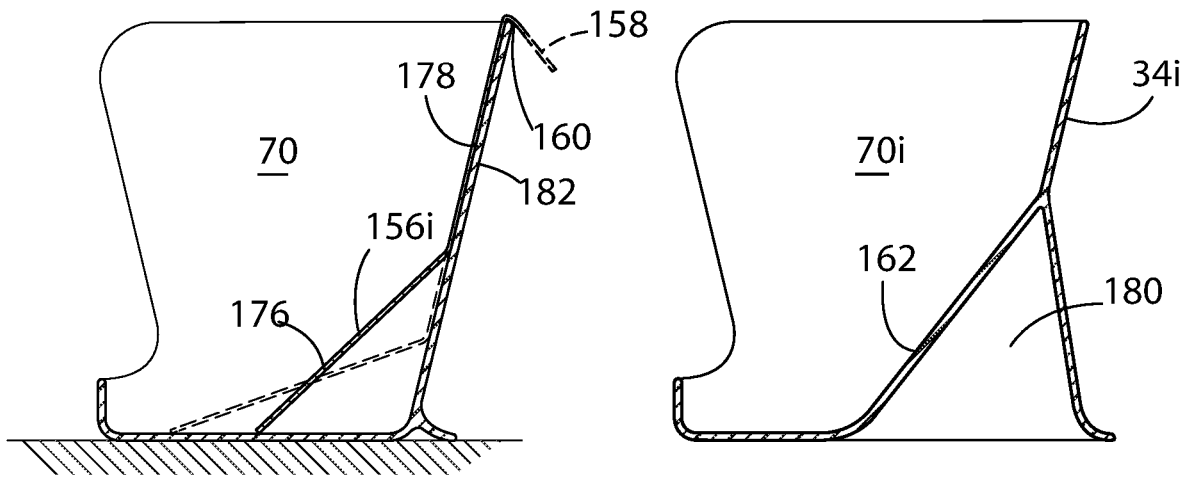
FIG. 30 is a side planar sectional view of an optional protective cover.
FIG. 31 is a side planar sectional view on an injection molded feeding vessel according to another approach.

FIG. 30 is a side planar sectional view of an optional protective cover according to another approach. In this embodiment, protective cover 156i can made from rigid but deformable material (such as a thin aluminum plate (about 1 mm thick)) disposed along a back wall 182 of shield 70 that can be folded over 158 the top of shield 160. Lower portion 176 of protective cover 156i can be made from a more rigid material such as a thick aluminum plate (e.g., >1 mm) or rigid plastic or even wood. In use, a user may adjust the height and angle of lower portion 176 by lifting fold over portion 158 to the desired height and folded along the top of shield top 160.

FIG. 31 is a side planar sectional view on an injection molded feeding vessel according to another approach. In this embodiment, feeding vessel 70 can be formed by a single piece injection molding process and have a void are 180 between the outside of the vessel and integral ramp 162.

Figure 32:
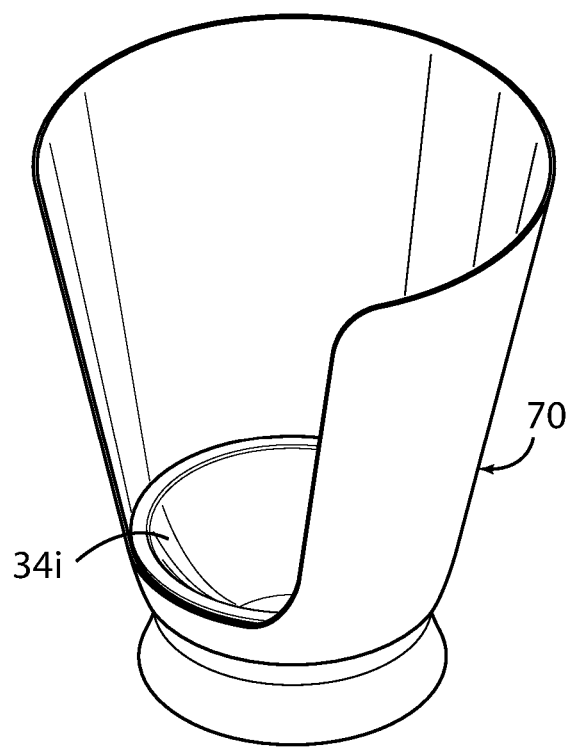
FIG. 32 is a front perspective view of a feeding vessel according another approach configured to receive a feed bowl.

FIG. 32 shows a front perspective view of a feeding vessel according another approach. In this embodiment, a removable bowl 34i can placed within feeding vessel with shield 70. It is noted though that adding bowl 34i can be configured for placement within any of the feeding vessels.

Figure 33:
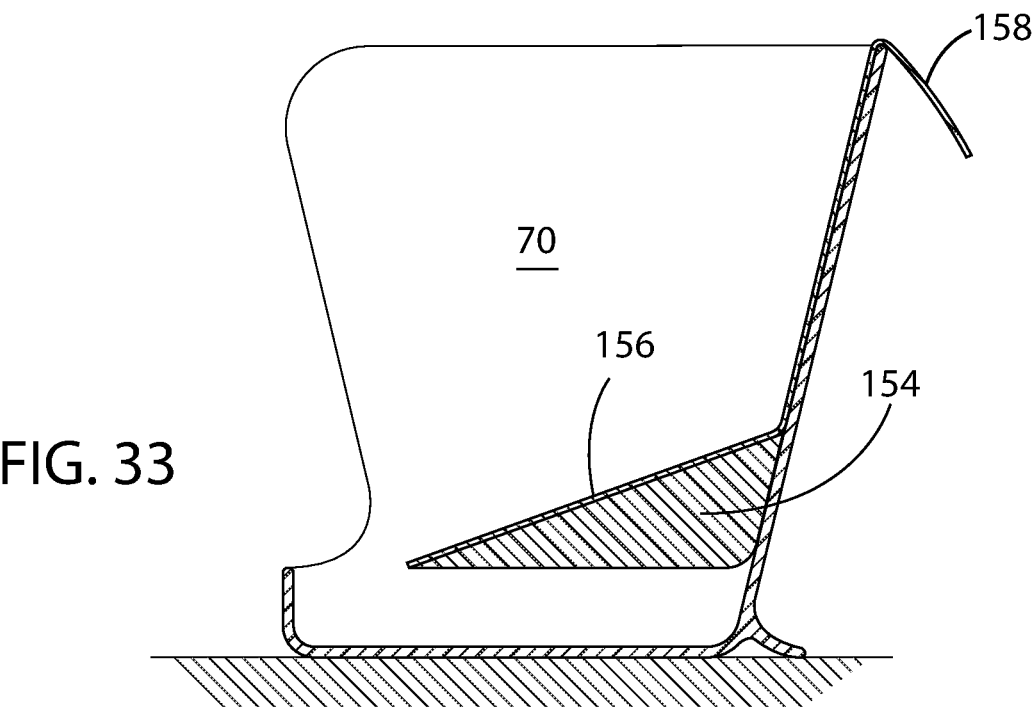
FIG. 33 is a side planar sectional view of the optional disposable wedge and protective cover according to FIG. 28 elevated above the bottom of the bowl.

FIG. 33 is a side planar sectional view of the optional disposable/removable wedge and protective cover according to FIG. 29 elevated above the bottom of the bowl.

Figure 34:
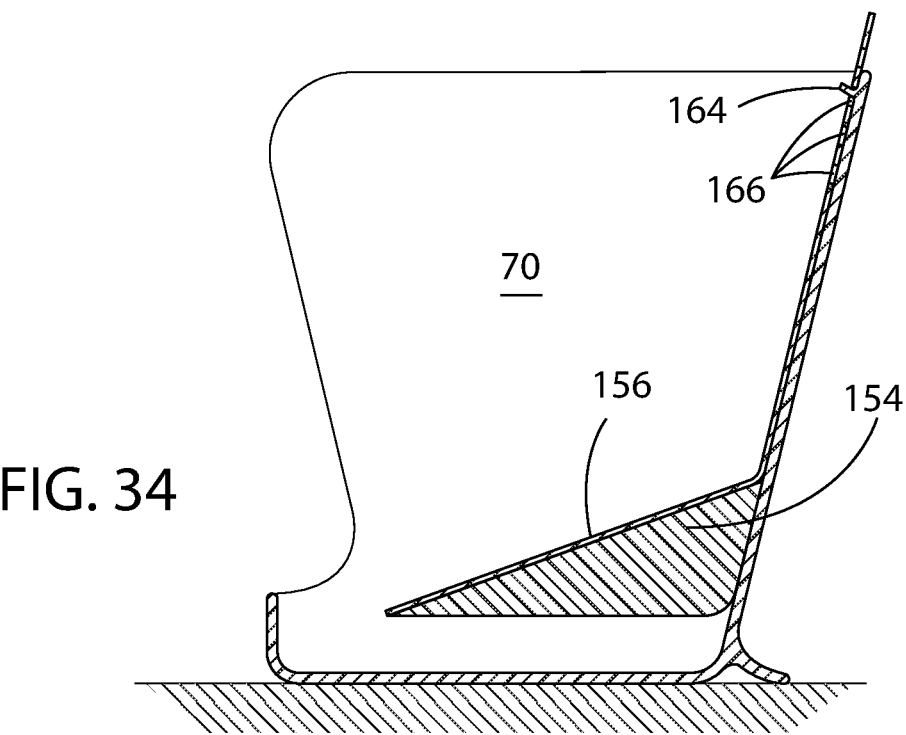
FIG. 34 is a side planar sectional view of the optional disposable wedge and protective cover according to a feeding vessel according to one approach to the present invention having a hook and the protective cover having openings to receive the hook.

FIG. 34 is a side planar sectional view of the optional disposable wedge and protective cover according to a feeding vessel according to one approach to the present invention having a hook 164 and the protective cover 156 having openings 166 to receive the hook. According to this approach, the user may raise and lower wedge 154 to a desired height.

Figure 35:
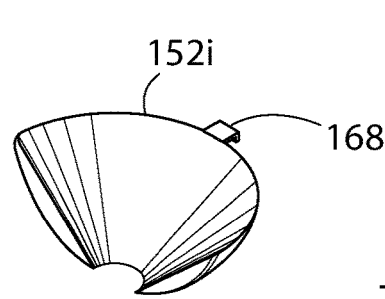
FIG. 35 is a front perspective view of a disposable ramp/liner for a feeding vessel according another approach having a hook.
Figure 36:
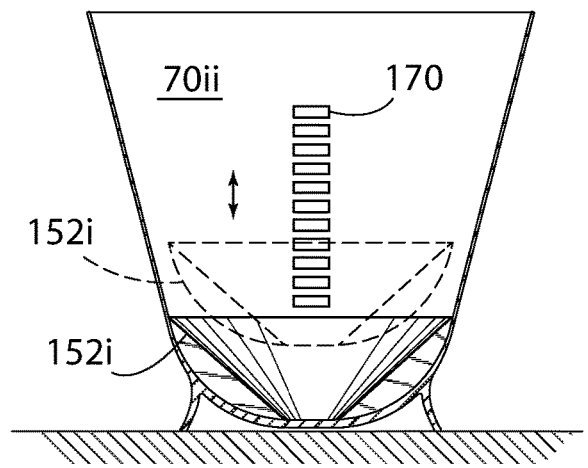
FIG. 36 is a front planar sectional view of a disposable ramp/liner for a feeding vessel according to FIG. 35, with the feeding vessels having openings to receive the hook.

FIG. 35 is a front perspective view of a wedge 154i for a feeding vessel 70i according another approach. This ramp 152i can be added to any feeding vessel to provide an increased and removable ramp using hook 168 to any of the openings 170 of feeding vessel 70i as shown in FIG. 36.

Figure 38:
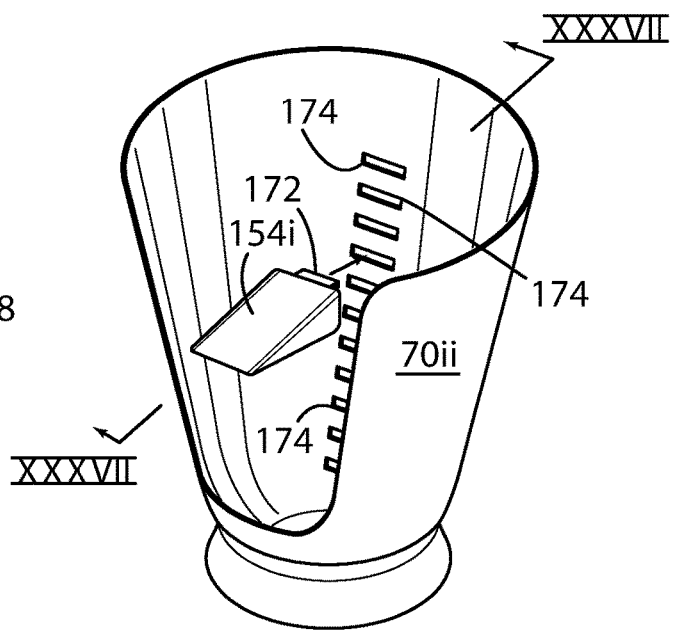
FIG. 38 is a perspective view of an optional disposable wedge to a feeding vessel according to one approach to the present invention having a wedge hook and the feeding vessel having openings to receive the wedge hook.
Figure 37:
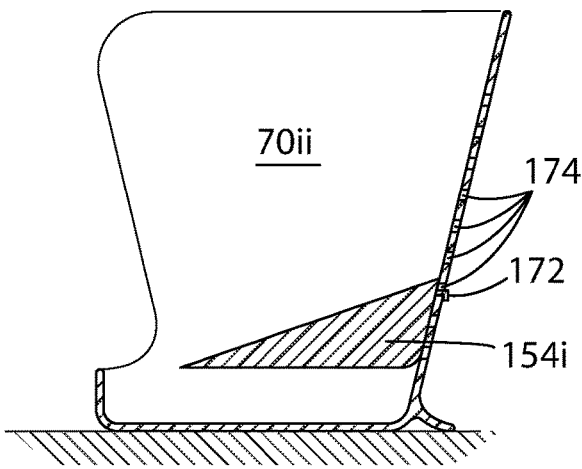
FIG. 37 is a side planar sectional view of the feeding vessel of FIG. 38 taken along section line XXXVII-XXXVII of FIG. 38.
Figure 39A:
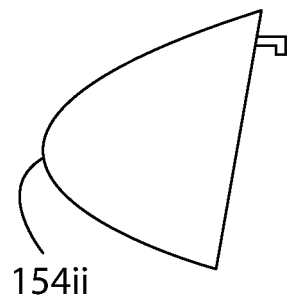
FIG. 39A is a side view of a wedge according to another approach.
Figure 39B:
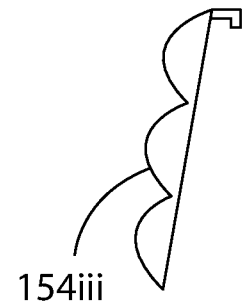
FIG. 39B is a side view of a wedge according to another approach.
Figure 39C:
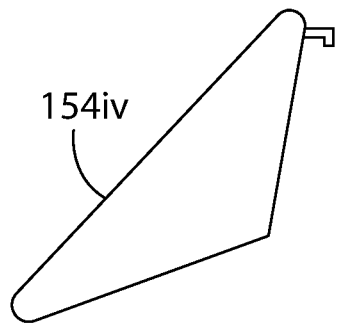
FIG. 39C is a side view of a wedge according to another approach.
Figure 39D:
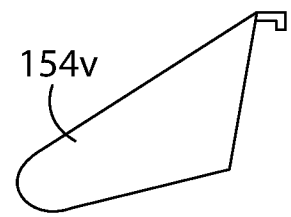
FIG. 39D is a side view of a wedge according to another approach.

FIG. 38 is a perspective view of an optional disposable wedge 154i to a feeding vessel 70i according to one approach to the present invention having a wedge hook 172 and the feeding vessel 70i having openings 174 to receive wedge hook 172. FIG. 37 is a side planar sectional view of the feeding vessel of FIG. 38 taken along section line XXXVII-XXXVII of FIG. 38. In one approach, a plastic mold for a bowl may have an integral wedge that is part of the mold that just extends into the cavity of the bowl (See, e.g., FIG. 30).

FIG. 39A-D are side views of a wedge according to other approaches. The optional hook is shown for reference, though would only be needed in those embodiments with the shield openings.

Figure 40:
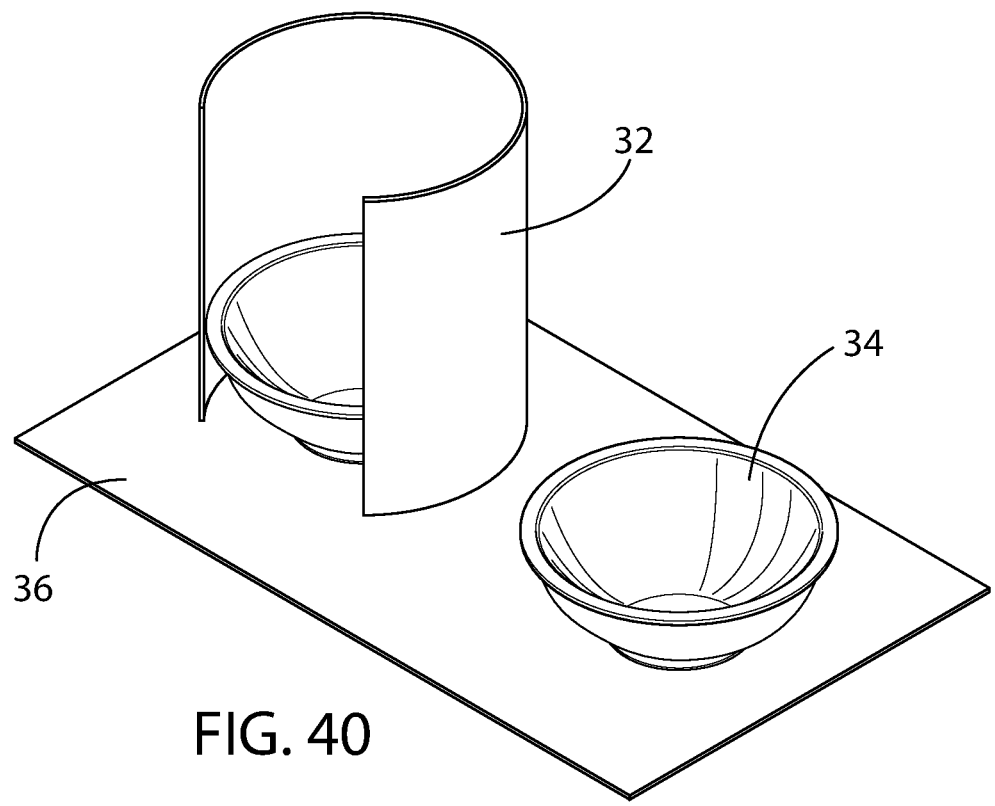
FIG. 40 is a perspective view of feeding vessel assembly including an exemplary shield, according to another approach.

FIGS. 40-112 provide additional approaches to the present embodiments. It is noted that the present embodiments may be used for liquid and solid foods. Accordingly, in some embodiments the bowl may be a water bowl. In some embodiments, the mat can be a single piece with no movable or removable parts.

It is also noted that although a removable bowl is shown, for example, in FIG. 32, other variations of the present embodiments may have no bowl inserted and the pet can just eat out of the shield itself. That is, the shield is the bowl. The detachable shield can be disposable and formed from a variety of deformable materials such as plastic, paper (e.g., cardboard), rubber, and the like. Liners may be used, such as shown in FIG. 25. The pad may also be disposable and formed from a variety of deformable materials such as plastic, paper (e.g., cardboard), rubber, non-skid surfaces and the like.

FIG. 40 is a perspective view of feeding vessel assembly including an exemplary shield, according to another approach showing a mat 36 with a shield 32 attached (fixed permanently or removable). A bowl 34 can slide into and out of the shield.

Figure 41:
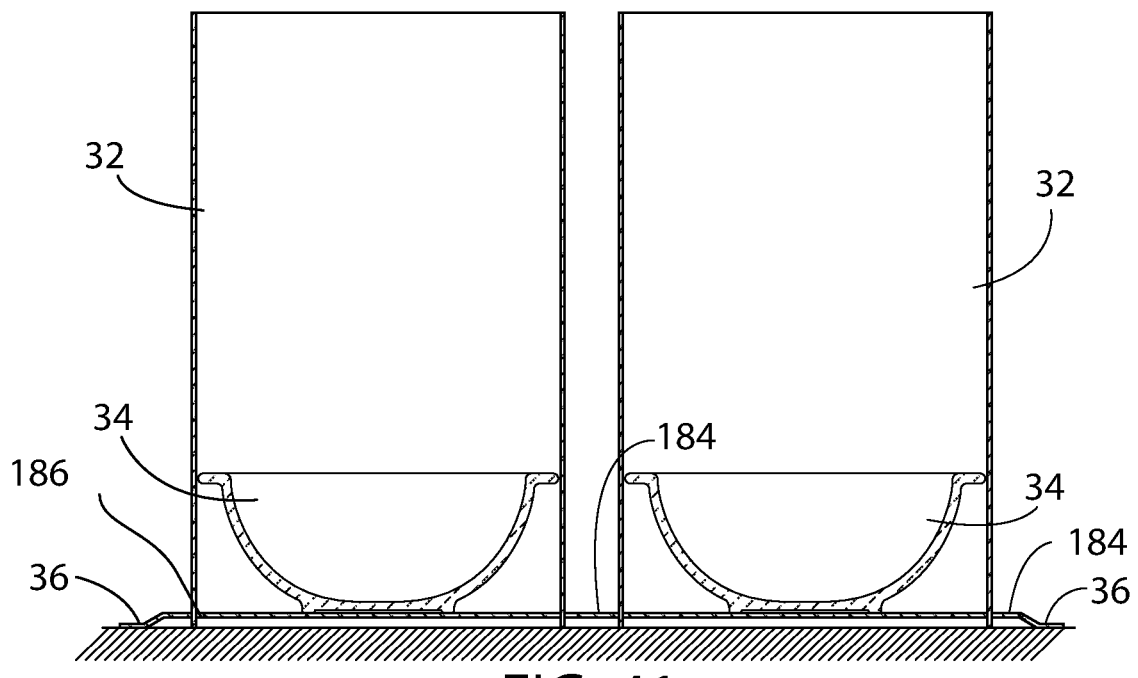
FIG. 41 is a cross-sectional front elevation view of the another feeding vessel assembly including multiple exemplary shields, according to the present invention of FIG. 43 taken along section lines XLI-XLI.
Figure 43:
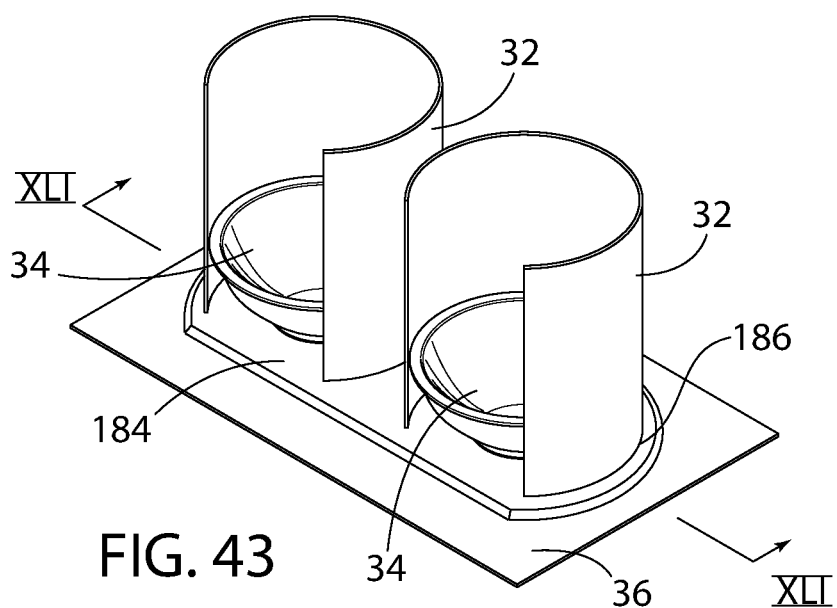
FIG. 43 is a perspective view of the feeding vessel assembly of FIG. 42.

FIG. 41 is a cross-sectional front elevation view of the another feeding vessel assembly including multiple exemplary shields, according to the present invention of FIG. 43 taken along section lines XLI-XLI. The figure shows a back portion a mat 36 with two removable or permanent shields 32 attached and bowls 34 inside the shields 32 on top of the mat 36. FIG. 41 also shows an slotted portion 186 of an elevated portion 184 of mat 36.

Figure 42:
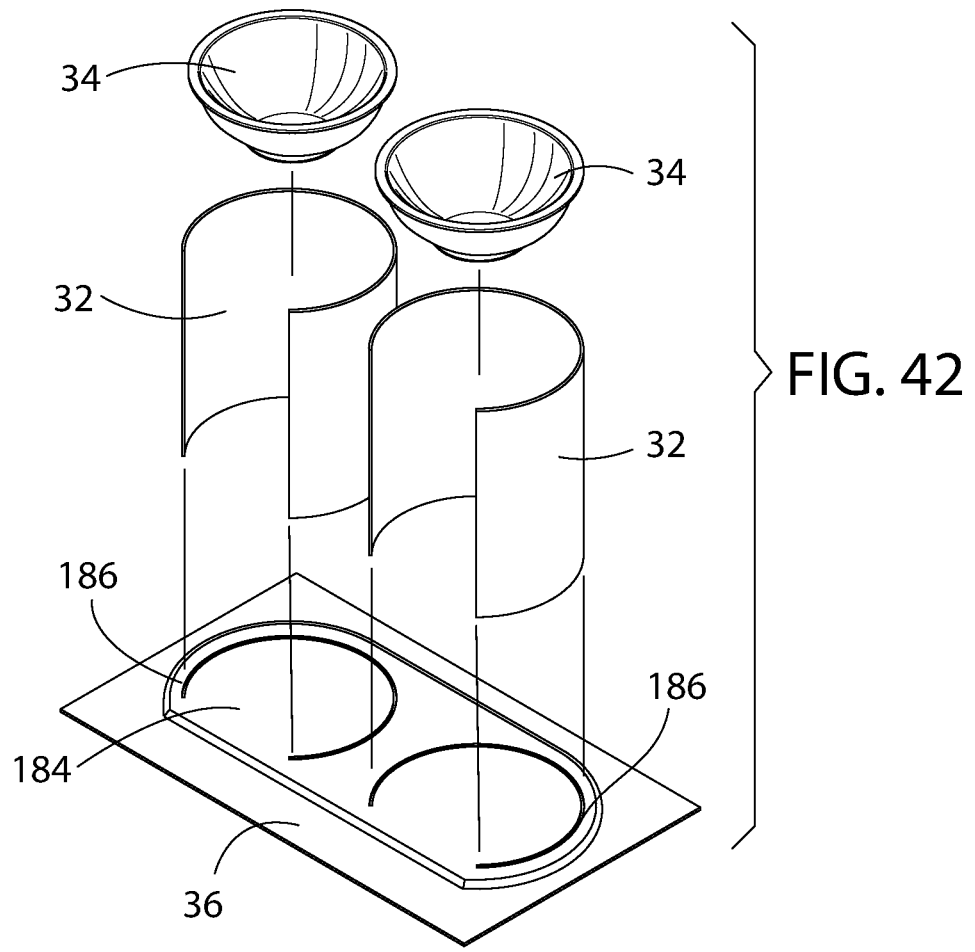
FIG. 42 is an exploded perspective view of feeding vessel assembly according to another approach including two exemplary shields mountable to a raised pad portion and bowls.

FIG. 42 is an exploded perspective view of a feeding vessel assembly according to another approach including two exemplary shields mountable to a raised pad portion and bowls. FIG. 42 shows the portion 184 of mat 36 section with slot/groove 186, The removable shields 32 fit into the slots 186. Elevated portion 184 is about ¼ inch to 1 inch higher than the mat 36 top surface.

FIG. 43 is a perspective view of the feeding vessel assembly of FIG. 42. Mat 36 has two shields 32 inserted into the slots 186 housing two bowls that can slide and in and out of the shields or up and out of the shields.

Figure 44:
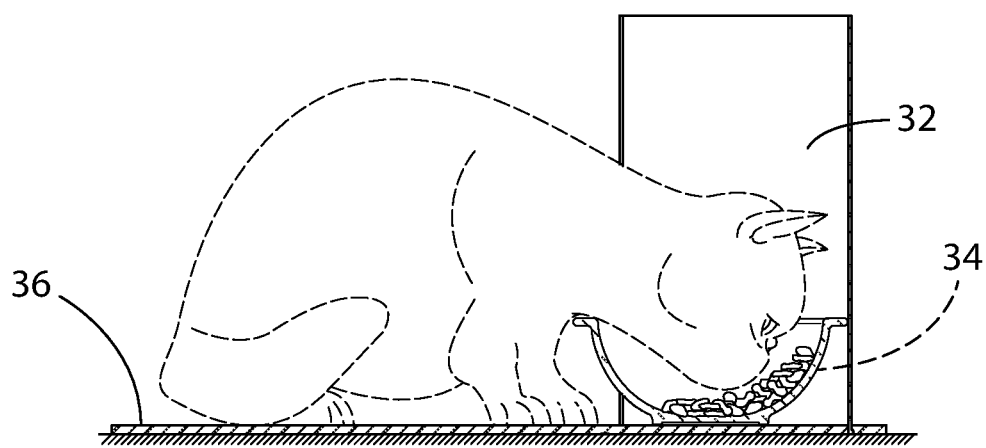
FIG. 44 is a cross-sectional side view of a feeding vessel assembly in use including an exemplary lipped shield, according to embodiment of FIG. 45.
Figure 45:
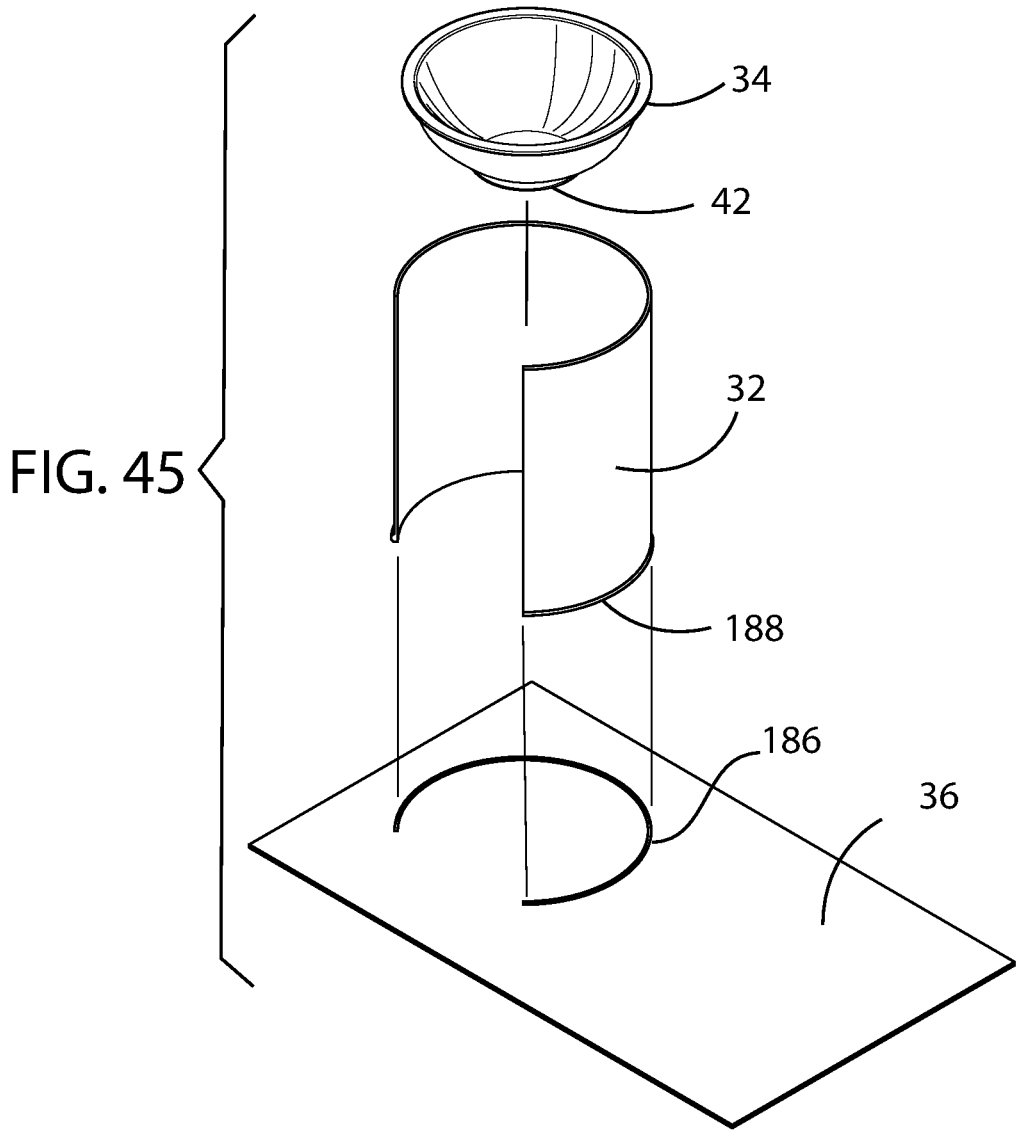
FIG. 45 is an exploded perspective view of feeding vessel assembly including an exemplary lipped shield, according to another approach present invention.

FIG. 44 is a cross-sectional side view of a feeding vessel assembly in use including an exemplary lipped 188 shield 32, according to embodiment of FIG. 45. The figure shows a side view of a pet eating out of a bowl on the mat 36. The front opening of the shield is wide enough to allow an animal to stick its head inside to access the food in the bowl. This can be about a 45 degree to 100 degree opening, preferably about 50 degree to 120 degree opening.

FIG. 45 is an exploded perspective view of feeding vessel assembly including an exemplary lipped 188 shield 32, according to another approach present invention. The figure shows A mat 36 with grooves, a removable shield that fits into the groove and a view of a bowl and how it fits in the shield on the mat.

Figure 46:
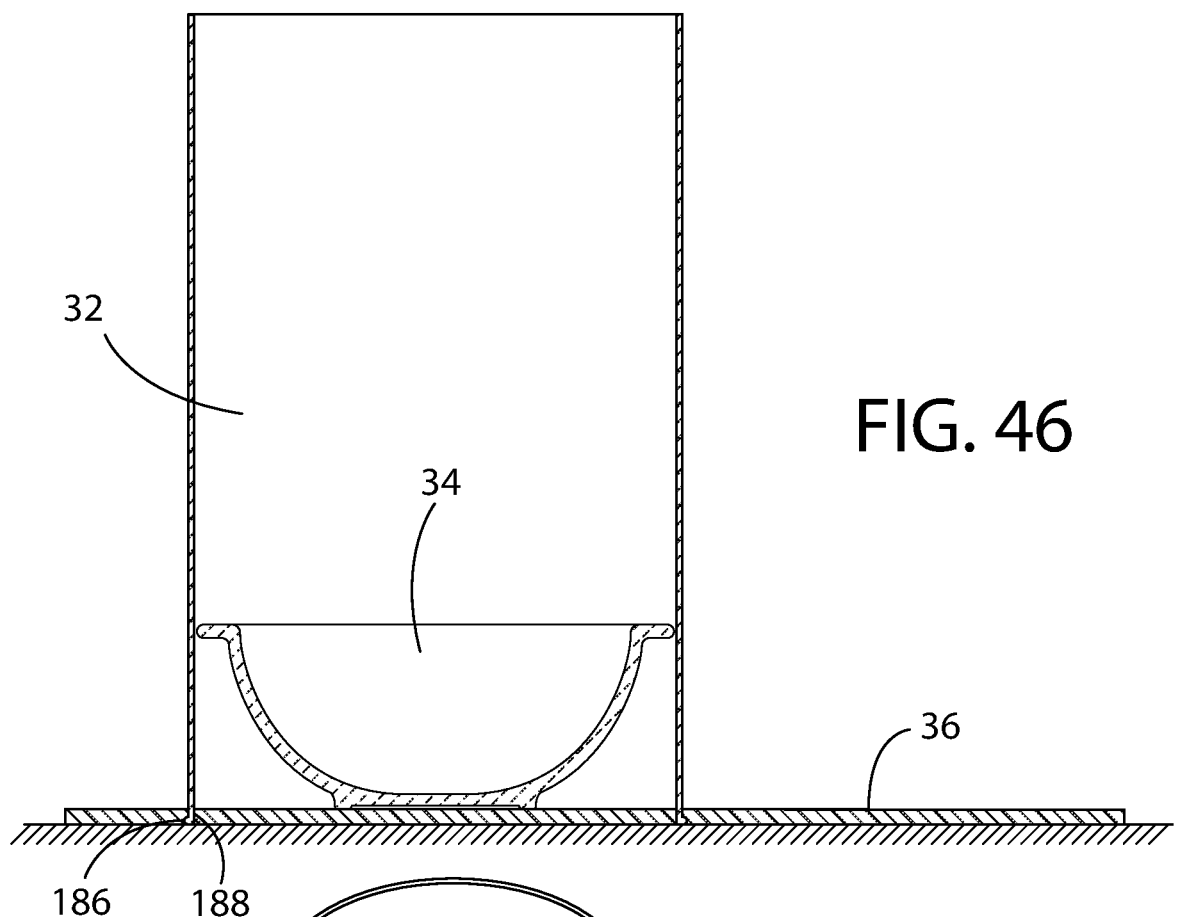
FIG. 46 is a cross-sectional front elevation view of the feeding vessel assembly of FIG. 45.

FIG. 46 is a cross-sectional front elevation view of the feeding vessel assembly of FIG. 45. The figure shows a mat 36 with one removable shield 32 attached to mat 36 through slot 186 by retaining lip 188 and a bowl 34 inside shield 32.

Figure 47:
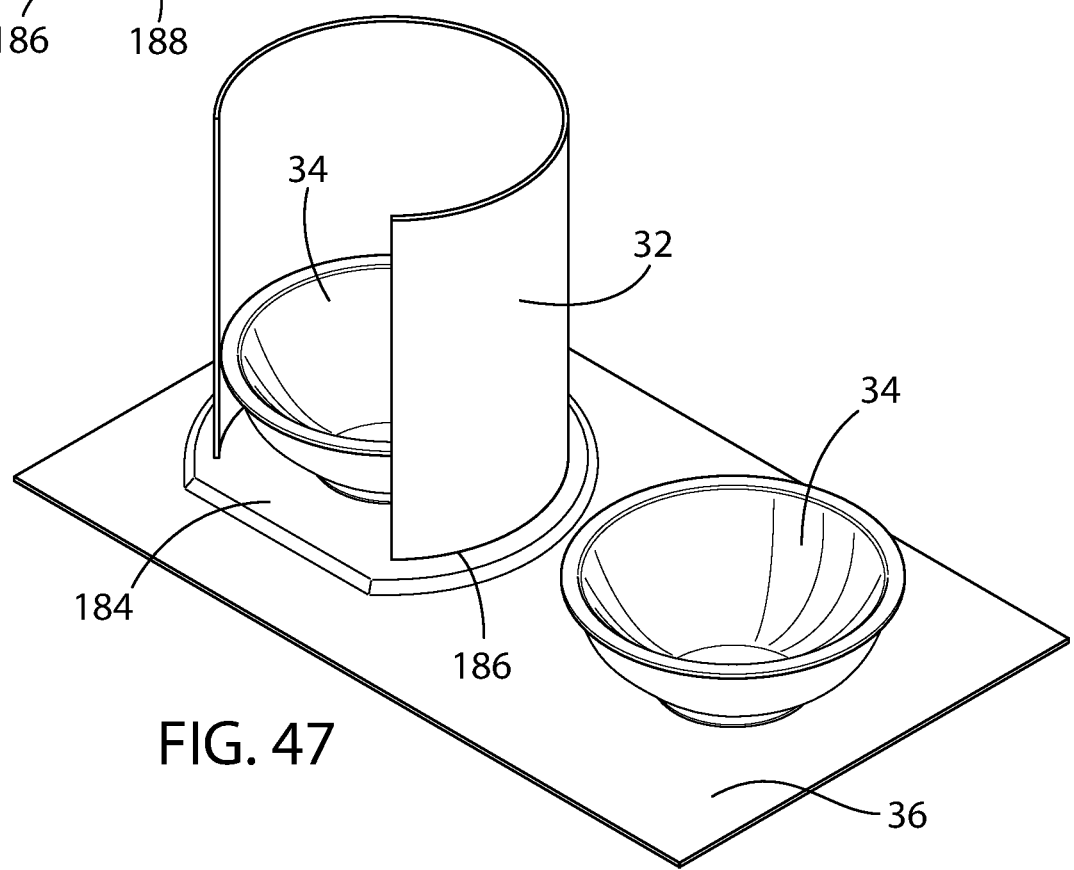
FIG. 47 is a perspective view of a feeding vessel assembly including an exemplary shield, according to another approach including one exemplary shield mountable to a raised pad portion and two bowls.

FIG. 47 is a perspective view of a feeding vessel assembly including an exemplary shield, according to another approach including one exemplary shield mountable to a raised pad portion and two bowls. A mat 36 is shown having a raised platform 184 to accommodate one shield 32 and bowl 34. The other side of the mat 36 has open to allow for another item placement or just left open.

Figure 48:
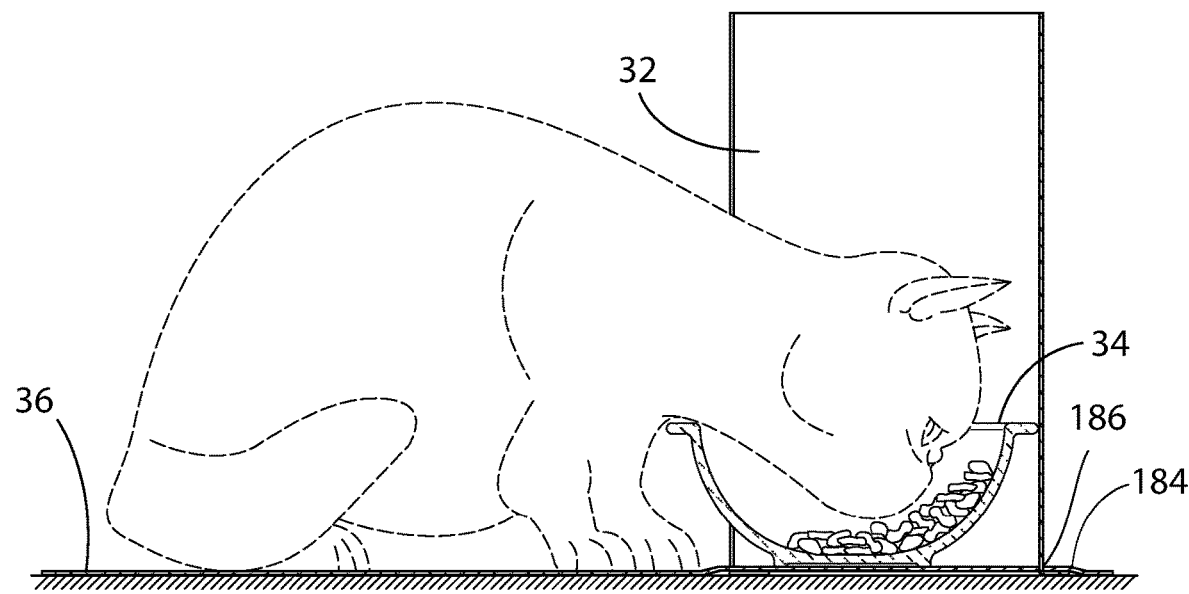
FIG. 48 is a cross-sectional side view of a feeding vessel assembly of FIG. 47 in use including an exemplary lipped shield.

FIG. 48 is a cross-sectional side view of a feeding vessel assembly of FIG. 47 in use including an exemplary lipped 188 shield 32. As shown in this figure a pet is sticking its head through the opening of the shield 32 and eating out of a bowl 34 on the raised portion 184 the mat 36. This is different from FIG. 44 because the bowl 34 is on an elevated surface 184.

Figure 49:
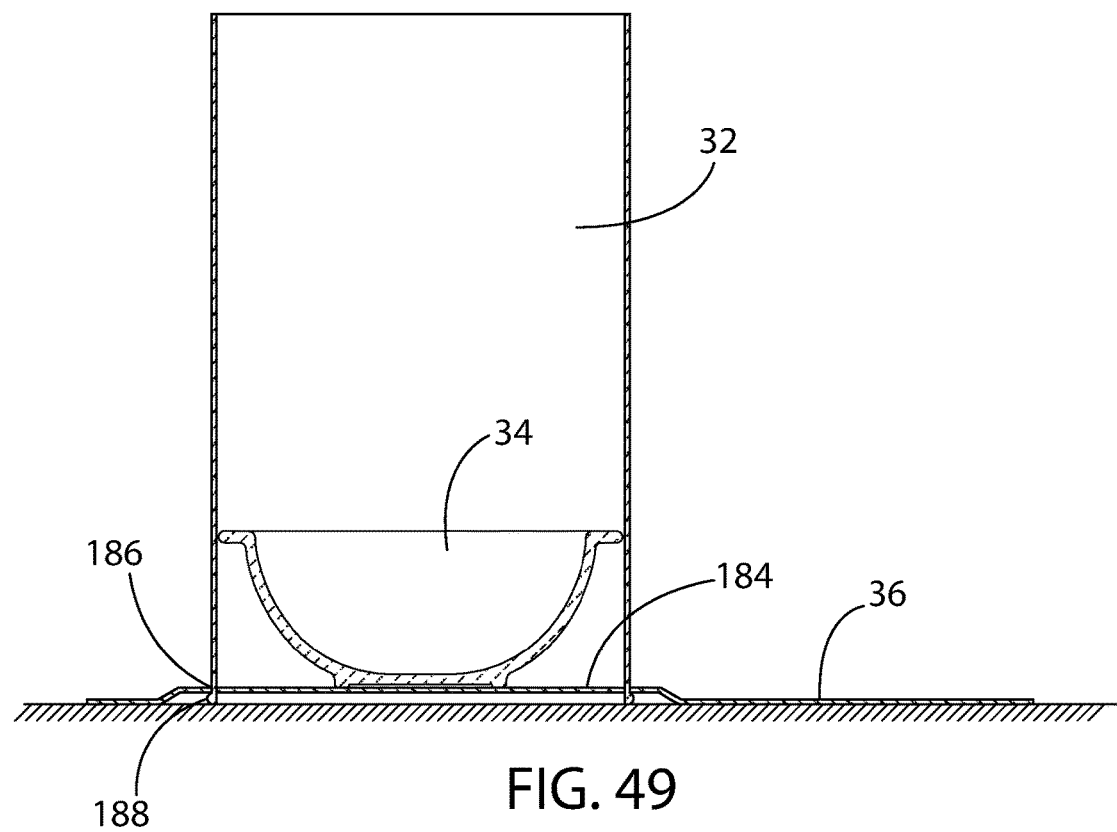
FIG. 49 is a cross-sectional front elevation view of the feeding vessel assembly of FIG. 48 showing an optional lipped shield.

FIG. 49 is a cross-sectional front elevation view of the feeding vessel assembly of FIG. 48 showing an optional lipped 188 shield 32.

FIG. 50 is an exploded perspective view of a feeding vessel assembly of FIG. 47-49 including an exemplary lipped 188 shield 32.

FIG. 51 is an exploded perspective view of feeding vessel assembly according to another approach including an alternate base configuration having a slotted ridge on the pad shaped to receive an exemplary lipped shield. A mat 36 is shown with an elevated groove/ridge section 190 (instead of carved into the mat) and a shield 32 with a lip 188 that slides into, hooks into, or snaps into the groove. As shown, retaining lip 188 fits into slot 192 of ridge 190 to receive and retain an exemplary lipped 188 shield 32.

Figure 52:
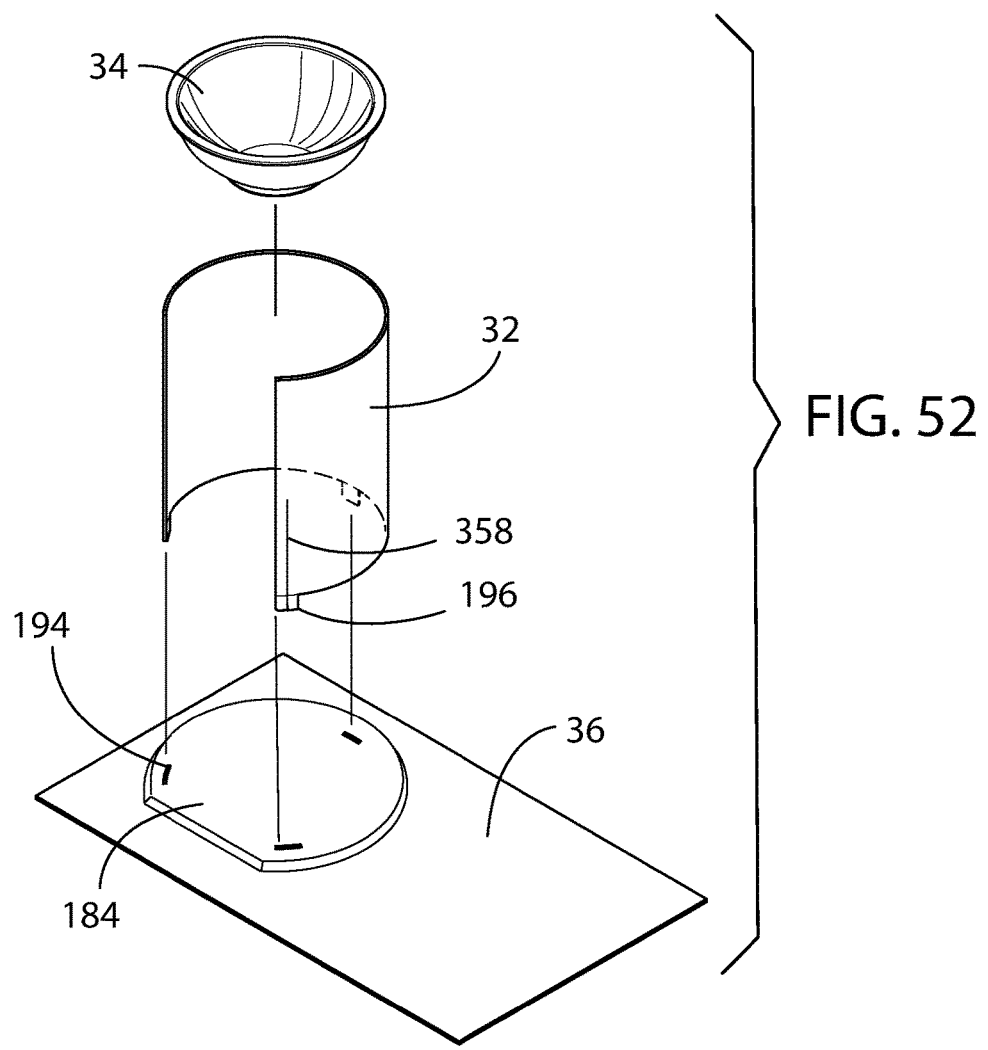
FIG. 52 is an exploded perspective view of feeding vessel assembly according to another approach including an alternate base and tabbed shield configuration.

FIG. 52 is an exploded perspective view of feeding vessel assembly according to another approach including an alternate base and tabbed shield configuration. A mat 36 is shown with three slots 194 to receive tabs 196 on shield 32 that fit into slots 194 on a raised portion 184 of mat 36. It is noted that the length and number of slots and matching tabs may vary within the scope of this embodiment. It is noted that in some embodiments using a shield 32 such as shown in FIG. 52, slots 194 may be large enough to accommodate two stacked shields 32 so that tabs 196 from each shield may be bent in opposite directions. Alternatively, tabs 196 may have at least one bendable strip 358 (such as a bendable metal wire or tab) attached to the shield tabs 196 to hold the tabs parallel to raised portion 184 when bent at right angles during installation. In an alternate embodiment, tabs 196 may not even need to be present and instead just have a plurality of bendable strips 358 may be attached to extend from the shield. These could be configured to function similar to a round head fastener.

In another embodiment shield 32 may have two metal tabs llke clips Another iteration though would be to have two L's like what's in the picture of the prototype I texted. I have also attached a picture of an office supply that demonstrates what I'm talking about with the two L shapes.

Figure 53:
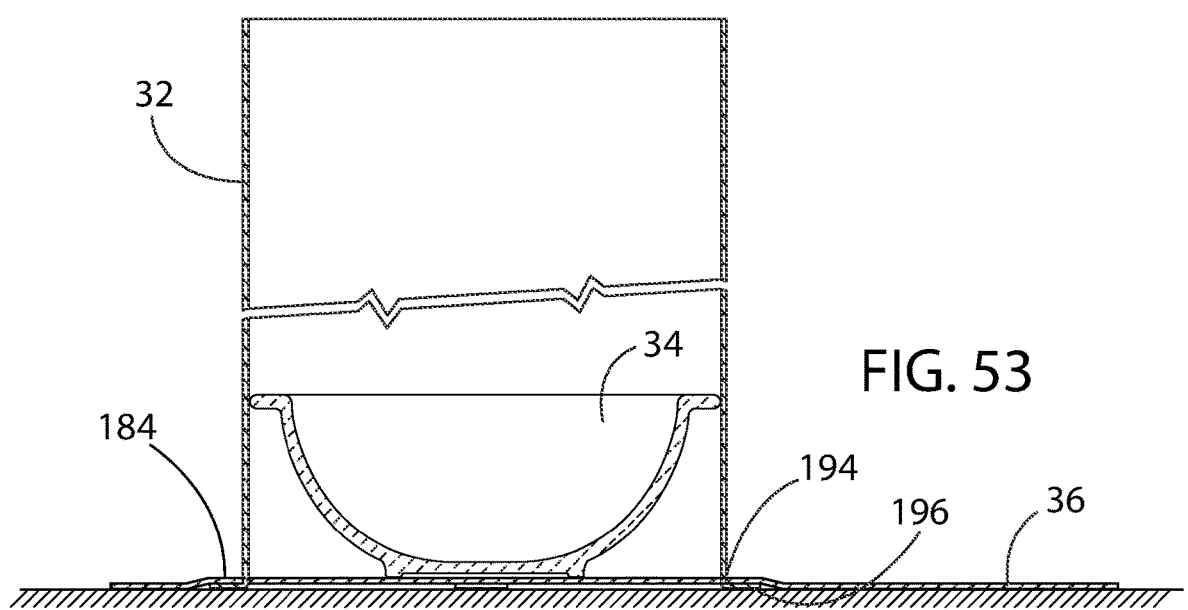
FIG. 53 is a cross-sectional front elevation view of a feeding vessel assembly of FIG. 52.

FIG. 53 is a cross-sectional front elevation view of a feeding vessel assembly of FIG. 52. Mat 36 from FIG. 52 is shown with an elevated portion 184 that has one removable shield attached and a bowl inside the shield. As shown with the installed shield 32, tabs 196 extend through slots 194. During installation, the tabs 196 may be bent to be parallel to the raised portion 184. Tabs 196 may have a layer of adhesive, such as a pressure sensitive adhesive, to affix tab 196 to the underside of raised portion 184.

Figure 54:
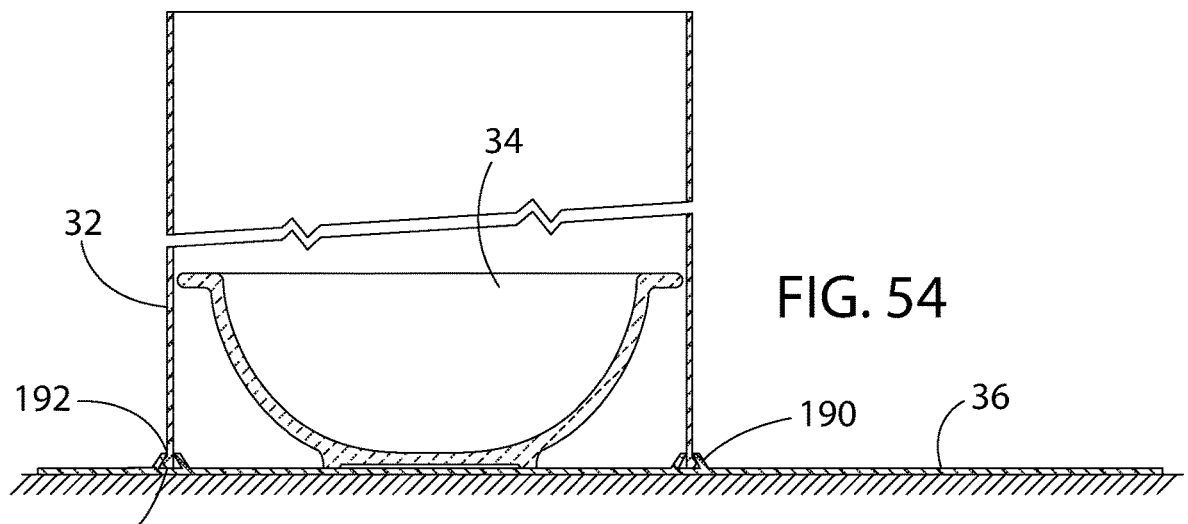
FIG. 54 is a cross-sectional front view of a feeding vessel assembly of FIG. 51 including an exemplary shield.

FIG. 54 is a cross-sectional front view of a feeding vessel assembly of FIG. 51 including an exemplary shield. The figure shows mat 36 from FIG. 51 with an elevated ridge 190 having groove 192 groove with one removable shield 32 attached and a bowl 34 inside the shield 32 by retaining lip 188.

Figure 55:
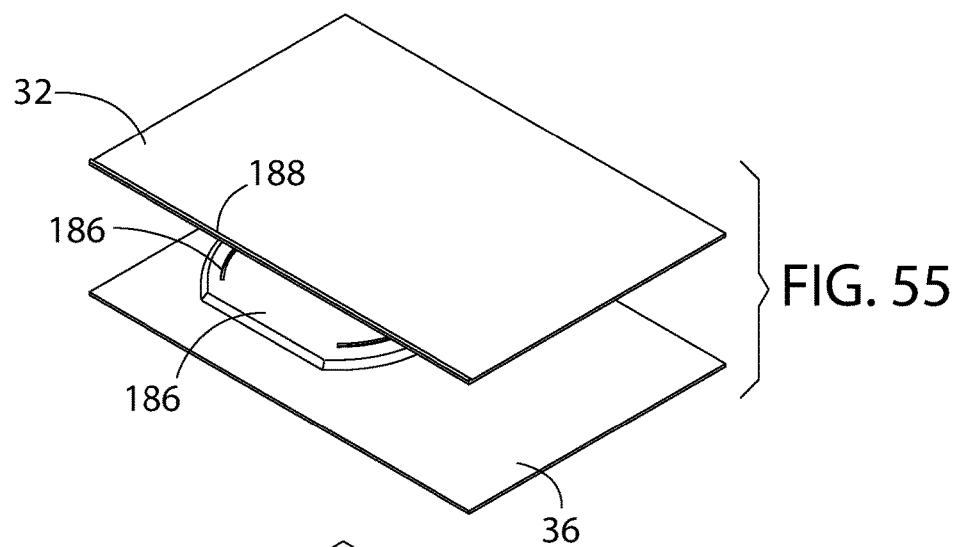
FIG. 55 is an exploded view of a flat packed unassembled shield and mat of the feeding vessel of FIG. 50.

FIG. 55 is an exploded view of a flat packed unassembled shield and mat of the feeding vessel of FIG. 50. Mat 36 is shown with an elevated section 186 for the bowl and a slot 186 the shield laying flat on top (for product packaging purposes)(see FIG. 45-50).

Figure 56:
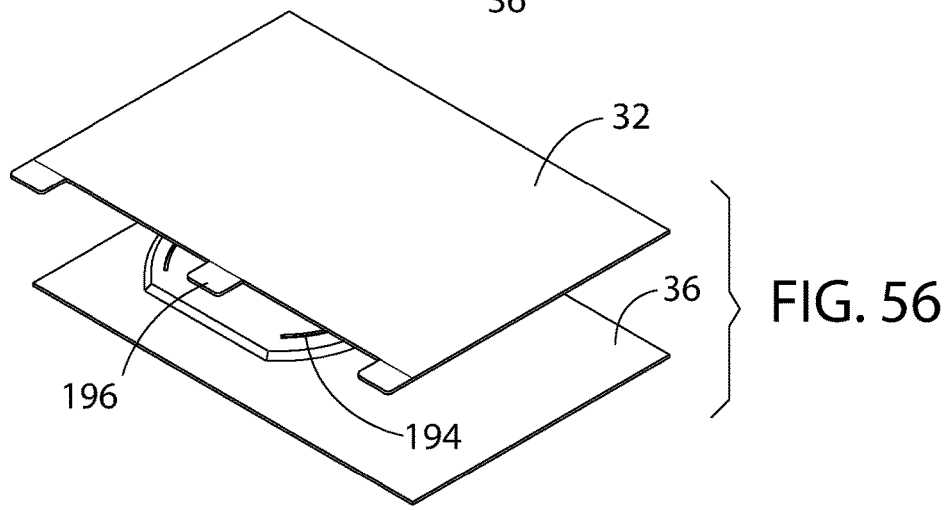
FIG. 56 is an exploded view of a flat packed unassembled shield and mat of the feeding vessel of FIG. 52.

Similarly FIG. 56 is an exploded view of a flat packed unassembled shield and mat of the feeding vessel of FIG. 52. Mat 36 with three slots 194 and shield 32 with three tabs 196 that fit into the grooves laying flat on top of the mat 36 (for product packaging purposes) (see FIG. 52-53).

Figure 57:
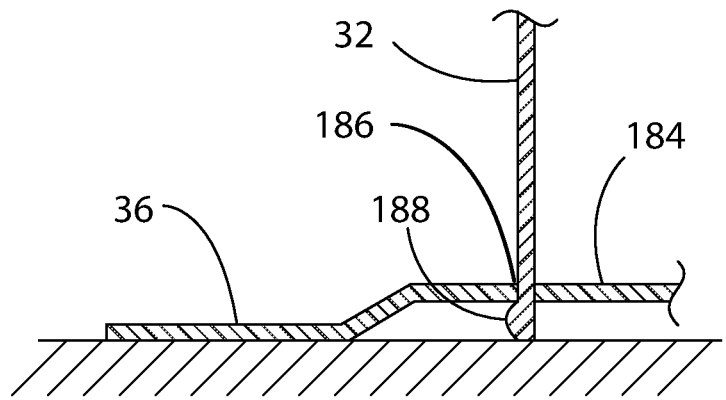
FIG. 57 is a cross-sectional side view of the attachment portion of an exemplary shield to the mat of the feeding vessel assembly of FIG. 50.

FIG. 57 is a cross-sectional side view of the attachment portion of an exemplary shield to the mat of the feeding vessel assembly of FIG. 50. As shown shield 32 fits into a groove on carved into the mat 36. The shield has a lip that can slide in and retainably snaps into slot 186 so the shield 32 stands straight up.

Figure 58:
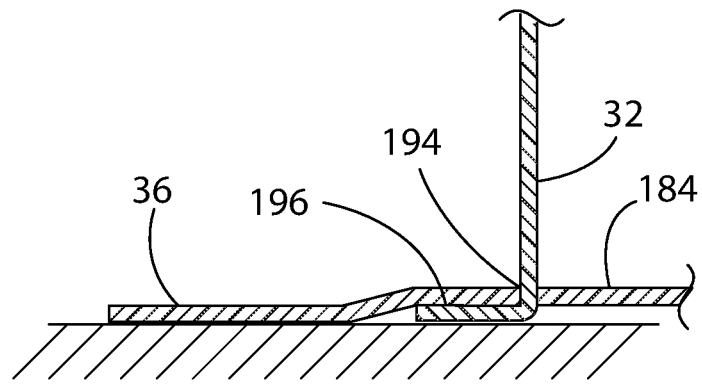
FIG. 58 is a cross-sectional side view of the attachment portion of an exemplary shield to the mat of the feeding vessel assembly of FIG. 52.

FIG. 58 is a cross-sectional side view of the attachment portion of an exemplary shield to the mat of the feeding vessel assembly of FIG. 52. A shield with a 90-degree angle that extends into slot 194 on mat 36 so shield 32 stands straight up.

Figure 59:
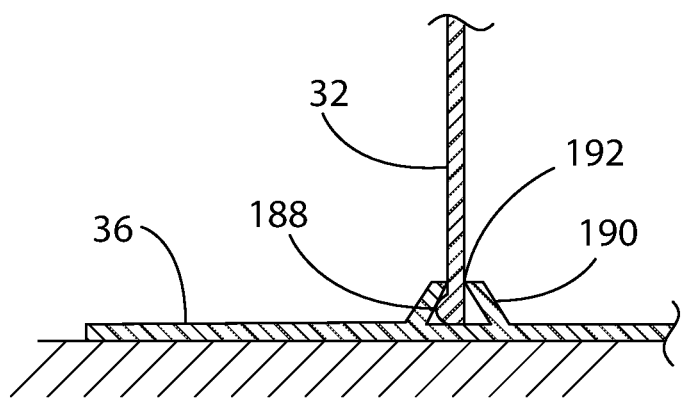
FIG. 59 is a cross-sectional side view of the attachment of an exemplary shield to the mat of the feeding vessel assembly of FIG. 51.

FIG. 59 is a cross-sectional side view of the attachment of an exemplary shield to the mat of the feeding vessel assembly of FIG. 51. Mat 36 is shown with an elevated ridge 190 having a groove 192 and a shield that fits into the groove so the shield stands straight up.

Figure 60:
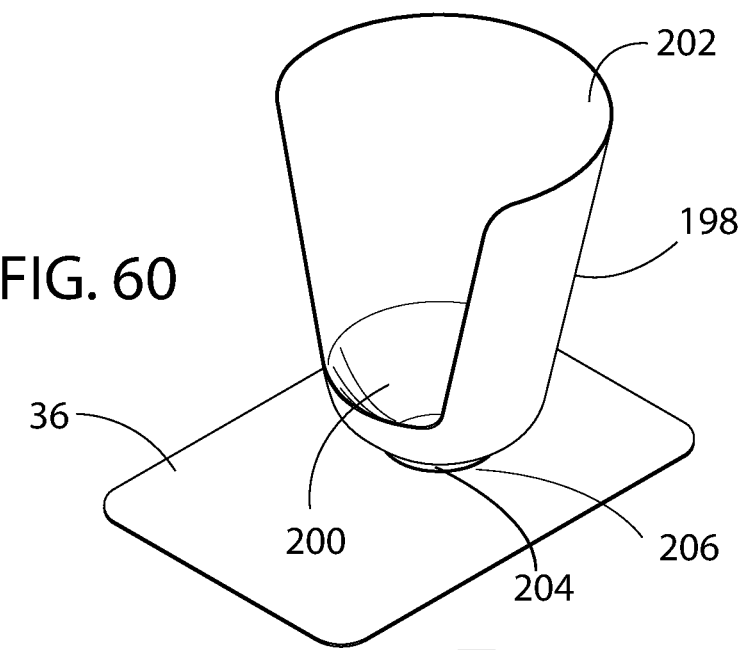
FIG. 60 is a perspective view of feeding vessel assembly including an exemplary shield, according to another approach.

FIG. 60 is a perspective view of feeding vessel assembly including an exemplary shield, according to another approach. A mat 36 is shown with an integral and stackable bowl and shield combination 198 having a bowl portion 200, a shield portion 202 and a base 204. Base portion 204 is configured to be retainably held in mat opening 206 (which is an edge defining an opening to configured to receive the base portion of integral and stackable bowl and shield combination). Base 204 may be held in place by a compression fit with opening 206, or have a base ribbed edge, or both. In one embodiment base 204 may have threads and opening 206 is a threaded bore.

Figure 61:
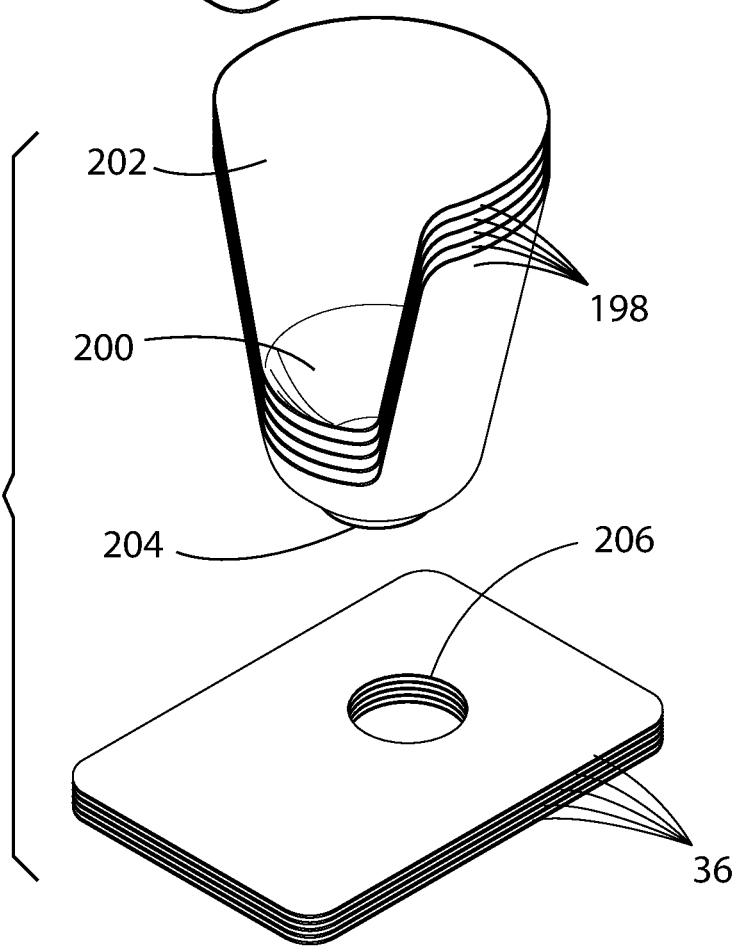
FIG. 61 is an exploded view of disassembled stacked mats and shields of FIG. 60.

FIG. 61 is an exploded view of disassembled stacked mats and shields of FIG. 60. The figure shows how the bowl fits into the hole in the mat 36 prior to, for example, being screwed into the mat 36. Stackability allows for efficient shipping and store placement of the components of this assembly.

Figure 62:
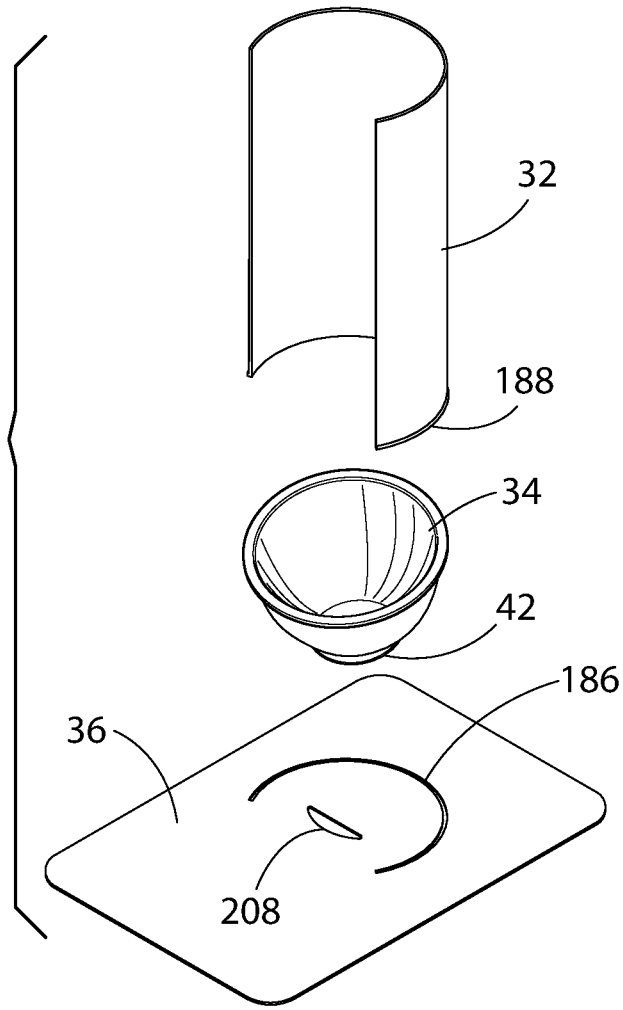
FIG. 62 is an exploded perspective view of feeding vessel assembly including an exemplary shield, according to another approach similar to FIG. 45 having optional edge to receive a base of bowl 34.

FIG. 62 is an exploded perspective view of feeding vessel assembly including an exemplary shield, according to another approach similar to FIG. 45 but having optional edge/opening 208 to receive a base 42 of bowl 34.

Figure 63:
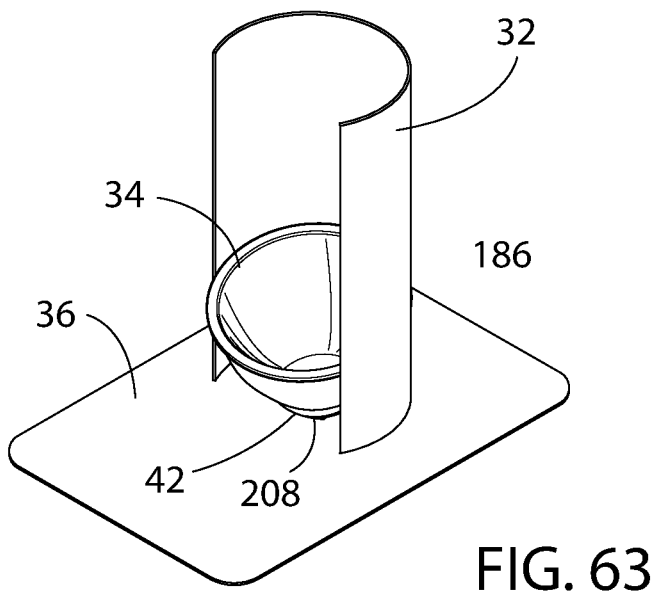
FIG. 63 is an assembled perspective view of the feeding vessel assembly including an exemplary shield of FIG. 62.

FIG. 63 is an assembled perspective view of the feeding vessel assembly including an exemplary shield of FIG. 62. Opening 208 serves to assist the animal in getting food into its mouth by allowing bowl 34 to be held at an angle. Such as 15-45 degrees. But preferable about 30 degrees.

Figure 64:
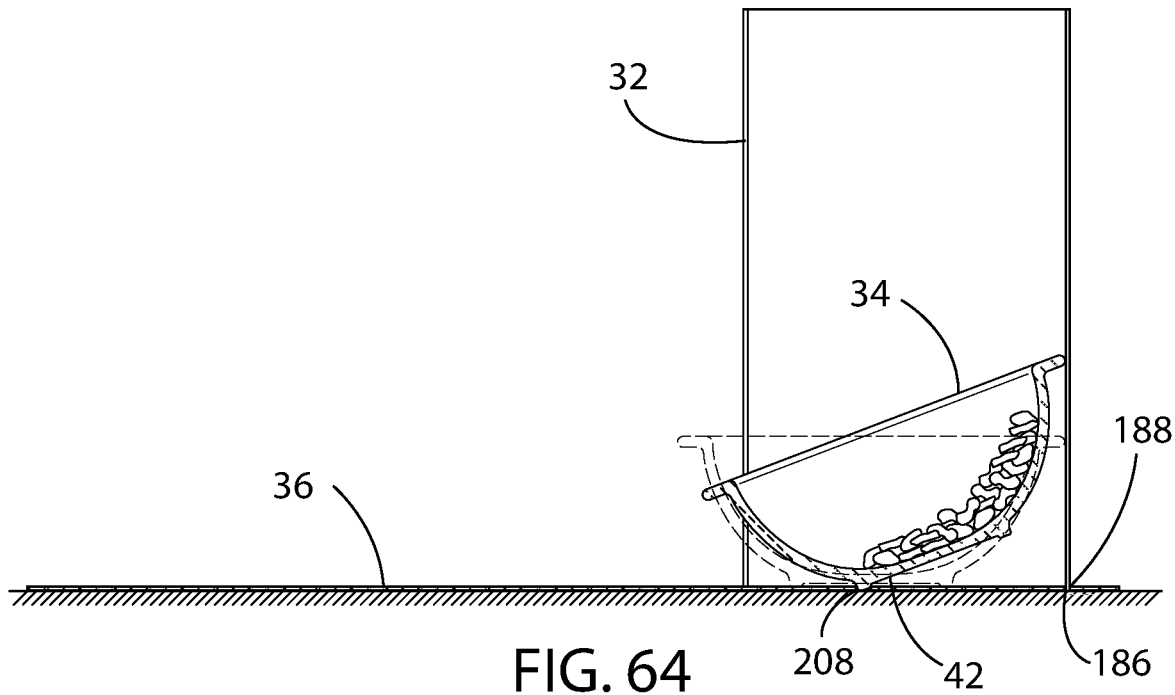
FIG. 64 is a cross-sectional side view of a feeding vessel assembly including an exemplary shield, according to the present invention of FIG. 62.

FIG. 64 is a cross-sectional side view of a feeding vessel assembly including an exemplary shield, according to the present invention of FIGS. 62 and 63. The figure shows how base (feeding vessel bottom flange) 42 of bowl 34 extends into opening 208.

Figure 65:
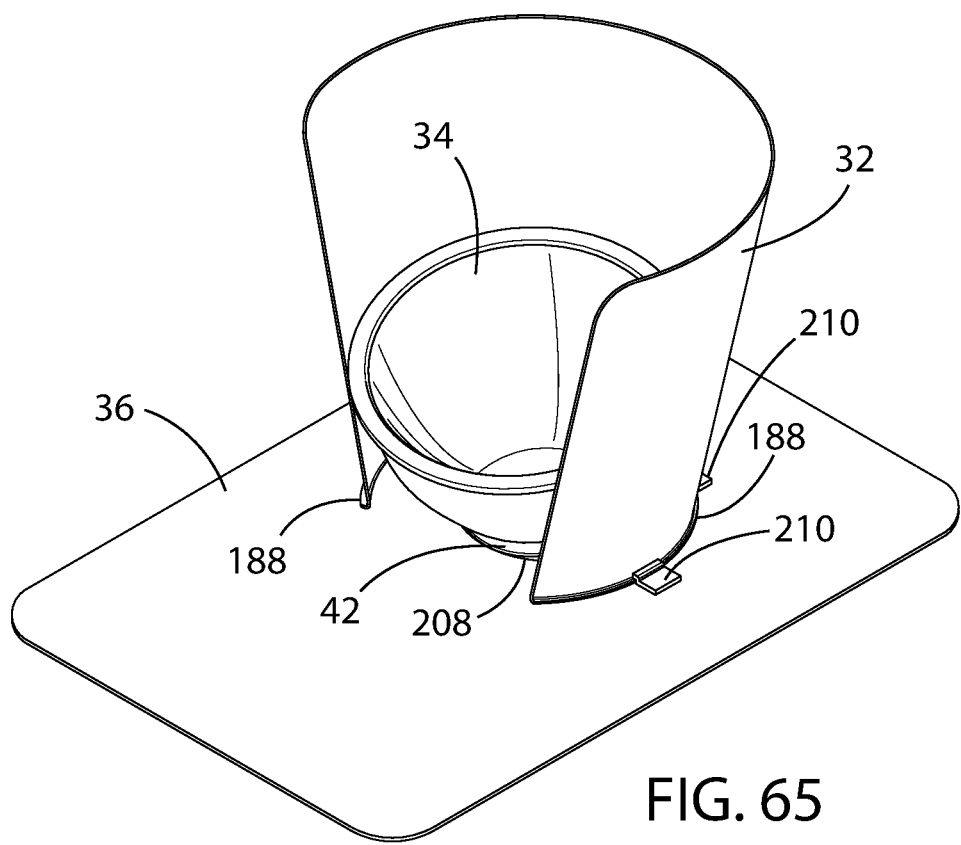
FIG. 65 is a perspective view of another feeding vessel assembly including an exemplary shield with pad retaining clips, according to the present invention.

FIG. 65 is a perspective view of another feeding vessel assembly including an exemplary shield with pad retaining clips 210, according to the present embodiments. The figure shows an embodiment similar for the shield assembly of FIG. 62 but has retaining clips 210 instead of pad slot 186 to hold shield 32. Retaining clips 210 are configured to hold shield 210 by shield retaining lip 188. Clips 210 may be formed from pad 36 mold or affixed to pad 36 by means such as gluing, welding and use of other such fastening means.

FIG. 66 is an exploded perspective view of a feeding vessel assembly including an exemplary shield, according to the present invention of FIG. 65. As shown, bowl 32 may be held at an angle within shield 32 by wedging bowl base 42 into edge retaining opening 208 of mat 32.

FIG. 67 is a perspective view of another feeding vessel assembly including an exemplary collapsible shield 212, according to the present invention. A mat 36 is provided similar to the mat presented in FIGS. 65-66 with a ribbed shield 212 attached and a bowl placed on top of a wedge. Collapsible shield 212 as shown has a webbing 214 and a wire frame 216. Webbing 214 may be made from a variety of materials and compositions such as knitted or mesh fabric that is collapsible that is affixed to wire frame 216. Webbing 214 may be glued, clipped, or integrally woven into wire frame 216. Wire frame 216 may be spiral and configured as a compression spring to extend to the desired shield height (free length) by compressible with less than 10 pounds of force by user to a stowed flattened position. The flattened position (such as shown in FIG. 69), allows for efficient shipping and store placement of the components of this assembly. In other embodiments, collapsible shied 212 may use wire rings or spirals and may be held upright by attachment to at least one detachable rod 360 (e.g., FIG. 68).

Figure 68:
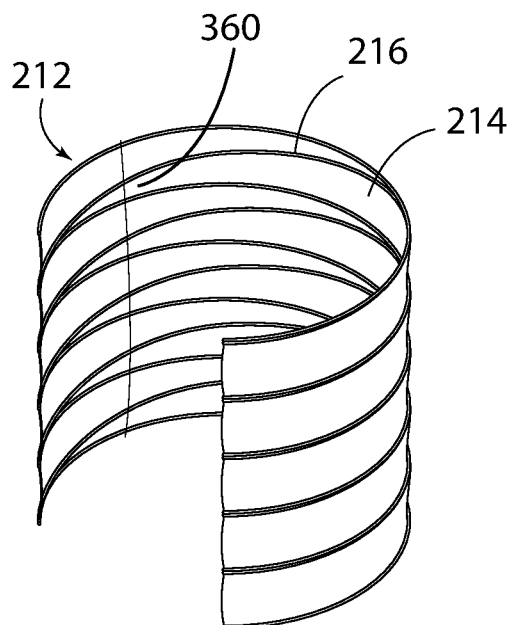
FIG. 68 is the collapsible shield of FIG. 67, according to the present invention in the extended position.
Figure 69:
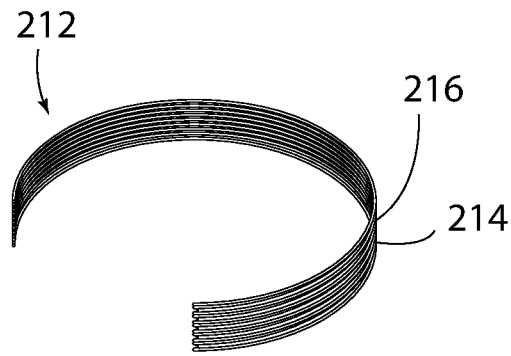
FIG. 69 is the collapsible shield of FIG. 67, according to the present invention in the collapsed position.

FIG. 68 is the collapsible shield 212 of FIG. 67, in the extended position. Collapsible shield 212 may be a textured shield. The purpose of a textured shield is to give a pet a surface they can use to get food into their mouths. This happens by scraping food up the shield with their mouths.

FIG. 69 is the collapsible shield of FIGS. 67 and 68, according to the present invention in the collapsed position.

Figure 70:
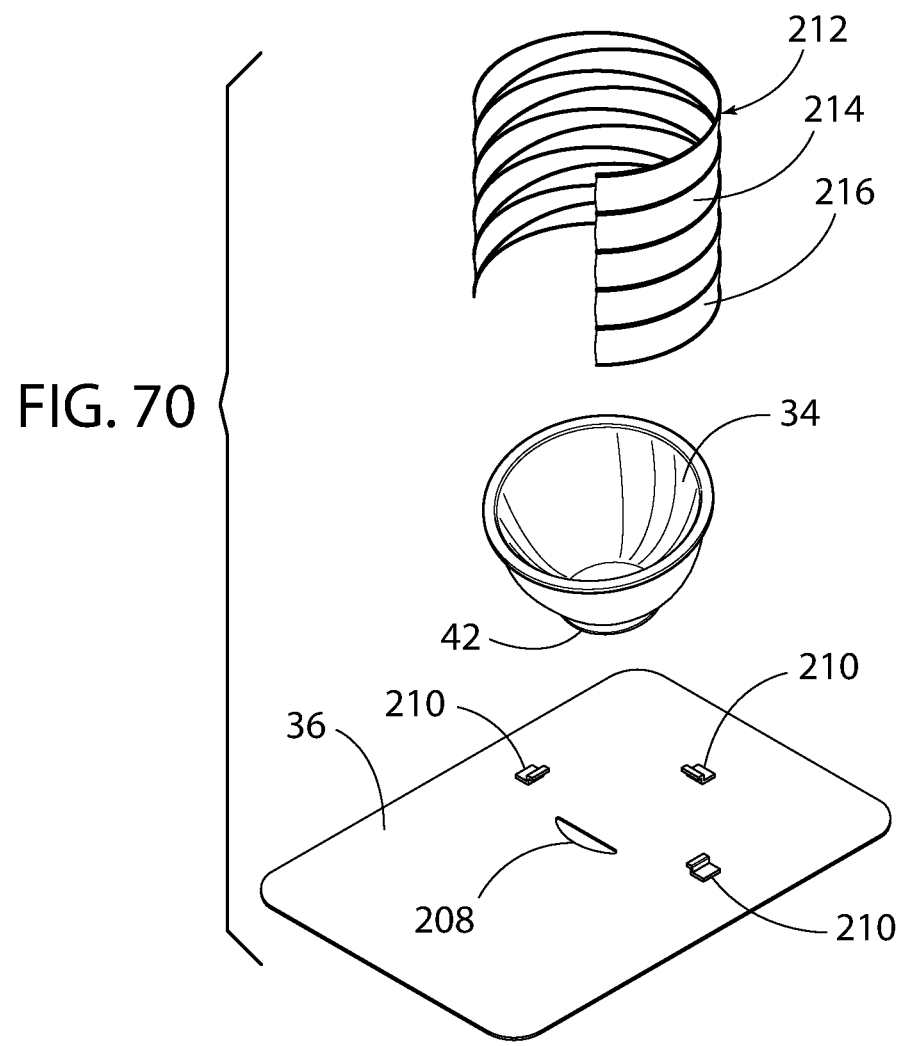
FIG. 70 is an exploded perspective view of a feeding vessel assembly including an exemplary collapsible shield, according to the present invention of FIG. 67.

FIG. 70 is an exploded perspective view of a feeding vessel assembly including an exemplary collapsible shield 212, according to the present invention of FIG. 67. A mat 36 with clips 210 that hold a ribbed collapsible shield 212 in place to allow shielded placement of a tilted bowl 34 using opening 208.

Figure 71:
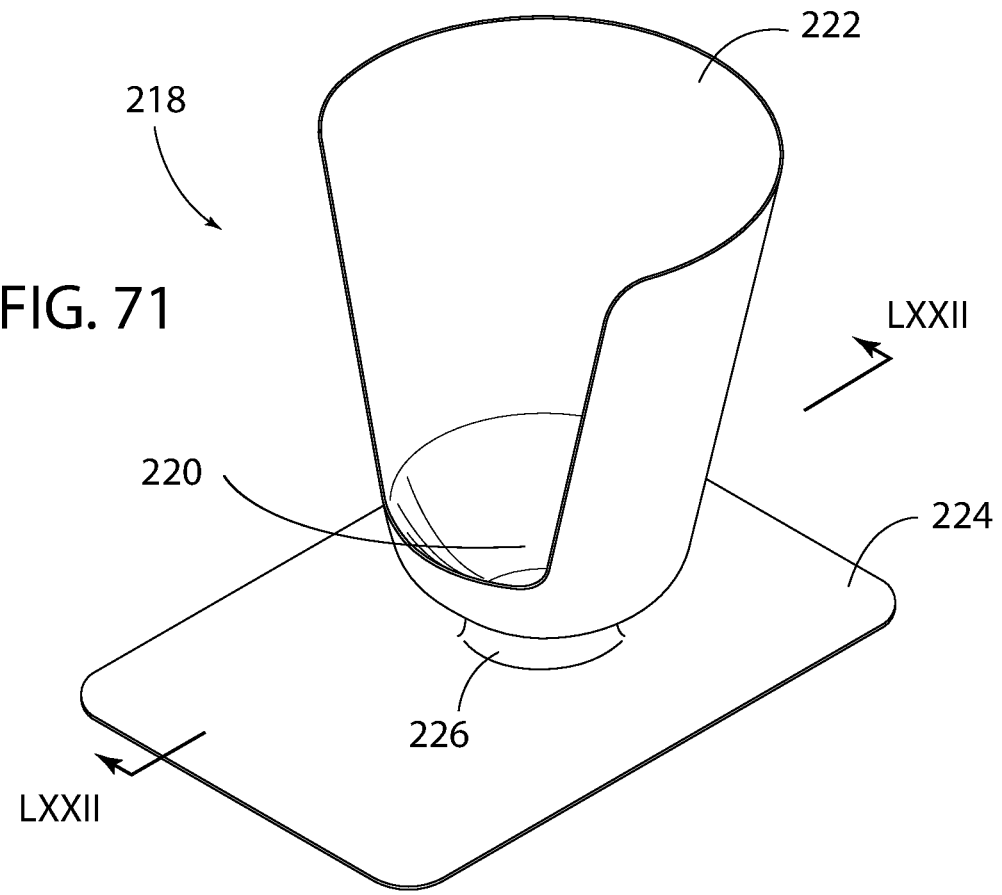
FIG. 71 is a perspective view of a feeding vessel having integral shield/bowl/mat, according to the present invention.

FIG. 71 is a perspective view of a feeding vessel 218 having an integrally formed shield 222/bowl 220/mat 224/ base 226 portions, according to the present invention. Feeding vessel 218 may be form by various means including molding, 3-D printing and the like.

Figure 72:
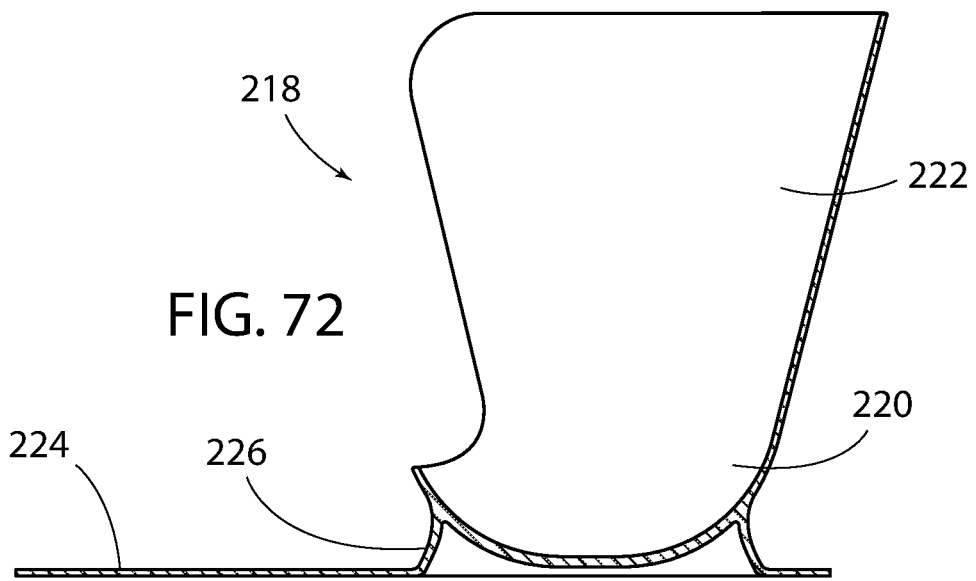
FIG. 72 is a cross-sectional side view of a feeding vessel of FIG. 71 taken along section lines LXXII-LXXII of FIG. 71.

FIG. 72 is a cross-sectional side view of a feeding vessel of FIG. 71 taken along section lines LXXII-LXXII of FIG. 71. The side view shows a bowl portion 220 with high sides 222 on mat portion 36.

Figs. FIG. 73 shows stackable feeding bowl 228 according to another embodiment of the present invention with a raised back wall 234 relative to a front wall 236. Bowl 228 has a slanted interior cavity (concave portion) 232 with an annular ring (lip) 230 on the bowl bottom having a recessed groove 242 that a mat 238 and shield 242 can snap onto.

FIG. 74 is a cross-sectional side view of the bowl of FIG. 73 taken along section lines LXXIV-LXXIV of FIG. 73. The side view of a slanted bowl 228 (see FIG. 73) shows an annular ring around the base of the bowl (lip) 230 that goes around the entire bottom of the bowl. Lip 230 has a recessed groove 242 that is configured to receive mat 238 inversed grooved portion 240 (FIG. 77). Recessed groove 242 is also configured to receive shield 241. Shield 241 and mat groove 240, as in other embodiments, may also have a ribbed edge to snap into groove 242. As shown in FIG. 74, the difference in height between the front wall 236 and raised back wall 234 may be around 50 percent to 150 percent higher, and preferable about 100 percent higher.

FIG. 75 is a cross-sectional side view of multiple stacked bowls 228 of FIG. 73.

FIG. 76 is a cross-sectional side view of the feeding bowl assembly of FIG. 77, taken along section lines LXXVI-LXXVI of FIG. 77. The side view of bowl 228 shows mat 238 hooked into groove 242 of lip 230 of bowl 228 as well as shield 241 hooked into.

FIG. 77 is a perspective view of the feeding vessel assembly of FIG. 73 including of an exemplary shield, according to the present invention.

Figure 78:
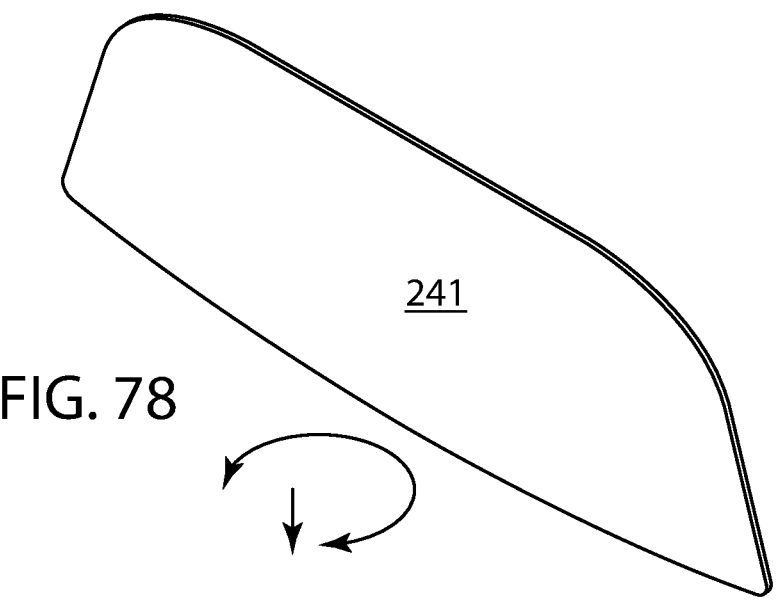
FIG. 78 is a perspective view of flexible shield 241 that fits into a bowl 228.

FIG. 78 is a perspective view of flexible shield 241 that fits into a bowl 228.

Figure 79:
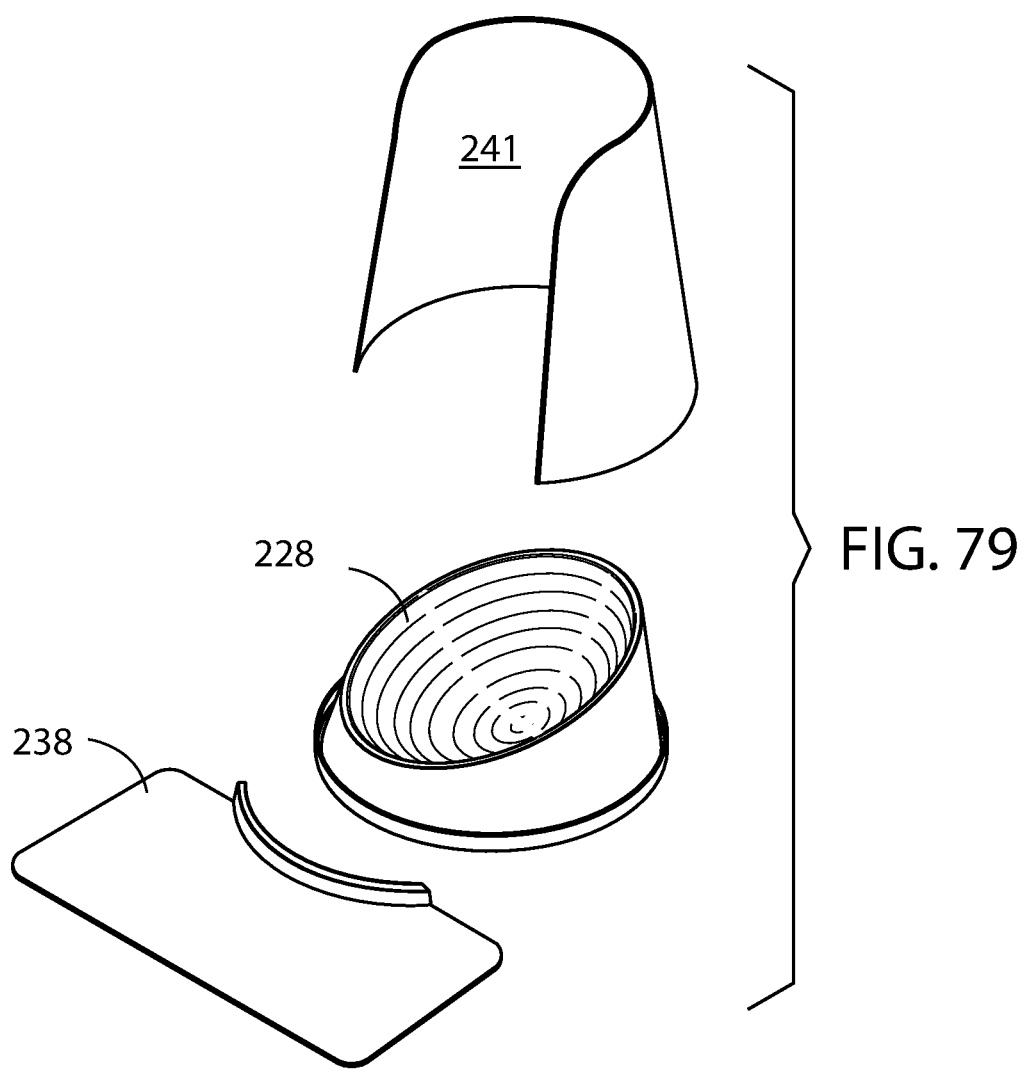
FIG. 79 is an exploded perspective view of a feeding vessel assembly including an exemplary bowl mat and shield, according to the present invention of FIG. 77.

FIG. 79 is an exploded perspective view of a feeding vessel assembly including an exemplary bowl mat and shield, according to the present invention of FIG. 77.

Figure 80:
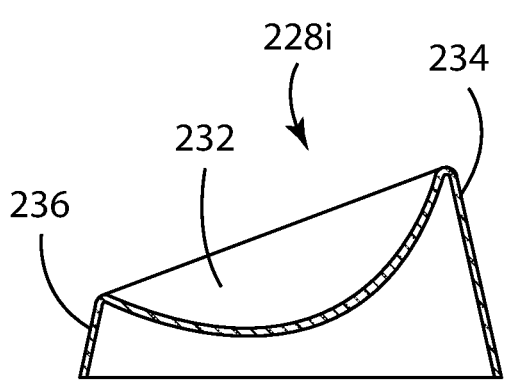
FIG. 80 is a cross-sectional side view of feeding bowl 228*i* of FIG. 73 according to another approach without an annular base ring 232.

FIG. 80 is a cross-sectional side view of feeding bowl 228*i* of FIG. 73 according to another approach without an annular base ring 232. As shown bowl 228*i* also dips at the bottom and rises in an ergonomic manner so an animal can scrape food into its mouth easily.

Figure 81:
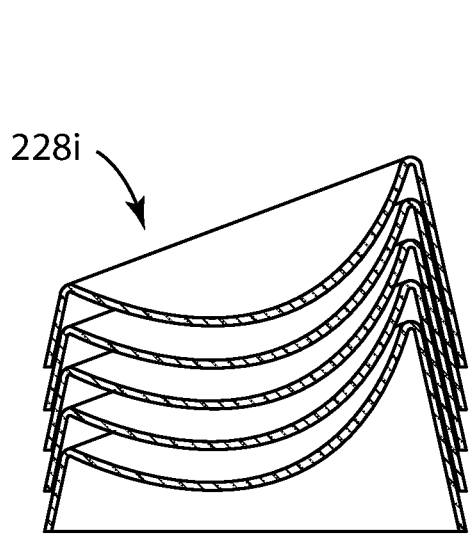
FIG. 81 is a cross-sectional side view of a stack of feeding bowls 228*i*.

FIG. 81 is a cross-sectional side view of a stack of feeding bowls 228*i*.

Figure 82:
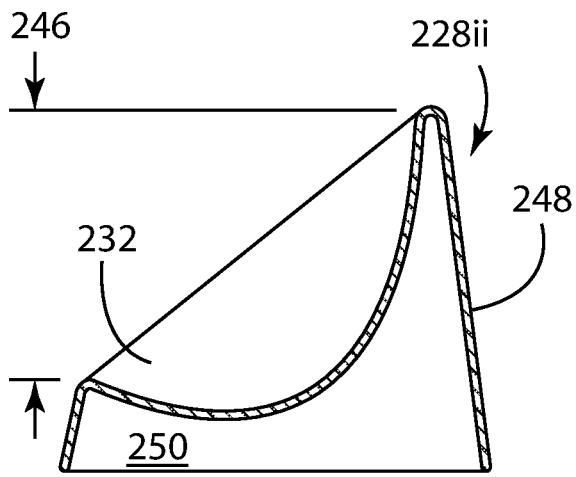
FIG. 82 is a cross-sectional side view of feeding bowl 228*ii* according to another approach without an annular base ring and a higher raised back wall portion.

FIG. 82 is a cross-sectional side view of feeding bowl 228*ii* according to another approach without an annular base ring and a higher raised back wall portion 248. Bowl 228*ii* obviates the need for a shield. Bowl 228*ii* has a shorter dip and rises higher than FIGS. 80-81 that will allow an animal to scrape food into its mouth by pressing its face against the high part of the slant. As shown the height difference between front wall 236 in bowl area 250 and back wall 428 may be about 100 percent to 500 percent, but preferably about 300-400 percent higher.

Figure 83:
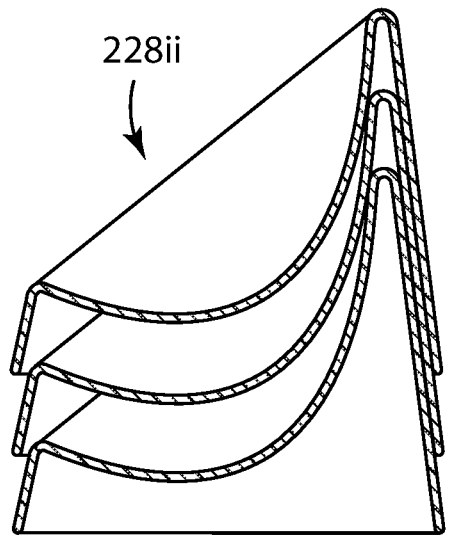
FIG. 83 is a cross-sectional side view of a stack of feeding bowls 228*ii* of FIG. 82.

FIG. 83 is a cross-sectional side view of a stack of feeding bowls 228ii of FIG. 82.

FIG. 84 is a perspective view of another feeding vessel assembly according to the present invention. In this embodiment feeding bowl 256 with sloped sides has a back wall 254; a front wall portion of bowl 254; an edge 258 defining opening of bowl; and a concave area 260 of bowl 256 to receive food.

FIG. 85 is an exploded perspective view of another feeding vessel assembly according to the present invention having a slanted bowl 262 with slots 268 configured to receive tabs 266 of shield 264 on the outside of bowl 262. Bowl 262 sides 270 are vertical while having a sloped edge similar to other configurations herein and a concave portion 274 to receive food.

FIG. 86 is a perspective view of a feeding vessel assembly according to the present invention of FIG. 85. A slanted bowl 262 has shield 264 attached by fitting tabs 266 into the slots 268 on the vertical side 70 of the outside of the bowl.

FIG. 87 is a perspective view of a feeding assembly including an exemplary shield 32, according to the present invention of FIG. 88. A mat 36 in this embodiment is modified to include an integral or removable wedge 276 for a bowl 34 to sit on top of and a slot 278 for a shield 32 with a ribbed edge 188 to fit into.

FIG. 88 is an exploded perspective view of the embodiment of FIG. 87.

FIG. 89 is a cross-sectional side view of the feeding assembly of FIG. 87 including an exemplary shield, according to the present invention of FIG. 87 taken along section lines LXXXIX-LXXXIX of FIG. 87. The side view of a mat 36 with an integrally formed wedge 276 is shown, with shield 32 attached and a bowl sitting on top of the wedge at an angle 280. Angle 280 may be in the range of 15 degrees to 45 degrees, and preferably about 30 degrees.

FIG. 90 is an exploded perspective view of another feeding assembly including an exemplary shield, according to the present invention. A shield with a ledge built into it and a bowl with a lip on top and a mat 36 with a groove for the shield to fit into.

FIG. 91 is a cross-sectional side view of the shield of FIG. 90. The side view of a shield with removable or integral band 282 shown at a desired angle 286. Angle 286 may be about 15 degrees to 45 degrees but preferable about 30 degrees.

FIG. 92 is a cross-sectional side view of the assembled feeding vessel assembly of FIG. 90. The side view shows a bowl 34 resting on the ledge 282 on the shield 32 sitting on mat 36 with grooves.

Figure 93:
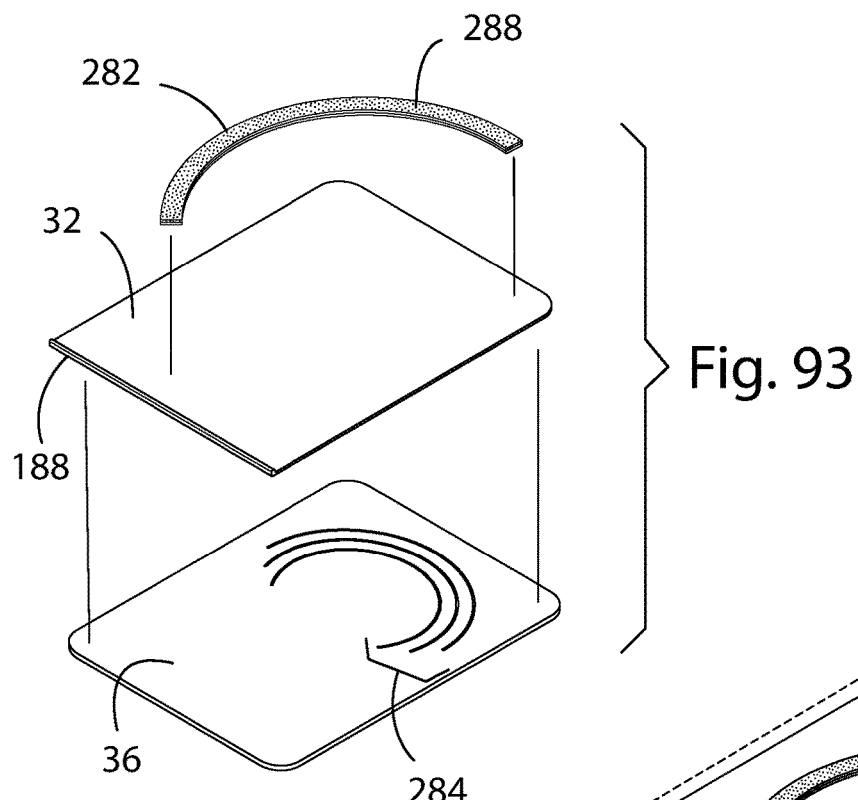
FIG. 93 an exploded view of an unassembled feeding vessel assembly of FIG. 90.
Figure 94:
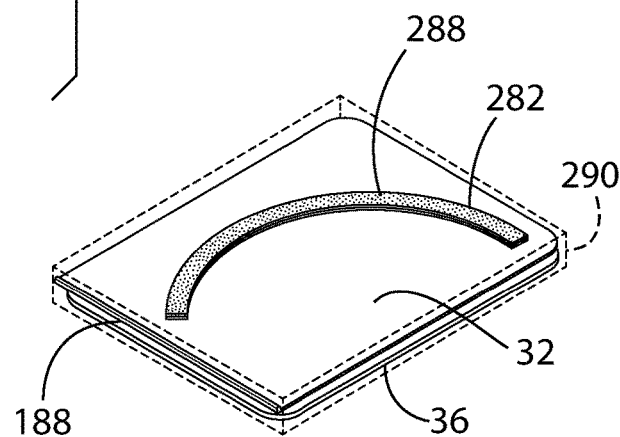
FIG. 94 is a packaging/box/shrink wrap of the flat pack unassembled feeding vessel assembly of FIG. 90.

FIG. 93 an exploded view of an unassembled feeding vessel assembly of FIG. 90. In FIGS. 90-93, three ring sizes 284 may be used to accommodate three sizes of bowls. For example, a bowl's width by height may be 5 inches by 2 inches; 9.8 inches by 3 inches; 7 inches by 2.5 inches; 12.75 inches by 2.6 inches; and the like. For example, as shown in FIG. 90 the feeding vessel assembly may have a bowl 34, 34i, 34ii, the feeding bowl having a cavity to receive food and water and for placement on pad 36. A flexible removable shield 32 is configured to partially surround the feeding bowl (e.g., 180 to 270 degrees) when inserted into one of the arcuate slots 284 and held in place by a retaining means such as a shield retaining lip 188. A flexible bendable band 282 having on one side a having a pressure sensitive adhesive 288 may be attached on the interior side of shield 32 to hold an edge of the feeding bowl 34 off the surface of the pad 36 on one side, such as shown in FIG. 92. In other words, the bowl 34 may be tilted to allow easier access the bowls contents. Accordingly, the slant of the bowl is adjustable based on the placement of the band 282. As shown in FIGS. 93 and 94, the pad, band and shield may be flattened and flat packed in their unassembled state and shrink wrapped 290 for site of sale.

FIG. 94 is a packaging/box/shrink wrap 290 of the flat pack unassembled feeding vessel assembly of FIG. 90. The side view of an automatic feeder with high sides and sides that jut forward in order to prevent food from spilling onto the sides of the feeder.

Figure 95:
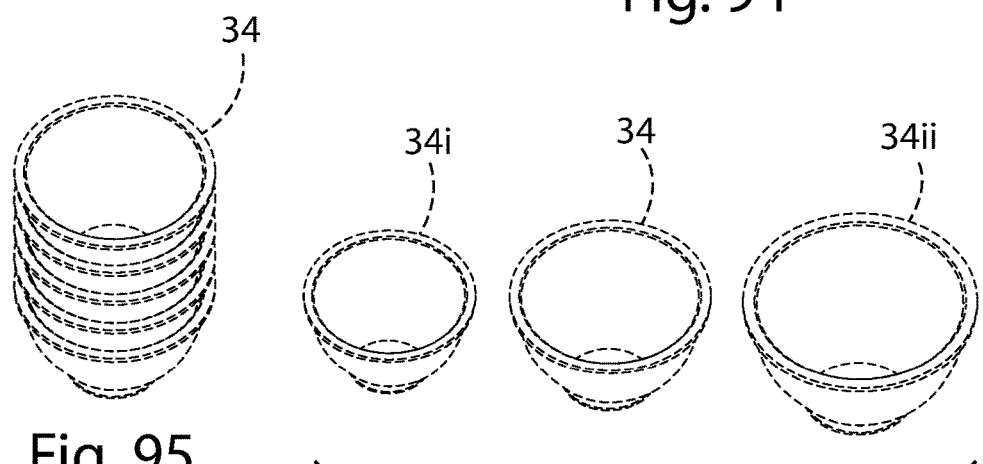
FIG. 95 shows optional stackable feeding bowls for the assembly of FIG. 90.

FIG. 95 shows optional stackable feeding bowls for the assembly of FIG. 90. A mat 36 with two automatic feeders and the lids of the automatic feeders. The Automatic feeders contain slanted bowls.

Figure 96:
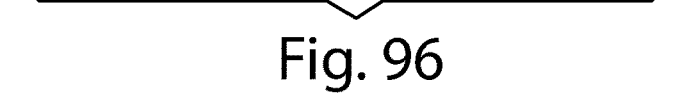
FIG. 96 shows optional stackable feeding bowls of varies sizes to match the slots for the mat for the assembly of FIG. 90.

FIG. 96 shows optional stackable feeding bowls of varies sizes to match the slots for the mat for the assembly of FIG. 90

Figure 97:
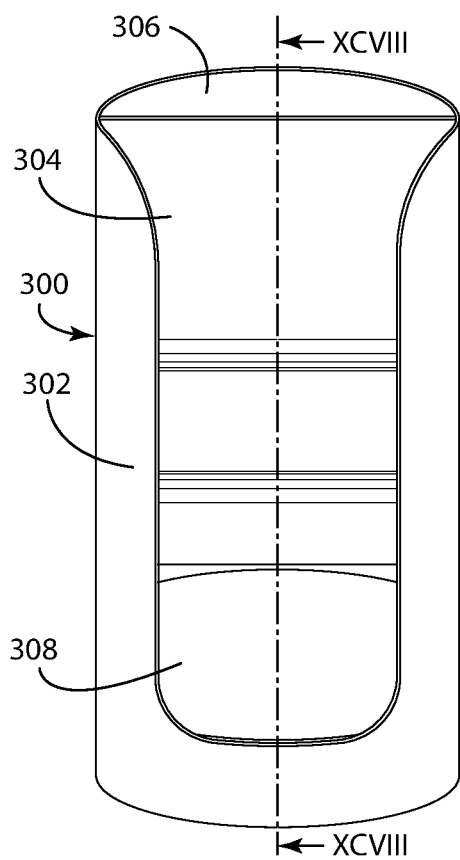
FIG. 97 is a front view of another feeding assembly including an exemplary integral shield and feeding silo, according to the present invention.

FIGS. 97-106 show embodiments of the present invention having an optional feeding silo. Feeding silos may be configured to dry or wet foods or even fluids. FIG. 97 is a front view of another feeding assembly including an exemplary integral shield and feeding silo, according to the present invention. This embodiment allows an automatic feeder for dry or wet food or even liquids. The front view shows an automatic feeder with sides that jut out past the top compartment housing dry pet food.

Figure 98:
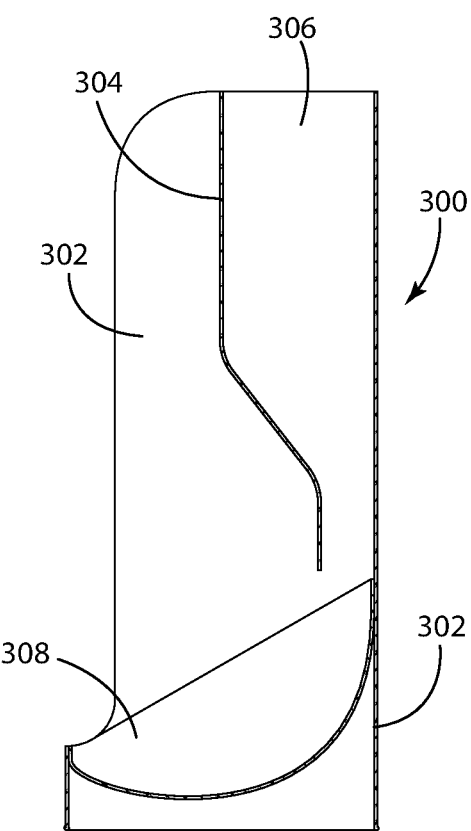
FIG. 98 is a cross-sectional side view of a feeding assembly including an exemplary shield, according to the present invention of FIG. 97 taken along section lines XCVIII-XCVIII of FIG. 97.

FIG. 98 is a cross-sectional side view of a feeding assembly including an exemplary shield, according to the present invention of FIG. 97 taken along section lines XCVIII-XCVIII of FIG. 97.

Figure 99:
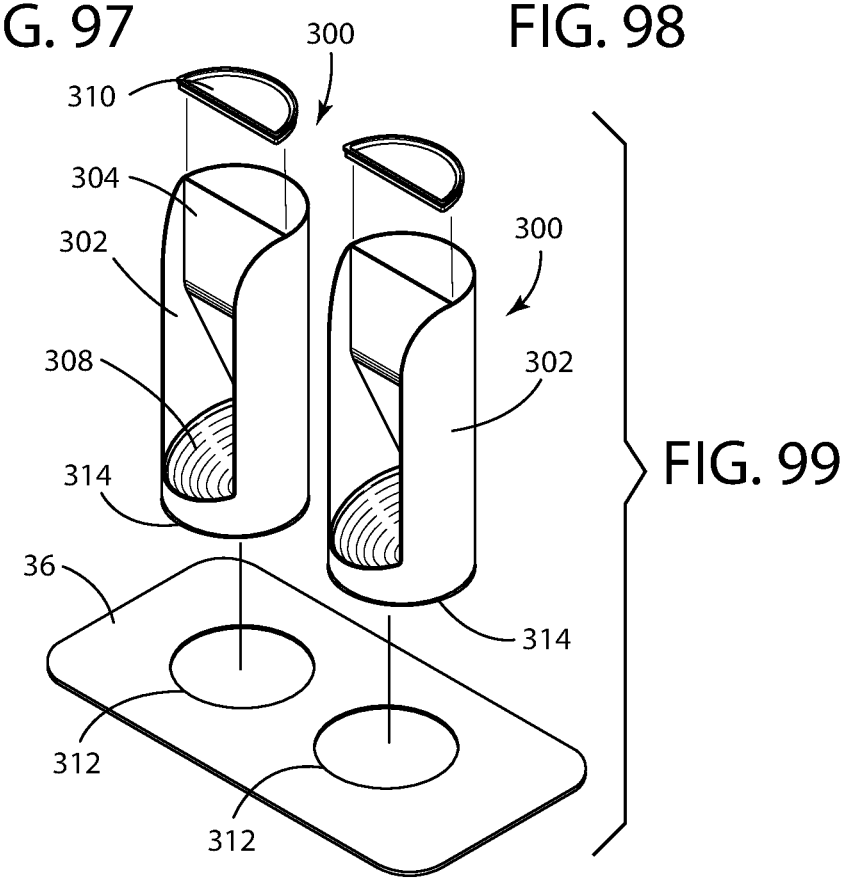
FIG. 99 is an exploded perspective view of the feeding bowl assemblies of FIG. 97 with an optional mat.

FIG. 99 is an exploded perspective view of the feeding bowl assemblies of FIG. 97 with an optional mat and integral feeding silo.

Generally, feeding vessel 300 of FIGS. 97-103 may have a shield portion 302; a silo partition 304; a top silo opening 306; sloped feeding bowl 308; top cover 310 to cover opening 306; mat 36 opening 312 to receive retaining lip 314 of feeding vessel 300. Sloped feeding bowl 308 may have a lip 316 (FIG. 100) to rest on a front edge of feeding vessel 300 (See e.g., FIG. 103). It is noted that the diameter of bowl 308 may be narrower than the diameter of shield 302 to allow its lip edge 316 to rest on the front opening of the shield.

FIG. 100 is an exploded perspective view of the feeding vessel of FIG. 97.

FIG. 101 is an exploded perspective view of the feeding vessel of FIG. 97 with a variation of the bottom lip/valve 318 of the partition silo 304i.

FIG. 102 is a front view of the feeding vessel of FIG. 101.

FIG. 103 is a cross section view of the feeding vessel of FIG. 102, taken along section lines CIII-CIII of FIG. 102. In FIGS. 97-103, it is noted that the silo portion 304 may accommodate solid foods and even liquids (See, e.g., FIG. 103). The figure shows a side view of an automatic water dispenser with high sides that jut outward towards the animal. The purpose of the high sides is to prevent water from spilling onto the side or back of the bowl. Valve 318 allows predetermined amounts of liquid 320 to enter and be retained in bowl 308

Figures 104, 106:
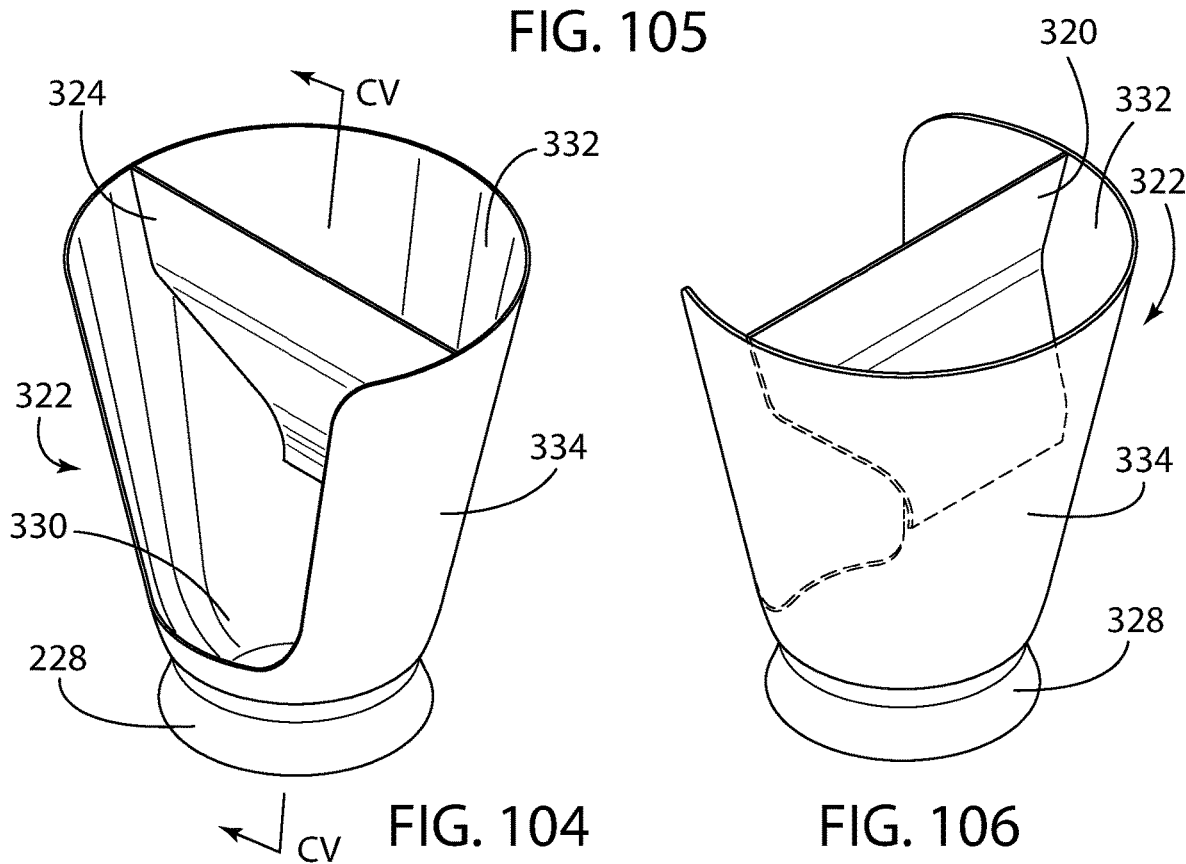
FIG. 104 is a front perspective view of another feeding assembly including an exemplary integral shield and feeding silo, according to the present invention.
FIG. 106 is a rear perspective view of the feeding assembly of FIG. 104.

FIG. 104 is a front perspective view of another feeding assembly including an exemplary integral shield and feeding silo, according to the present invention.

Figure 105:
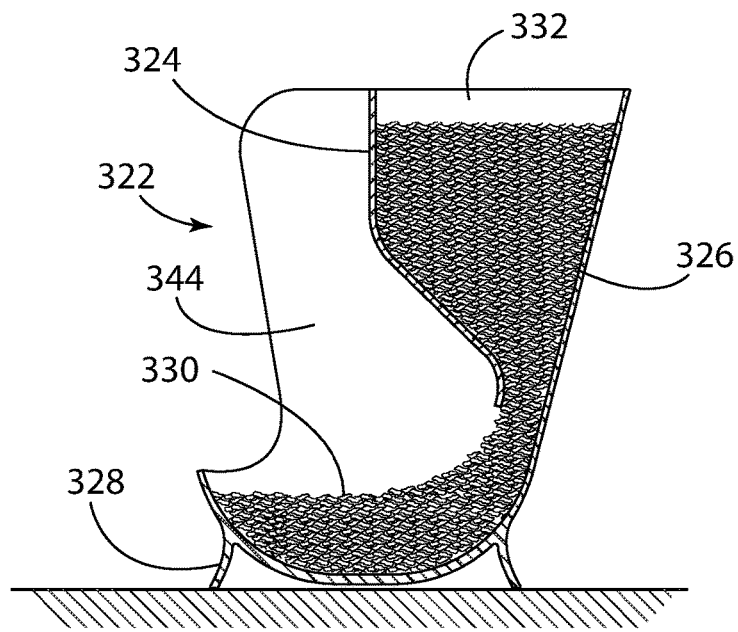
FIG. 105 is cross sectional view of the feeding vessel of FIG. 104 taken along section lines CV-CV of FIG. 104.

FIG. 105 is cross sectional view of the feeding vessel of FIG. 104 taken along section lines CV-CV of FIG. 104.

FIG. 106 is a rear perspective view of the feeding assembly of FIG. 104 including an exemplary integral shield and feeding silo, according to the present invention.

In FIGS. 104-106 feeding vessel 322 has a silo 324 for food 326 and has a base 328 and bowl portion 330. Feeding vessel 322 has a silo opening 332 and shield 334.

Figure 107:
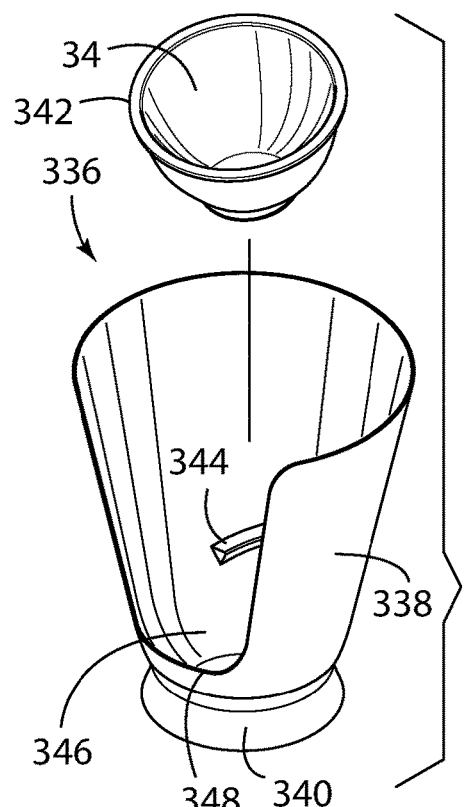
FIG. 107 is a front perspective view of another feeding assembly including an exemplary integral shield, according to the present invention.

FIG. 107 is a front perspective view of another feeding assembly including an exemplary integral shield, according to the present invention.

Figure 108:
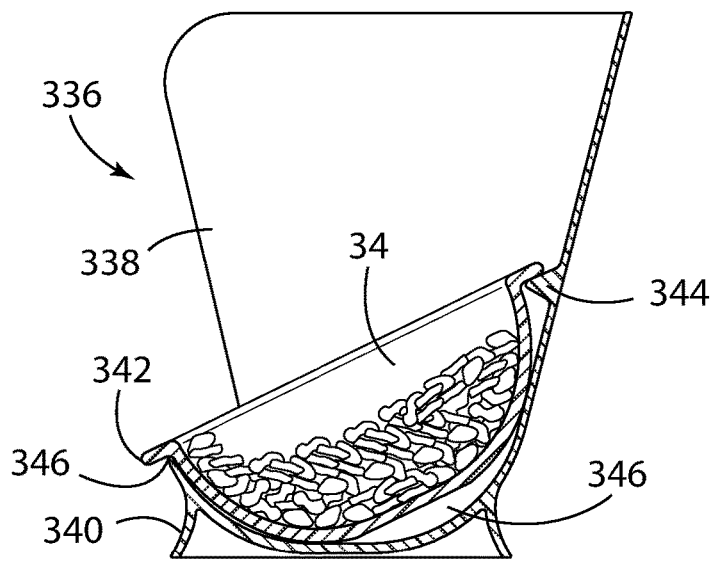
FIG. 108 is cross sectional view of the feeding vessel of FIG. 107 taken along section lines CVIII-CVIII of FIG. 107.
Figure 109:
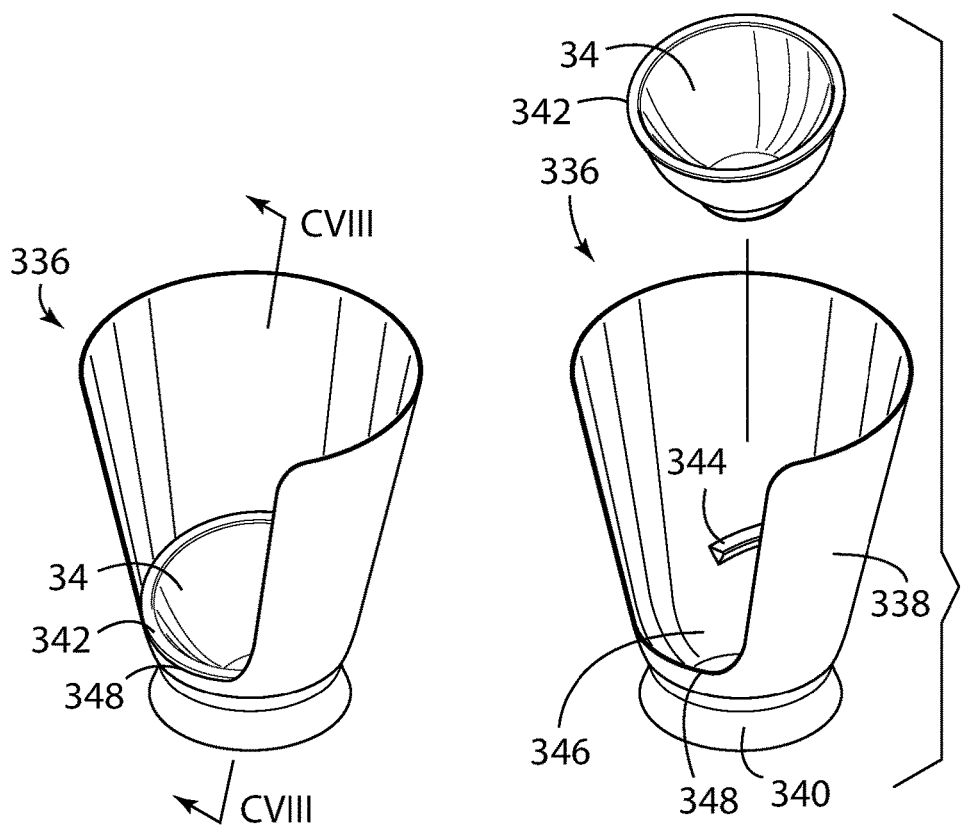
FIG. 109 is an exploded front perspective view of the feeding assembly of FIG. 107.

FIG. 108 is cross sectional view of the feeding vessel 336 of FIGS. 107 and 109 taken along section lines CVIII-CVIII of FIG. 107. The Figure shows a bowl holder with a ledge on the back portion of the shield portion of the holder and a bowl that will rest on the ledge so the bowl is slanted once placed in the holder.

FIG. 109 is an exploded front perspective view of the feeding assembly of FIG. 107.

In FIGS. 107-109, a feeding vessel 336 has a shield 338; a base 340; a bowl lip 342; a shield ridge to hold bowl 344 (which optionally may be a band 282 as described herein); a cavity to receive bowl 346; and a front shield edge to receive bowl 348 as also described herein.

FIG. 110 is a front perspective view of another feeding assembly including an exemplary removable shield, according to the present invention. In this embodiment an optional shield hook 350 is present and configured to adapted for insertion in bowl slot 352 on an optional mat 36 (see FIG. 111).

FIG. 111 is a closeup view of area CXI of FIG. 110. In this figure more detail is given to an optional means to hold bowl shield combination 198 (See e.g., FIG. 60) to mat 36. As shown, hook 350 is configured to be inserted into slot 352 and rotated (clockwise in this embodiment) until a raised portion 354 of distal end of hook 350 is allowed to enter concave recess portion 356. To achieve this, hook 350 is bendable and deformable to at least the height of raised portion 354 to travel during rotation into concave area 356. Also, when installed hook portion 362 is adjacent to the underside travel area 364 of slot 352.

FIG. 112 is a front perspective view of another feeding assembly including an exemplary removable shield 100 with bowl 96 showing a similar hook 350 and slot 352 configuration. It is noted that this hook 350 and slot 352 arrangement, with or without a raised hook portion may be applied to most of the aforementioned removable shield configurations.

It is noted that although embodiments with the various configurations of the feeding vessel with the integral shield are not shown, it is understood that these various shield configurations would also apply to shields attachable to a feeding bowl and are therefore within the scope of the present embodiments. It is also noted that the various profiles of the wedge elements 154 can be integrally formed and stationary on the shield surface. It is also noted that the shield may have a variety of textures and compositions to add friction to the food as the animal eats. Such materials may include materials with a high coefficient of friction such as rubber or even a low tac pressure sensitive adhesive. A washboard or any of a variety of geometrical shapes (including but not limited to curves and angles) may also be used as a surface the animal uses to scrape food into its mouth.

The drawings and the foregoing descriptions are not intended to represent the only forms of the feeding vessels and accessory assemblies in regard to the details of construction. Changes in form and in proportion of parts, as well as the substitution of equivalents, are contemplated as circumstances may suggest or render expedient.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

LIST OF REFERENCE NUMBERS 30 feeding vessel assembly according on one approach
32 shield/collar/apron ("shield")
34 feeding vessel
36 pad
38 feeding vessel rim
40 deformable shield lip to match feeding vessel rim
42 feeding vessel bottom flange, can also include weights
44 pad opening to receive a portion (including all) of feeding vessel bottom flange
46 lower shield opening (30-180 degrees)
48 upper shield opening (30-180 degrees)
50 side taper of shield (−45 to 80 degrees including vertical)
52 shield opening
54 opening flare (−45 to 170 degrees)
56 animal
58 shield taper (−45 to 170 degrees)
60 food dispenser
62 feeding vessel opening to receive food from food dispenser 60 opening 66
64 feed/food/liquid
66 food dispenser opening
68 food dispenser top hinged lid
70 feeding vessel with shield
72 shield
74 base
75 rubber layer or other adhesive layer
76 cavity to receive food/liquids
78 opening
80 top opening dimension
82 bottom opening dimension (ratio proportions 1:2 to 1:1 to 2:1; that is the top can be half or double the dimension of the top opening dimension)
84 feeding vessel with shield
86 side shields
88 back shield
90 front shield
92 front shield height (10 to 90 percent of side shield height)
94 side shield height above front shield 90
95 total side shield height (approximately 12 inches)
96 feeding vessel
98 feeding vessel interior wall
100 shield
102 shield wall
104 adhesive (e.g., a pressure sensitive adhesive)
106 cylindrical embodiment
107 integral shield
108 opening 114 sides (parallel)
110 feeding vessel diameter (parallel)
112 opening and feeding vessel back wall—parallel
114 feeding vessel 106 opening for animal to access cavity
116 front side height approximately 10 percent of height 118
118 height of feeding vessel and shield 120 cavity
122 optional sloping sides of area to define cavity
124 feeding vessel disposable liner
126 disposable liner configured to line the interior cavity of the feeding vessel 34
128 elastic band to mount to rim 38
130 liner portion to line interior of vessel cavity
132 liner portion extending beyond elastic band to allow a pet owner to allow disposal of liner material
134 feeding vessel with integral shield
136 feeding vessel portion
138 feeding vessel bottom flange
139 feeding vessel cavity
140 feeding vessel with integral shield disposable liner
141 integral shield
142 liner portion to cover shield
144 liner portion to line interior of vessel cavity
146 elastic band
148 liner portion extending beyond elastic band to allow a pet owner to allow disposal of liner material
150 pressure sensitive adhesive
152 optional ramp
154 optional removable wedge
156 optional protective cover for optional removable wedge
158 foldable flap for optional protective cover for optional removable wedge
160 feeding vessel shield top
162 molded ramp for vessel 34*i*
164 shield hook
166 optional protective cover for optional removable wedge opening for shield hook
168 optional ramp hook
170 opening in shield 70 for optional ramp hook 168
172 optional removable wedge hook
174 feeding vessel shield series of openings
176 rigid portion of protective shield
178 pliable portion of shield 154*i*
180 void of injection mold embodiment of FIG. 3'.
182 back wall of feeding vessel 70
184 slotted elevated portion of pad 36 (FIG. 40)
186 slot for pad (FIGS. 40 and 45)
188 retaining lip for shield
190 ridge on the pad shaped to receive an exemplary lipped shield (FIG. 51)
192 slot of ridge 190 to receive an exemplary lipped shield
194 slots to receive tabs 196 (FIG. 52-53)
196 shield tabs
198 integral and stackable bowl and shield combination (FIG. 60)
200 bowl portion of integral and stackable bowl and shield combination
202 shield portion of integral and stackable bowl and shield combination
204 base portion of integral and stackable bowl and shield combination
206 edge defining an opening to configured to receive the base portion of integral and stackable bowl and shield combination
208 edge defining an opening to receive an edge of the bowl
210 pad retaining clips (FIG. 65)
212 collapsible shield (FIG. 67)
214 webbing for collapsible shield
216 wire frame for collapsible shield
218 integral mat/bowl/shield embodiment feeding vessel (FIG. 71)
220 bowl portion of FIG. 71 feeding vessel
222 shield portion of FIG. 71 feeding vessel
224 mat portion of FIG. 71 feeding vessel
226 bowl base portion of FIG. 71 feeding vessel
228 feeding bowl with sloped side (FIG. 73)
230 annular ring around base of feeding bowl 228
232 concave portion of feeding bowl 228 to receive food
234 raised back wall portion of feeding bowl 228
236 front wall portion of feeding bowl 228
238 mat for feeding bowl 228
240 mat inversed grooved portion configured to extend into recessed groove 242
241 shield for bowl 228 (FIGS. 73-77)
242 recessed groove of annular ring 230
244 height difference between back portion and front portion of feeding bowl 228
246 height difference between back portion and front portion of feeding bowl 228*ii*
248 back wall portion of bowl 228*ii*
250 front wall portion of bowl 228*ii*
252 back wall of bowl 256
254 front wall portion of bowl 256
256 feeding bowl with sloped side (FIG. 84)
258 edged defining opening of bowl 256
260 concave area of bowl 256 to receive food
262 feeding bowl with vertical parallel side and sloped opening (FIG. 85-86)
264 shield of FIG. 85
266 tabs of shield 264
268 slots to receive tabs 266 of shield 264
270 vertical sides of bowl 276
272 sloped edge of bowl 276
274 concave portion of feeding bowl 276 to receive food
276 ramp/wedge for bowl of FIG. 88
278 mat slot
280 dimension of FIG. 89
282 raised band/ledge integral or attachable with PSA to shield of FIGS. 90-92
284 plurality of slots for pad (FIG. 90)
286 dimension of FIG. 91 of band 282
288 pressure sensitive adhesive (PSA)
290 packaging/box/shrink wrap of the unassembled flat pack of FIG. 90
300 feeding vessel of FIGS. 97-103
302 shield portion for feeding vessel 300
304 silo partition for feeding vessel 300
306 opening of silo for feeding vessel 300
308 sloped feeding bowl for feeding vessel 300
310 top cover for feeding vessel 300
312 mat opening for feeding vessel 300
314 retaining lip for feeding vessel 300
316 bowl lip FIG. 100
318 bottom lip/valve of silo partition of FIG. 101
320 liquid for water tight silo of FIG. 101
322 feeding vessel of FIGS. 104-106
324 silo for feeding vessel of FIG. 105
326 food shown for feeding vessel of FIG. 105
328 base for feeding vessel of FIG. 105
330 bowl portion for feeding vessel of FIG. 105
332 silo opening for feeding vessel of FIG. 105
334 shield for feeding vessel of FIG. 105
336 feeding vessel of FIGS. 107-109
338 shield of feeding assembly 336
340 base for of feeding assembly 336
342 bowl lip of feeding assembly 336

344 shield ridge to hold bowl of feeding assembly 336
346 cavity to receive bowl of feeding assembly 336
348 front shield edge to receive bowl of feeding assembly 336
350 shield hook
352 bowl slot to receive hook 350 (see FIG. 111)
354 raised rounded hook 350 end of hook 350
356 concave portion configured to received raised round hook 350 end
358 bendable metal strip
360 detachable rod to retain collapsible shield 212 in an extended (free) position
362 hook 350 portion
364 underside travel area 364 of slot 352

I claim:

1. A feeding vessel assembly, comprising:
a feeding bowl having a cavity to receive food and water;
a flexible removable shield to partially surround and be adjacent to a portion of an edge of the feeding bowl;
a pad to place the feeding bowl on, the pad having a plurality of adjacent concentric arcuate slots to accommodate a plurality of shield diameters and to receive an entire bottom end of the flexible removable shield having a retaining lip configured to extend through one of the arcuate slots;
a band having a pressure sensitive adhesive to attach to the shield;
wherein the shield, the pad and the band are configured to be flat packable when unassembled;
wherein the band is configurable to be positioned on the shield to hold the portion of the edge of the feeding bowl adjacent to the shield off the pad, and
wherein a bottom edge surface of the feeding bowl opposite the portion of the feeding bowl held by the band is adjacent to the pad.

2. The feeding assembly of claim 1, wherein the feeding bowl's width by height is one of be 5 inches by 2 inches; 9.8 inches by 3 inches; 7 inches by 2.5 inches; 12.75 inches by 2.6 inches.

* * * * *